US012657151B2

(12) United States Patent     (10) Patent No.:   US 12,657,151 B2
Jeon et al.             (45) Date of Patent:   *Jun. 16, 2026

(54) PCIe DEVICE

(71) Applicant: SK hynix Inc., Icheon-si (KR)

(72) Inventors: Yong Tae Jeon, Icheon (KR); Byung Cheol Kang, Icheon (KR); Seung Duk Cho, Icheon (KR); Sang Hyun Yoon, Icheon (KR); Se Hyeon Han, Icheon (KR); Jae Young Jang, Icheon (KR)

(73) Assignee: SK hynix Inc., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,773

(22) Filed: May 9, 2024

(65) Prior Publication Data

US 2024/0289295 A1     Aug. 29, 2024

Related U.S. Application Data

(63) Continuation of application No. 18/406,919, filed on Jan. 8, 2024, which is a continuation of application
(Continued)

(30) Foreign Application Priority Data

Apr. 13, 2021   (KR) ........................ 10-2021-0048063
Apr. 13, 2021   (KR) ........................ 10-2021-0048073
Apr. 13, 2021   (KR) ........................ 10-2021-0048077

(51) Int. Cl.
    *G06F 13/42*      (2006.01)
    *G06F 1/08*      (2006.01)
         (Continued)

(52) U.S. Cl.
    CPC ........... *G06F 13/4221* (2013.01); *G06F 1/08* (2013.01); *G06F 7/588* (2013.01); *G06F 13/4045* (2013.01)

(58) Field of Classification Search
CPC .... G06F 13/4045; G06F 13/4221; G06F 1/08; G06F 7/588
See application file for complete search history.

(56) References Cited

U.S. PATENT DOCUMENTS 6,647,434 B1    11/2003   Kamepalli
7,979,592 B1    7/2011   Pettey et al.
(Continued)

FOREIGN PATENT DOCUMENTS

CN     106663069 A    5/2017
CN     108028813 A    5/2018
(Continued)

OTHER PUBLICATIONS

Office Action dated Jul. 30, 2024 for the U.S. Appl. No. 18/406,919.
(Continued)

*Primary Examiner* — Brian T Misiura

(57) ABSTRACT

A peripheral component interconnect express (PCIe) device includes a common function performing operations associated with a PCIe interface according to a function type, the common function being programmable to be a function type selected from a plurality function types, an access identification information controller generating first access identification information for allowing an access to the common function, and providing the first access identification information to an assigned system image to which the common function has been assigned, a data packet receiver receiving a data packet including target identification information indicating a target system image from the target system image, and an access allowance determiner determining whether or not to allow the target system image to access the common function based on the first access identification information and the target identification information.

21 Claims, 39 Drawing Sheets

Related U.S. Application Data

No. 17/506,610, filed on Oct. 20, 2021, now Pat. No. 11,928,070.

(51) Int. Cl.
| | |
|---|---|
| *G06F 7/58* | (2006.01) |
| *G06F 13/40* | (2006.01) |

(56) References Cited

U.S. PATENT DOCUMENTS

| | | | | |
|---|---|---|---|---|
| 8,503,468 | B2 | 8/2013 | Akyol et al. | |
| 10,007,545 | B2 * | 6/2018 | Graham | G06F 9/45558 |
| 10,635,499 | B2 | 4/2020 | Huynh | |
| 2006/0195617 | A1 | 8/2006 | Arndt et al. | |
| 2008/0147943 | A1 * | 6/2008 | Freimuth | G06F 13/4282 |
| | | | | 710/240 |
| 2010/0115174 | A1 | 5/2010 | Akyol et al. | |
| 2011/0106981 | A1 | 5/2011 | Watkins et al. | |
| 2012/0131232 | A1 * | 5/2012 | Brownlow | G06F 13/4221 |
| | | | | 710/10 |
| 2013/0339955 | A1 | 12/2013 | Prawer et al. | |
| 2017/0277573 | A1 | 9/2017 | Huynh | |
| 2018/0239737 | A1 | 8/2018 | Cha et al. | |
| 2018/0367518 | A1 | 12/2018 | Singh et al. | |
| 2019/0042350 | A1 | 2/2019 | Nadathur et al. | |
| 2019/0042741 | A1 | 2/2019 | Abodunrin et al. | |
| 2020/0004703 | A1 | 1/2020 | Sankaran et al. | |
| 2020/0012530 | A1 | 1/2020 | Kakaiya et al. | |
| 2020/0042246 | A1 | 2/2020 | Maharana et al. | |
| 2020/0278935 | A1 | 9/2020 | Borikar et al. | |
| 2020/0409732 | A1 | 12/2020 | Kovacevic | |
| 2021/0089466 | A1 | 3/2021 | Shanbhogue et al. | |
| 2021/0200703 | A1 | 7/2021 | Simionescu et al. | |
| 2021/0247935 | A1 | 8/2021 | Beygi et al. | |
| 2022/0188073 | A1 | 6/2022 | Bowman et al. | |
| 2022/0300442 | A1 | 9/2022 | Jeon et al. | |
| 2022/0300448 | A1 | 9/2022 | Jeon | |
| 2022/0327080 | A1 | 10/2022 | Jeon et al. | |
| 2022/0327081 | A1 | 10/2022 | Jeon et al. | |
| 2022/0327082 | A1 | 10/2022 | Jeon et al. | |
| 2022/0327228 | A1 | 10/2022 | Jeon et al. | |

FOREIGN PATENT DOCUMENTS

| | | | |
|---|---|---|---|
| CN | 110287660 | A | 9/2019 |
| CN | 111092773 | A | 5/2020 |
| CN | 112422492 | A | 2/2021 |
| CN | 112565043 | A | 3/2021 |
| JP | 2010-016819 | A | 1/2010 |
| KR | 2010016819 | A | 1/2010 |
| KR | 1020130034036 | A | 4/2013 |
| KR | 101704776 | B1 | 2/2017 |
| KR | 1020170013713 | A | 2/2017 |
| KR | 1020170051475 | A | 5/2017 |
| KR | 1020170057237 | A | 5/2017 |
| KR | 1020210024195 | A | 3/2021 |

OTHER PUBLICATIONS

Jose Fernando Zazo et al., "A PCIe OMA engine to support the virtualization of 40 Gbps FPGA-accelerated network appliances," IFEE, Dec. 7, 2015.

"PCI Express® Base Specification Revision 4.0 Version 1.0", PCI Express, Sep. 27, 2017.

Office Action dated Mar. 30, 2023 for U.S. Appl. No. 17/504,351.

Office Action dated Mar. 2, 2023 for U.S. Appl. No. 17/504,884.

PCIe Express, PCI Express Base Specification 3.0, Nov. 10, 2010, pp. 1-4, 97-122 (Year: 2010).

Final Office Action dated Sep. 14, 2023 for U.S. Appl. No. 17/504,351.

Office Action dated Jan. 18, 2024 for the U.S. Appl. No. 17/504,346.

Notice of Allowance dated Mar. 7, 2024 for U.S. Appl. No. 17/504,351.

"Virtual Function Number Assignment", An IP.com Prior Art Database Technical Disclosure, Jul. 11, 2008, URL:https://priorart.ip.com/IPCOM/000172526.

Notice of Office Action for Taiwanese Patent Application No. 111113693, dated Aug. 29, 2025.

* cited by examiner

START

SET OPERATION MODE OF SECOND FUNCTION MODE TO ACTIVE MODE — S2401

RECEIVE CONFIGURATION REQUEST — S2403

PROVIDE SC (SUCCESSFUL COMPLETION) INFORMATION — S2405

PERFORM CONFIGURATION OPERATION — S2407

END

START

SET OPERATION MODE OF SECOND PHYSICAL FUNCTION TO INACTIVE MODE — S2501

CLOCK GATING SECOND PHYSICAL FUNCTION SET TO INACTIVE MODE — S2503

END

300

210-1        210-2                    210-n        ~6000b

| System Image | System Image | . . . | System Image |

Virtualization Intermediary    SR-PCIM ~310    220

Processor    1100

Memory    1200

320                          330

Translation Agent    ◄──►    Address Translation and Protection Table

Root Complex    ~230

Root Port ~231-1                 Root Port ~232-2

240

Switch 2000-1              2000-2              2000-3

PCIe Device        PCIe Device        PCIe Device

ATC ~341          ATC                ATC

343  PFO ~342      PFO                PFO

VF0_1 . . . VF0_N    VF0_1 . . . VF0_N    VF0_1 . . . VF0_N

8000

| PREFIX ACCESS_ID | HEADER | DATA PAYLOAD | DIGEST (optional) |
|---|---|---|---|

PCIe DEVICE

CROSS-REFERENCE TO RELATED APPLICATIONS

The present application is a continuation of U.S. patent application Ser. No. 18/406,919, filed on Jan. 8, 2024, which is a continuation of U.S. patent application Ser. No. 17/506, 610, filed on Oct. 20, 2021 and now issued as U.S. Pat. No. 11,928,070, which claims priority under 35 U.S.C. § 119(a) to Korean patent application number 10-2021-0048063 filed on Apr. 13, 2021, Korean patent application number 10-2021-0048073, filed on Apr. 13, 2021, and Korean patent application number 10-2021-0048077, filed on Apr. 13, 2021. The disclosure of each of foregoing application is incorporated herein by reference in its entirety.

BACKGROUND

Field of Invention

The present disclosure relates to an electronic device, and more particularly, to a Peripheral Component Interconnect Express (PCIe) device and an operating method thereof.

Description of Related Art

A Peripheral Component Interconnect Express (PCIe) device may define a bus protocol which is used to connect input/output devices to a host device. PCI Express (PCIe) has the concept of programming defined by the PCI standards and includes a physical communication layer defined as a high-speed serial interface.

A storage device may store data in response to control of a host device such as a computer or a smartphone. The storage device may include a memory device which stores data and a memory controller which controls the memory device. Memory devices may be divided into volatile memory devices and non-volatile memory devices.

A volatile memory device may retain data as long as power is being supplied, and may lose the stored data in the absence of power supply. Types of volatile memory devices may include Static Random Access Memory (SRAM), Dynamic Random Access Memory (DRAM), and the like.

A non-volatile memory device may not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM) and flash memory.

SUMMARY

Various embodiments are directed to a Peripheral Component Interconnect Express (PCIe) device reducing power consumption and a device size by decreasing a PCIe gate count, and an operating method thereof.

In addition, various embodiments of the present disclosure are directed to a PCIe device efficiently arranging functions configured in various types by using a software method such as a request from a host and firmware setting, not by hardware modifications, and an operating method thereof.

According to an embodiment, a peripheral component interconnect express (PCIe) device may include a plurality of common functions performing operations associated with a PCIe interface according to a function type of each of the plurality of common functions, each of the plurality of common functions being programmable to be a function type selected from a plurality function types, and a function type controller determining the function type of each of the plurality of common functions based on function type setting information provided from a host.

According to an embodiment, a method for operating a Peripheral Component Interconnect Express (PCIe) device including a plurality of common functions performing operations associated with a PCIe interface, the method may include receiving function type setting information from the host, determining a plurality of function types for the plurality of common functions, respectively, based on the function type setting information, each function type being one of a physical function (PF) type, a virtual function (VF) type, and a disable function type in which the operations are disabled, and controlling the plurality of common functions according to the plurality of function types, respectively, to perform the operations.

According to an embodiment, a peripheral component interconnect express (PCIe) device may include a first function performing operations associated with a Peripheral Component Interconnect Express (PCIe) interface according to a physical function (PF) type, a second function performing operations associated with the PCIe interface according to the physical function type or a virtual function (VF) type, and a function type controller changing a function type of the second function into the virtual function type or the physical function type based on function type setting information provided from a host.

Various embodiments are directed to a PCIe device capable of reducing operation cost of a computing system including the PCIe device, and an operating method thereof.

According to an embodiment, a Peripheral Component Interconnect Express (PCIe) device may include a first physical function managing a PCIe link and receiving function mode control information from the host, a plurality of second physical functions respectively enabled or disabled according to respectively operation modes, and a function mode controller setting the operation modes of the plurality of second physical functions based on the function mode control information, each of the operation modes being set to one of an active mode and an inactive mode.

According to an embodiment, a method of operating a Peripheral Component Interconnect Express (PCIe) device including a first physical function and a plurality of second physical functions, the first physical function managing a PCIe link coupled to a host, may include receiving function mode control information from the host through the first physical function, and setting an operation mode of each of the plurality of second physical functions based on the function mode control information, each operation mode being respectively set to one of an active mode and an inactive mode.

Various embodiments are directed to a PCIe function with high operating speed and high security, and an operating method thereof.

According to an embodiment, a Peripheral Component Interconnect Express (PCIe) function, the PCIe function may include an access identification information controller generating first access identification information for allowing an access to the PCIe function, and providing the first access identification information to an assigned system image to which the PCIe function has been assigned, the assigned system image being one of a plurality of system images, a data packet receiver receiving a data packet including target identification information indicating a target system image selected from the plurality of system images from the target system image, and an access allowance determiner determining whether or not to allow an access of the target system image based on the first access identification information and the target identification information.

According to an embodiment, a computing system may include a plurality of Peripheral Component Interconnect Express (PCIe) functions and a host including a plurality of system images, generating access identification information for allowing an access to a PCIe function among the plurality of PCIe function that is assigned to a corresponding system image of the plurality of system images, and providing the access identification information to the PCIe function, and the PCIe function storing the access identification information provided from the host, receiving a data packet including target identification information indicating a target system image from the target system image, the target system image being one of the plurality of system images, and determining whether or not to allow an access of the target system image based on the access identification information and the target identification information.

According to an embodiment, a method for operating a Peripheral Component Interconnect Express (PCIe) function assigned to one of a plurality of system images may include generating access identification information for allowing an access to the PCIe function, providing the access identification information to an assigned system image, receiving a data packet including target identification information indicating a target system image among the plurality of system images from the target system image, and determining whether or not to allow an access of the target system image based on the access identification information and the target identification information.

According to an embodiment, a peripheral component interconnect express (PCIe) device may include a common function performing operations associated with a PCIe interface according to a function type, the common function being programmable to be a function type selected from a plurality function types, an access identification information controller generating first access identification information for allowing an access to the common function, and providing the first access identification information to an assigned system image to which the common function has been assigned, a data packet receiver receiving a data packet including target identification information indicating a target system image from the target system image, and an access allowance determiner determining whether or not to allow the target system image to access the common function based on the first access identification information and the target identification information.

According to an embodiment, a Peripheral Component Interconnect Express (PCIe) device may include a physical function enabled or disabled according to an operation mode, the operation mode being set to one of an active mode and an inactive mode, an access identification information controller generating first access identification information for allowing an access to the physical function, and providing the first access identification information to an assigned system image to which the physical function has been assigned, a data packet receiver receiving a data packet including target identification information indicating a target system image from the target system image, and an access allowance determiner determining whether or not to allow the target system image to access the physical function based on the first access identification information and the target identification information.

According to an embodiment, a peripheral component interconnect express (PCIe) device may include a plurality of common functions performing operations associated with a PCIe interface according to a function type of each of the plurality of common functions, each of the plurality of common functions being programmable to be a function type selected from a plurality function types, and a function mode controller operation modes of the plurality of common functions based on function mode control information provided from a host, each of the operation modes being set to one of an active mode and an inactive mode.

These and other features, aspects, and embodiments are described below.

BRIEF DESCRIPTION OF THE DRAWINGS

FIG. 7 illustrates a PCIe device according to an embodiment of the present disclosure;

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

In the present disclosure, the term "PCIe function" may be used interchangeably with "function".

The present disclosure describes three main embodiments, and each main embodiment includes a plurality of embodiments. The main embodiments may be described in detail through FIGS. 1 to 17, FIGS. 18 to 25, and FIGS. 26 to 39, respectively.

1. Functions Configured in Various Types by Using a Software Method

Figure 1:
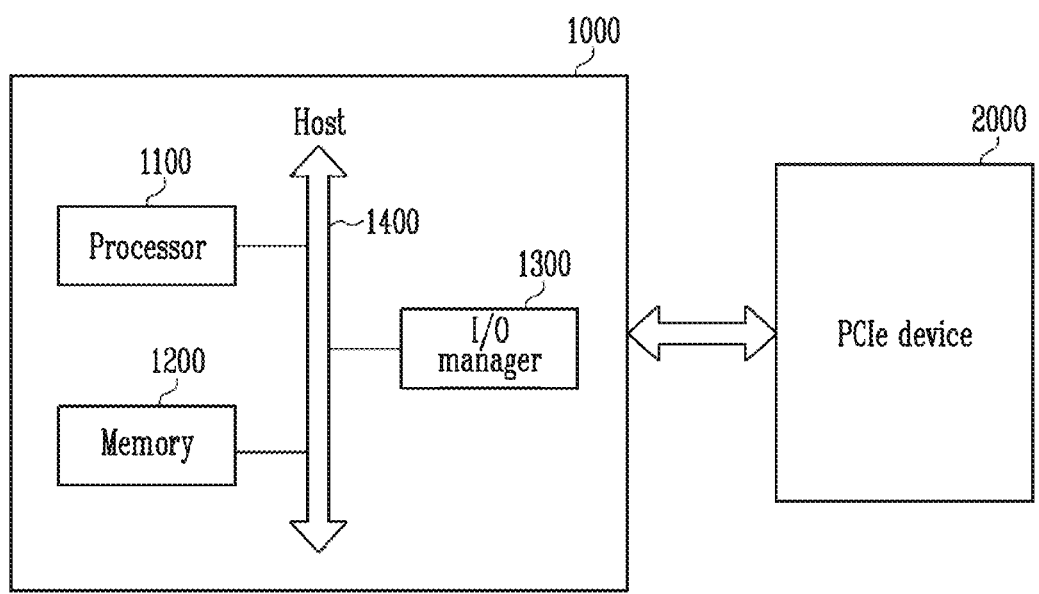
FIG. 1 illustrates an example of a computing system according to an embodiment of the present disclosure.

FIG. 1 illustrates an example of a computing system 100 according to an embodiment of the present disclosure.

Referring to FIG. 1, the computing system 100 may include a host 1000 and a Peripheral Component Interconnect Express (PCIe) device 2000. The computing system 100 may be, for example, a cellular phone, a smartphone, an MP3 player, a laptop computer, a desktop computer, a game player, a TV, a tablet PC, or an in-vehicle infotainment system.

The host 1000 may include a processor 1100, a memory 1200, an input/output (I/O) manager 1300, and a bus 1400. Components of the host 1000 may exchange signals and data through the bus 1400.

The processor 1100 may include circuits, interfaces, or program codes for processing data and controlling operations of components of the computing system 100. For example, the processor 1100 may include a CPU (such as an ARM™ processor), a microcontroller, or an application specific integrated circuit (ASIC).

The memory 1200 may include SRAM or DRAM that stores data, commands, or program codes necessary for operations of the computing system 100. However, the processor 1100 may also include a non-volatile memory. According to an embodiment, the memory 1200 may include program codes that may operate to execute one or more operating systems (OS) and virtual machines (VM) and program codes that execute a virtualization intermediary (VI) for managing the virtual machines.

The processor 1100 may execute one or more operating systems and virtual machines by driving the program codes stored in the memory 1200. In addition, the processor 1100 may execute the virtualization intermediary for managing the virtual machines. In this manner, the processor 1100 may control operations of the components of the computing system 100.

The I/O manager 1300 may be an adapter that connects input/output devices to the host 1000. For example, the I/O manager 1300 may include a Universal Serial Bus (USB) adapter, a Peripheral Component Interconnect (PCI) or a PCI Express (PCIe) adapter, a Small Computer System Interface (SCSI) adapter, a Serial AT Attachment (SATA) adapter, a NonVolatile Memory express (NVMe) adapter, or combinations thereof. The I/O manager 1300 may include circuits, interfaces, or codes that are operable to communicate information with devices connected to the computing system 100. The I/O manager 1300 may include one or more standardized buses and one or more bus controllers. Therefore, the I/O manager 1300 may perceive the devices connected to the bus 1400, list the devices connected to the bus 1400, and perform resource allocation and deallocation for various devices connected to the bus 1400. In other words, the I/O manager 1300 may operate to manage communications over the bus 1400. For example, the I/O manager 1300 may be a PCI or PCIe system and include PCIe root complex (RC), one or more PCIe switches, or bridges. For example, the I/O manager 1300 may be controlled by the virtualization intermediary.

PCI may define a bus protocol that is used to connect the I/O devices to the processor 1100. PCIe may have the concept of programming defined by the PCI standards and define a physical communication layer as a high-speed serial interface.

The PCIe device 2000 may communicate with the host 1000 using PCIe. For example, the PCIe device 2000 may be implemented as various I/O device types such as networks and storages.

According to an embodiment, the PCIe device 2000 may be defined as an endpoint or a device including an endpoint.

An endpoint may refer to a type of a function that may be a requester or a completer of a PCIe transaction. Endpoints may be classified into legacy endpoints, PCI Express (PCIe) endpoints, or root complex integrated (RCiEP) endpoints.

A legacy endpoint may be a function with a type 00h configuration header. A legacy endpoint may support configuration requests as a completer. A legacy endpoint may support I/O requests as a completer. A legacy endpoint may accept I/O requests for either or both of 80h and 84h locations regardless of an I/O decode configuration of the corresponding endpoint. A legacy endpoint may support I/O requests. A legacy endpoint must not issue a locked request. A legacy endpoint may implement extended configuration space capabilities. A legacy endpoint operating as a requester of a memory transaction may not be required to generate addresses of 4 GB or more. When an interrupt resource is requested, a legacy endpoint may be required to support Message Signaled Interrupt (MSI) or MSI-X, or both. When MSI is implemented, a legacy endpoint may support a 32-bit or 64-bit message address version with an MSI functional structure. A legacy endpoint may support 32-bit address designation with respect to a base address register requesting a memory resource. A legacy endpoint may appear within one of the hierarchy domains originated by a root complex.

A PCIe endpoint may be a function with a type 00h configuration space header. A PCIe endpoint may support configuration requests as a completer. A PCIe endpoint must not depend on operating system allocation of I/O resources claimed through base address registers (BARs). A PCIe endpoint may not generate I/O requests. A PCIe endpoint may not support locked requests as a completer or generate locked requests as a requester. PCIe-compliant software drivers and application programs may be written to prevent the use of lock semantics when accessing a PCIe endpoint. A PCIe endpoint operating as a requester of a memory transaction may generate an address of more than 4 GB. A PCIe endpoint may be required to support Message Signaled Interrupt (MSI), MSI-X, or both when an interrupt resource is requested. When MSI is implemented, a PCIe endpoint may support a 64-bit message address version with an MSI functional structure. A minimum address range requested by a base address register may be 128 bytes. A PCIe endpoint may appear within one of the hierarchy domains originated by a root complex.

RCiEPs may be implemented on internal logic of root complexes that contains root ports. An RCiEP may be a function with a type 00h configuration space header. An RCiEP may support configuration requests as a completer. An RCiEP may not request I/O resources claimed through base address registers. An RCiEP may not generate I/O requests. An RCiEP may not support locked requests as a completer or generate locked requests as a requester. PCIe-compliant software drivers and application programs may be written to prevent the use of lock semantics when accessing an RCiEP. An RCiEP operating as a requester of a memory transaction may generate an address equal to or greater than that which may be processed by the host 1000 as a completer. An RCiEP may be required to support MSI, MSI-X, or both when an interrupt resource is requested. When MSI is implemented, an RCiEP may support a 32-bit or 64-bit message address version with an MSI functional structure. An RCiEP may support 32-bit address designation with respect to a base address register requesting a memory resource. An RCiEP may implement link capabilities, link status, link control, link capabilities 2, link status 2, and link control 2 registers in the PCIe extended capability. An RCiEP may not implement active state power management. An RCiEP may not be hot-plugged independent of the root complex as a whole. An RCiEP may not appear in hierarchy domains exposed by the root complex. An RCiEP may not appear in switches.

According to an embodiment, the PCIe device 2000 may generate at least one virtual device. For example, the PCIe device 2000 may store program codes for generating at least on virtual device.

According to an embodiment, the PCIe device 2000 may generate a physical function (PF) device or a virtual function (VF) device in response to a virtualization request received from the host 1000. For example, a physical function device may be set to a virtual device in which a virtualization intermediary is granted access rights. A virtual function device may be set to a virtual device that is assigned to a virtual machine of the host 1000.

Figure 2:
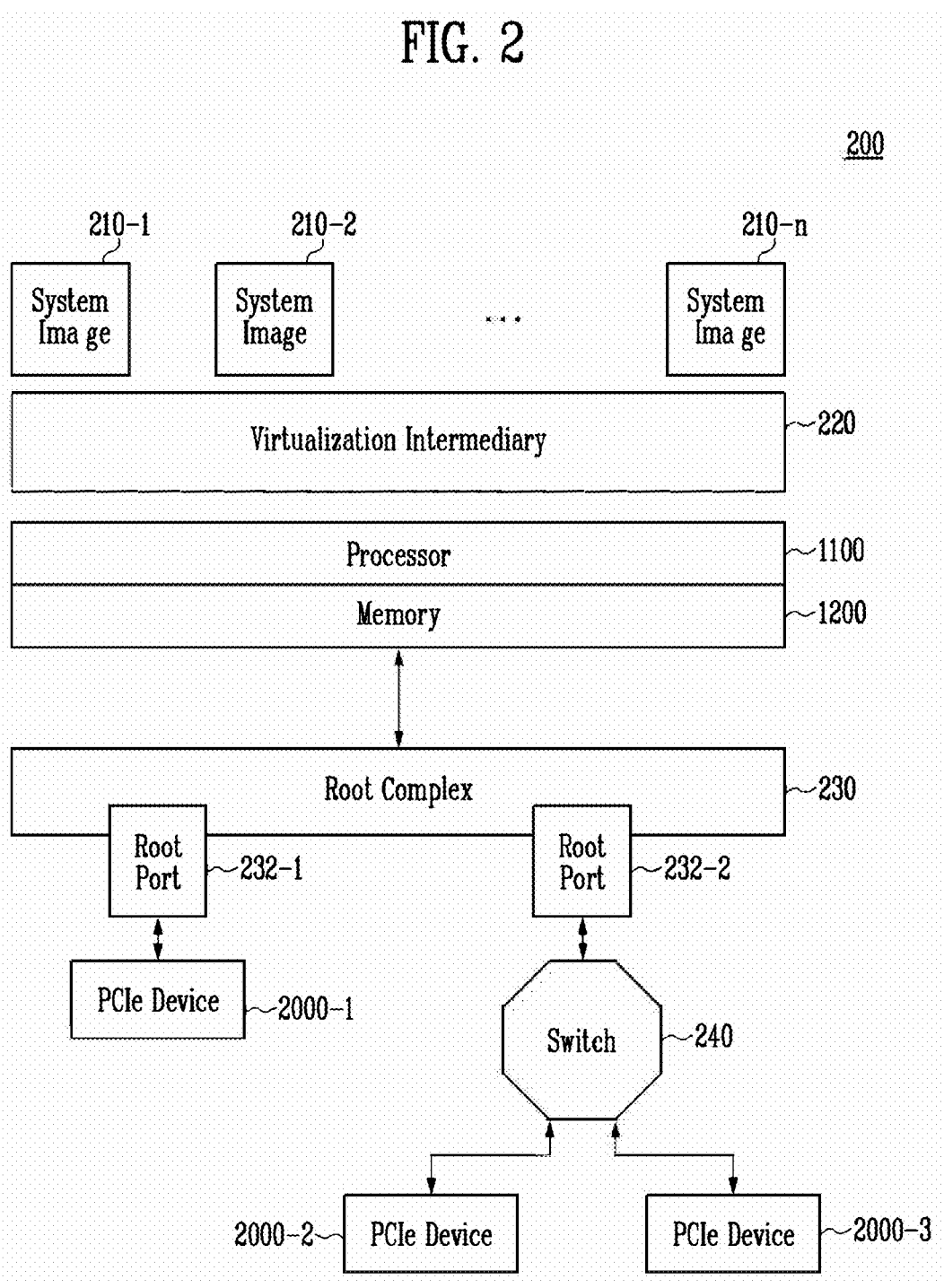
FIG. 2 illustrates another example of a computing system according to an embodiment of the present disclosure.

FIG. 2 illustrates another example (a computing system 200) of a computing system according to an embodiment of the present disclosure.

According to an embodiment, FIG. 2 shows an example of a general platform configuration where PCIe is available.

Referring to FIG. 2, the computing system 200 may include the processor 1100, the memory 1200, a plurality of system images 210-1 to 210-n, a virtualization intermediary 220, a root complex 230, a switch 240, and a plurality of PCIe devices 2000-1 to 2000-3.

The processor 1100 and the memory 1200 as shown in FIG. 2 may correspond to the processor 1100 and the memory 1200 as shown in FIG. 1, respectively. According to an embodiment, the processor 1100, the memory 1200, the plurality of system images 210-1 to 210-n, the virtualization intermediary 220, the root complex 230, and the switch 240 may be included in the host 1000 of FIG. 1. According to an embodiment, the plurality of PCIe devices 2000-1 to 2000-3 may correspond to the PCIe device 2000 of FIG. 1.

The system images 210-1 to 210-n may refer to software components that are executed in a virtual system to which PCIe functions are assigned. The system images 210-1 to 210-n may be software such as operating systems that are used to execute applications or reliable services. For example, each of the system images 210-1 to 210-n may be respectively configured as a guest OS, a shared or non-shared I/O device driver, or the like. To increase effective hardware resource utilization without hardware modifications, the plurality of system images 210-1 to 210-n may be executed in the computing system 200.

According to an embodiment, a PCIe function may refer to an independent operation unit for providing physical resources included in the PCIe devices 2000-1 to 2000-3. In the present disclosure, a PCIe function and a "function" may refer to the same meaning.

The virtualization intermediary 220 may be a software component that supports one or more system images 210-1 to 210-n. According to an embodiment, the virtualization intermediary 220 may be referred to as hypervisor or a virtual machine monitor (VMM). The virtualization intermediary 220 may be interposed between hardware such as the processor 1100 and the memory 1200 and the system images 210-1 to 210-n. I/O operations (inbound or outbound) in the computing system 200 may be intercepted and processed by the virtualization intermediary 220. The virtualization intermediary 220 may present abstract the hardware resources to present the system images 210-1 to 210-n with its own virtual system. The actual hardware resources available to each of the system images 210-1 to 210-n may vary depending on workload or customer-specific policies.

The root complex 230 may signify the root of an I/O hierarchy that connects the processor 1100/memory 1200 subsystem to an I/O. According to an embodiment, the root complex 230 may be implemented as one configuration of the I/O manager 1300 as shown in FIG. 1.

The computing system 200 may include at least one root complex 230. In addition, each root complex 230 may include one or more root ports 231-1 and 232-2. Each of the root ports 231-1 and 232-2 may show a separate hierarchy. The root complex 230 may communicate with the switch 240 or the PCIe devices 2000-1 to 2000-3 through the root ports 231-1 and 232-2.

The capability to route peer-to-peer transactions between hierarchy domains through the root complex 230 may be optional. A hierarchy domain may be composed of a single endpoint or a sub-hierarchy containing one or switches and endpoints.

The root complex 230 may split a packet into smaller packets when routing peer-to-peer transactions between hierarchy domains. For example, the root complex 230 may a single packet having a 256-byte payload into two packets each having a 128-byte payload. However, the root complex 230 that supports peer-to-peer routing of vendor-defined messages may not split a vendor-defined message into smaller packets except at 128-byte boundaries (i.e., all resulting packets except the last packet must be an integral multiple of 128 bytes).

The root complex 230 may support generation of configuration requests as a requester. The root complex 230 may support the generation of I/O requests as a requester.

The root complex 230 may not support lock semantics as a completer. The root complex 230 may support generation of locked requests as a requester.

The switch 240 may be defined as a logical assembly of various virtual PCI-to-PCI bridges. The switch 240 may communicate with the PCIe devices 2000-2 and 2000-3.

The switch 240 may appear as configuration software with two or more logical PCI-to-PCI bridges.

The switch 240 may forward transactions using PCI bridge mechanisms. The switch 240 may forward all types of transaction layer packets (TLPs) between all port sets. The switch 240 may support locked requests.

The switch 240 may not be allowed to split a packet into smaller packets.

Arbitration between ingress ports of the switch 240 may be implemented using round robin or weighted round robin when contention occurs on the same virtual channel.

Endpoints may not appear in configuration software on the internal bus of the switch 240 as peers of the virtual PCI-to-PCI bridges representing the switch downstream ports.

Figure 3:
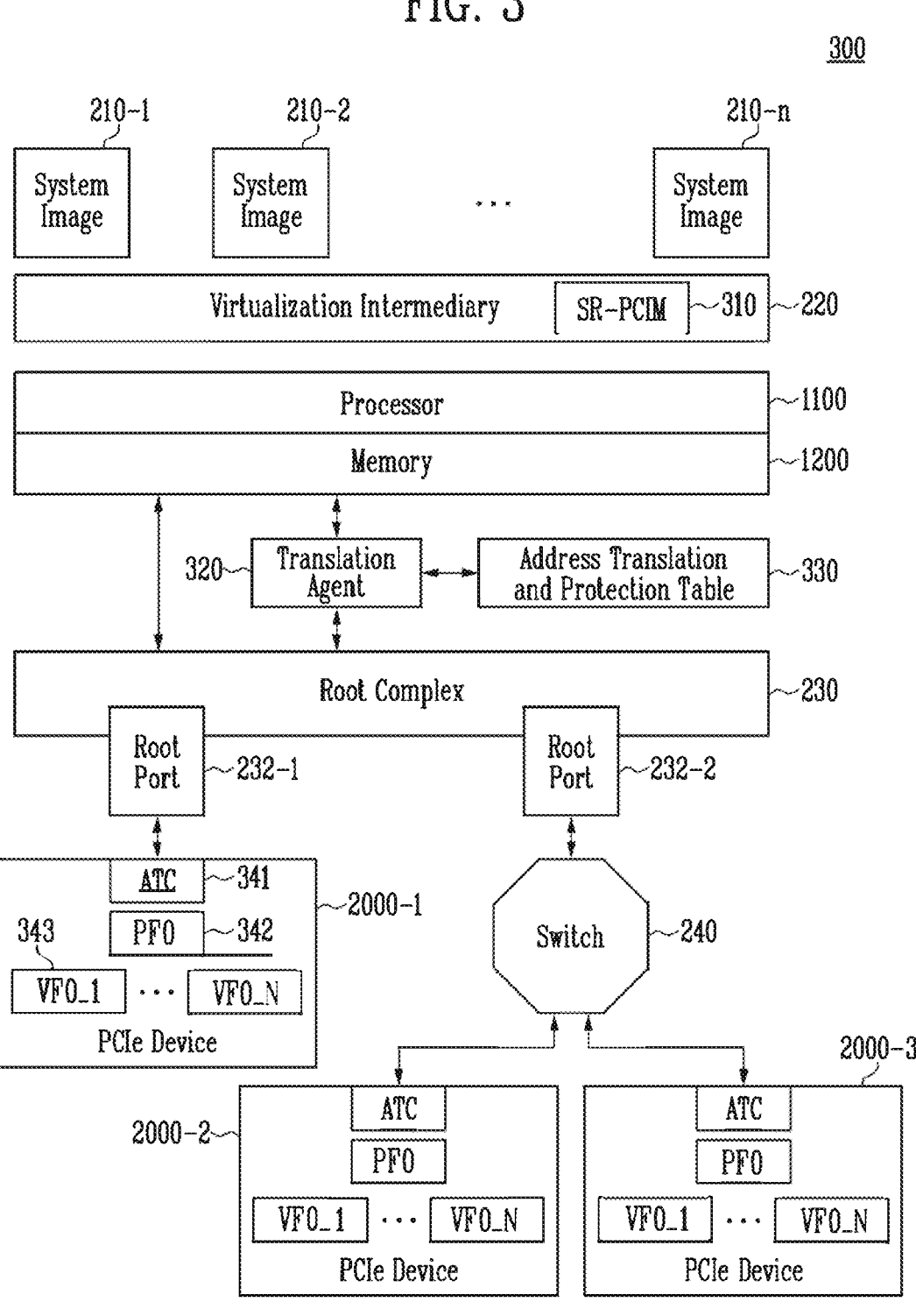
FIG. 3 illustrates another example of a computing system according to an embodiment of the present disclosure.

FIG. 3 illustrates another example (a computing system 300) of a computing system according to an embodiment of the present disclosure.

According to an embodiment, FIG. 3 shows an example of a Single Root input/output Virtualization (SR-IOV) configuration platform.

Single Root I/O Virtualization (SR-IOV) may enable the system images 210-1 to 210-n to share PCIe hardware resources in a virtual environment. According to an embodiment, SR-IOV may be developed to improve I/O performance of the PCIe devices 2000-1 to 2000-3 and directly connect the system images 210-1 to 210-n and the PCIe devices 2000-1 to 2000-3. Therefore, in the computing system 300 that contains SR-IOV capability, one or more PCIe devices 2000-1 to 2000-3 or PCIe functions may be assigned to one of the system images 210-1 to 210-n. According to an embodiment, the SR-IOV capability may have a specification that a single PCIe device (2000-1 to 2000-3) may appear as individual PCI devices 2000-1 to 2000-3 on the system image (210-1 to 210-n) under a single root port. According to an embodiment, the PCIe devices 2000-1 to 2000-3 supporting the SR-IOV capability may display a plurality of instances, i.e., PCIe functions on the system images 210-1 to 210-n. In addition, in the computing system 300 to which the SR-IOV capability is applied, the root complex 230 may directly connect the system images 210-1 to 210-n to the PCIe functions without the virtualization intermediary 220. Therefore, by using the SR-IOV capability, the root complex 230 may directly connect the system images 210-1 to 210-n of the host 1000 to the PCIe functions not via the virtualization intermediary 220.

Referring to FIG. 3, the computing system 300 may include the processor 1100, the memory 1200, the plurality of system images 210-1 to 210-n, the virtualization intermediary 220, the root complex 230, the switch 240, a single root PCI manager (SR-PCIM) 310, a translation agent (TA) 320, an address translation and protection table (ATPT) 330, and the plurality of PCIe devices 2000-1 to 2000-3.

Relative to the computing system 200 of FIG. 2, the computing system 300 as shown in FIG. 3 may further include the single root PCI manager 310, the translation agent 320, and the address translation and protection table 330.

The plurality of PCI devices 2000-1 to 2000-3 as shown in FIG. 3 may correspond to the plurality of PCIe devices 2000-1 to 2000-3 of FIG. 2. In addition, each of the PCIe devices 2000-1 to 2000-3 may include an address translation cache (ATC) 341, a physical function (PF) 342, and a plurality of virtual functions (VF) 343. For convenience of explanation, FIG. 3 illustrates one physical function. However, according to embodiments, there may be a plurality of physical functions.

The single root PCI manager 310 may include software responsible for the configuration of the SR-IOV capability, management of the physical functions 342 and the virtual functions 343, processing of associated error events, and overall device controls such as power management and hot plug services. According to an embodiment, the single root PCI manager 310 may be logically located in the virtualization intermediary 220.

The translation agent 320 may be hardware, or a combination of hardware and software responsible for translating an address within a PCIe transaction into an associated platform physical address. The translation agent 320 may include an address translation cache to accelerate translation table access. In addition, the translation agent 320 may support address translation services (ATS) which enables a PCIe function to obtain address translations a priori to DMA access to the associated memory. In an SR-IOV implementation, the use of the translation agent 320 may be optional.

The address translation and protection table 330 may contain the set of address translations accessed by the translation agent 320 to process PCIe requests (DMA read, DMA write, or interrupt request). In PCIe, interrupts may be treated as memory write operations. Through a combination of a requester identifier and an address contained within a PCIe transaction, an interrupt may be routed to any target (e.g., a processor core) transparent to the associated I/O function. DMA read and write requests may be translated through a combination of a routing ID and the address contained within the PCIe transaction. The use of the address translation and protection table 330 may be optional in an SR-IOV implementation.

The address translation cache 341 may exist in two locations within a platform. For example, the address translation cache 341 may be integrated within the translation agent 320, located in an RC, or located in the PCIe devices 2000-1 to 2000-3. In the PCIe devices 2000-1 to 2000-3, the address translation cache 341 may be populated using the ATS technology. A PCIe transaction indicating that a translated address is contained may bypass the address translation cache 341 of a platform to improve performance without damaging advantages related to the address translation and protection table 330. The use of the address translation cache 341 may be optional in an SR-IOV implementation.

The physical function 342 may be a PCIe function that supports the SR-IOV capability and accesses the single root PCI manager 310, the virtualization intermediary 220 or the system images 210-1 to 210-n.

The virtual function 343 may be a light-weight PCIe function that may directly access the system images 210-1 to 210-n. The virtual function 343 may operate as a virtual instance of the physical function 342. Thus, from point-of-view of the system images 210-1 to 210-n, the virtual function 343 may appear as an instance of the physical function 342. Resources associated with a main data movement of a function may be used in the system images 210-1 to 210-n. The virtual function 343 may be shared serially by different system images 210-1 to 210-n. For example, the virtual function 343 may be assigned to one system image (210-1 to 210-n), reset, and then be assigned to another system image (210-1 to 210-n). The virtual function 343 may be selectively migrated from one physical function 342 to another function. All virtual functions 343 associated with the physical function 342 may be the same device type as the physical function 342 (e.g., the same network device type or the same storage device type).

Figure 4:
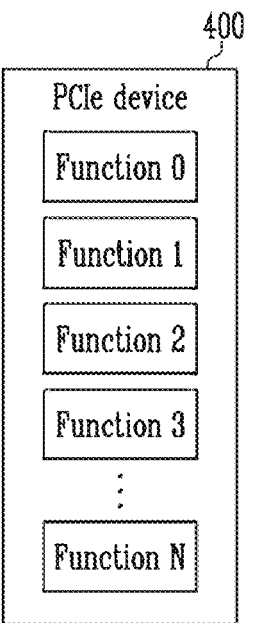
FIG. 4 illustrates a multi-function device according to an embodiment of the present disclosure.

FIG. 4 illustrates a multi-function device according to an embodiment of the present disclosure.

A PCIe device 400 as shown in FIG. 4 may represent one of the PCIe device 2000 as shown in FIG. 1 and the PCIe devices 2000-1 to 2000-3 as shown in FIGS. 2 and 3.

Referring to FIG. 4, the PCIe device 400 may include a plurality of functions Function 0 to Function N. According to an embodiment, the plurality of functions Function 0 to Function N may be physical functions. When all functions Function 0 to Function N included in the PCIe device 400 are physical functions, the corresponding PCIe device 400 may be defined as a multi-function device.

According to an embodiment, the plurality of functions Function 0 to Function N may share a common PCIe link. The link and PCIe functionality shared by all functions Function 0 to Function N may be managed through the zeroth function Function 0.

According to an embodiment, the plurality of functions Function 0 to Function N may support the Alternative Routing Identifier (ARI) capability. In addition, the plurality of Alternative Routing Identifier (ARI) capability may use a single bus number captured through a PCI enumeration process.

According to an embodiment, the plurality of functions Function 0 to Function N may support ATS capability. The plurality of functions Function 0 to Function N may include an address translation cache for managing an ATS obtained translated address.

According to an embodiment, each of the plurality of functions Function 0 to Function N may include unique physical resources including a separate configuration space, a base address register (BAR), and the like. The physical resources may refer to some of the physical resources of the PCIe device 400. In other words, the plurality of functions Function 0 to Function N may provide physical resources to the assigned system images.

The plurality of functions Function 0 to Function N may be assigned to the system images, respectively. To prevent one system image from impacting another system image, all PCIe configuration operations may be intercepted and processed by the virtualization intermediary.

According to an embodiment, the configuration space of each of the plurality of functions Function 0 to Function N may include a type 0 configuration space header. For example, the type 0 configuration space header may include a header type register and an interrupt pin register.

The header type register may be included in the type 0 configuration space header of the configuration space. The header type register may identify whether multi-functions may be included in a layout of a predefined second portion (starting from a 10h byte of the configuration space) and the PCIe device 400. For example, a multi-function device field of a header type register may be included. When the multi-function device field is set, the PCIe device 400 may include the plurality of functions Function 0 to Function N. Software may probe for the other functions Function 1 to Function N except for the zeroth function Function 0.

The interrupt pin register may be a read-only register that identifies a legacy interrupt message the function uses. Valid values may be 01h, 02h, 03h and 04h that are mapped to the legacy interrupt message for INTA, INTB, INTC and INTD, respectively. The value 00h may indicate that the function does not use the legacy interrupt message. The values 05h to FFh may be reserved. The PCI Express may define one legacy interrupt message for a single function device and define up to four legacy interrupt messages for the multi-function device. For the single function device, only INTA may be used. All functions Function 0 to Function N of the multi-function device may use INTx messages. When a device implements a single legacy interrupt message, it should be INTA. When two legacy interrupt messages are implemented, it should be INTA and INTB. For a multi-function device, all functions Function 0 to Function N may use the same INTx, or each may have its own (up to a maximum of four), or any combination thereof.

According to an embodiment, the configuration space of all functions Function 0 to Function N may be included in a PCIe capability structure. For example, the PCIe capability structure may include a PCIe capability register, a device capabilities register, a device control register, a device status register, a link capabilities register, a link control register, a link status register, a slot capabilities register, a slot control register, a slot status register, a root control register, a root capabilities register, a root status register, a device capabilities 2 register, a device control 2 register, a device status 2 register, a link capabilities 2 register, a link control 2 register, a link status 2 register, a slot capabilities 2 register, a slot control 2 register, a slot status 2 register, a root controller 2 register, a root capabilities 2 register, a root status 2 register, and the like.

The PCIe capability register may identify a PCIe device function type and associated capabilities. According to an embodiment, the PCIe capability register may be a 16-bit register. The bits 3:0 of the PCIe capability register may a capability version field. The capability version field may have a read only attribute. More specifically, the capability version field may indicate a PCI-SIG defined PCI Express function structure version number. The bits 7:4 of the PCIe capability register may be a device/port type field. The device/port type field may have a read only attribute. More specifically, the device/port type field may indicate a specific type of a function. In the device/port type field, functions of a multi-function device may refer to different types. The bit 8 of the PCIe capability register may be a slot implemented field. The slot implemented field may have a hardware initialized (HwInit) attribute. When the slot implemented field is set, it may mean that a link connected to this port is connected to a slot. The bits 13:9 of the PCIe capability register may be an interrupt message number field. The interrupt message number field may have a read only attribute. The interrupt message number field may indicate which MSI/MSI-X vector is used for an interrupt message generated in association with a status bit with a function structure. For MSI, a value of the interrupt message number field may indicate an offset between a base message data and the generated interrupt message. For MSI-X, the value of the interrupt message number field may indicate an MSI-X table entry used to generate the interrupt message. When both MSI and MSI-X are implemented, MSI and MSI-X may be permitted to use different vectors though software must enable only one mechanism at a time. For example, when MSI-X is enabled, the value of the interrupt message number field may indicate an MSI-X vector. When MSI is enabled, or none of them is enabled, the value of the interrupt message number field may indicate a vector for MSI. When both MSI and MSI-X are enabled at the same time, the value in the interrupt message number field may not be defined. The bit 14 of the PCIe capability register may have a read only attribute and may not be defined.

The device capability register may identify PCIe device function-specific capabilities. According to an embodiment, the device capability register may be a 32-bit register. The bits 2:0 of the device capability register may be a maximum payload size supported (Max_Payload_Size Supported) field. The max payload size supported field may have a read only attribute. The max payload size supported field may indicate a maximum payload size that supports TLP. The functions Function 0 to Function N of the multi-function device may have different values for this field. The bits 4:3 of the device capability register may be a maximum payload size supported (Max_Payload_Size Supported) field. The phantom functions supported field may have a read only attribute. The phantom functions supported field may indicate the support for use of unclaimed function numbers to extend the number of outstanding transactions allowed by logically combining the unclaimed functions numbers with a tag identifier.

The device control register may control a PCIe device-specific parameter. According to an embodiment, the device control register may be a 16-bit register. The bit 0 of the device controller register may be a correctable error reporting enable field. The correctable error reporting enable field may control sending ERR_COR messages in conjunction with other bits. For the multi-function device, the correctable error reporting enable field may control error reporting of each function (Function 0 to Function N). The correctable error reporting enable field may have a read-write (RW) attribute. The bit 1 of the device controller register may be a non-fatal correctable error reporting enable field. The non-fatal correctable error reporting enable field may control sending ERR_NONFATAL messages in conjunction with other bits. For the multi-function device, the non-fatal error reporting enable field may control error reporting for each function (Function 0 to Function N) from point-of-view of each function (Function 0 to Function N). The non-fatal error reporting enable field may have a read-write attribute. The bit 2 of the device controller register may be a fatal error reporting enable field. The fatal correctable error reporting enable field may control sending ERR_FATAL messages in conjunction with other bits. For the multi-function device, the fatal error reporting enable field may control error reporting for each function (Function 0 to Function N) from a point-of-view of each function (Function 0 to Function N). The fatal error reporting enable field may have a read-write attribute. The bit 3 of the device controller register may be an unsupported request reporting enable field. The unsupported request reporting enable field may control signaling of unsupported request errors by sending error messages in conjunction with other bits. For the multi-function device, the unsupported request reporting enable field may control error reporting for each function (Function 0 to Function N) from point-of-view of each function (Function 0 to Function N). The unsupported request reporting enable field may have a read-write attribute. The bits 7:5 of the device control register may be a maximum payload size (Max_Payload_Size) field. The max payload size field may set the maximum TLP payload size for a function. As a receiver, a function must not generate TLPs exceeding a set value. As a transmitter, permissible values that may be indicated by the max payload size supported field of the function capability register. All functions Function 0 to Function N of the multi-function device may have different values in the max payload size field. For Alternative Routing Identifier (ARI) devices, the max payload size field may be determined solely by the setting in the zeroth function Function 0. The settings in the other functions may always return whatever values software programmed for each, but otherwise may be ignored by components. The max payload size field may have a read-write attribute.

The device status register may provide information about a PCIe device (function)-specific parameter. According to an embodiment, the device status register may be a 16-bit register. The bit 0 of the device status register may be a correctable error detected field. The correctable error detected field may indicate that correctable errors are detected. The correctable errors may be recorded in the error detected field regardless of whether error reporting is enabled in the device control register. For a multi-function device, each function (Function 0 to Function N) may indicate an error status that is perceived by each function (Function 0 to Function N). The correctable error detected field may have a Write-1-to-clear status (RW1C) attribute. The bit 1 of the device status register may be a non-fatal correctable error detected field. The non-fatal correctable error detected field may indicate that non-fatal errors are detected. The non-fatal errors may be recorded in the error detected field regardless of whether error reporting is enabled in the device control register. For a multi-function device, each function (Function 0 to Function N) may indicate an error status that is perceived by each function (Function 0 to Function N). A non-fatal error detected field may have an RW1C attribute. The bit 2 of the device status register may be a fatal error detected field. The fatal error detected field may indicate status of fatal errors detected. The fatal errors may be recorded in the fatal error detected field regardless of whether error reporting is enabled in the device control register. For a multi-function device, each function (Function 0 to Function N) may indicate an error status that is perceived by each function (Function 0 to Function N). A fatal error detected field may have an RW1C attribute. The bit 3 of the device status register may be an unsupported request field. The unsupported request detected field may indicate that a function has received unsupported requests. Errors may be recorded in the request detected field regardless of whether error reporting is enabled in the device control register. For a multi-function device, each function (Function 0 to Function N) may indicate an error status that is perceived by each function (Function 0 to Function N). The unsupported request detected field may have an RW1C attribute. The bit 6 of the device status register in an emergency power reduction detected field which may be set when the functions Function 0 to Function N enter emergency power reduction state. Each time a condition for which an emergency power reduction state is input exists, the functions Function 0 to Function N may maintain the emergency power reduction state. The multi-function device coupled to an upstream port may set the emergency power reduction detected field in all functions Function 0 to Function N that support the emergency power reduction state. The emergency power reduction detected field may have an RW1C attribute.

The link capability register may identify PCIe link-specific capability. For a multi-function device, field values of the link capability register of all functions Function 0 to Function N may be the same.

According to an embodiment, the configuration space of each of the plurality of functions Function 0 to Function N may include Message Signaled Interrupt (MSI) Capability Structures, Secondary PCI Express Extended Capability, Data Link Feature Extended Capability, and ACS Extended Capability. All functions Function 0 to Function N that generate interrupts may implement MSI or MSI-X.

In addition, the configuration space of each of the plurality of functions Function 0 to Function N may include various registers associated with the multi-function device in addition to the above-described registers.

According to an embodiment, the plurality of functions Function 0 to Function N may perform an error handling operation. For example, the plurality of functions Function 0 to Function N may perform an error handling operation using advanced error reporting (AER). For example, when an error is detected, the plurality of PCIe functions PCIe function 0 to PCIe function N may perform an error handling operation by indicating an error status through a completion status field, by sending an error message to a root complex, or by error forwarding.

According to an embodiment, the plurality of functions Function 0 to Function N may perform a function level reset (FLR) operation. For example, the plurality of functions Function 0 to Function N may perform a function level reset (FLR) operation at the request of a host.

A function level reset mechanism may enable software to quiesce and reset endpoint hardware with function-level granularity.

The function level reset may apply to each of the functions Function 0 to Function N. Only the target function (Function 0 to Function N) may be affected by a function level reset operation. The link status may not be affected by the function level reset.

The function level reset may modify the statuses of the functions Function 0 to Function N.

For example, except for sticky-type registers (ROS, RWS, RW1CS), HwInit type defined registers, and other such fields or registers, function registers and function-specific state machines may be set to initial values of function registers and function-specific state machines.

In addition, function level reset may modify function states such as a captured slot power limit value of a device capability register, a captured slot power limit scale of the device capability register, Max_Payload_Size of a device control register, Active State Power Management (ASPM) control of a link control register, a Read Completion Boundary (RCB) of the link control register, Common Clock Configuration of the link control register, Extended Synch of the link control register, Enable Clock Power Management of the link control register, Hardware Autonomous Width Disable of the link control register, Hardware Autonomous Speed Disable of a link control 2 register, a Link Equalization 8.0 GT/s request of a link state 2 register, a link equalization request 16.0 GT/s of a 16.0 GT/s state register, a Lane Equalization Control register of a Secondary PCI Express Extended Capability structure, a 16.0 GT/s Lane Equalization Control register of a Physical Layer 16.0 GT/s Extended Capability structure, a Virtual Channel Capability structure of all registers, all registers of a Multi-Function Virtual Channel Capability structure, all registers of a Data Link Feature Extended Capability structure, all registers of a Physical Layer 16.0 GT/s Extended Capability structure, and all registers of Lane Margining of a Receiver Extended Capability structure.

Controls that enable the functions Function 0 to Function N to initiate requests on PCI express may be cleared, including Bus Master Enable, MSI interrupt enable, and the like, effectively causing the functions Function 0 to Function N to become quiescent on the link.

Port state machines associated with link functionality including those in the physical and data link layers may not be reset by FLR, and VCO may remain initialized following an FLR. Any outstanding INTx interrupt asserted by the functions Function 0 to Function N may be deasserted by sending the corresponding Deassert_INTx Message prior to starting the FLR.

When the FLR is initiated to the functions Function 0 to Function N of the PCIe device 400, if another Function continues to assert a matching INTx, no Deassert_INTx Message will be transmitted.

After an FLR has been initiated by writing a 1b to the Initiate Function Level Reset bit, the functions Function 0 to Function N must complete the FLR within 100 ms. If software initiates an FLR when the transactions pending bit is 1b, then software must not initialize the functions Function 0 to Function N until allowing adequate time for any associated Completions to arrive, or to achieve reasonable certainty that any remaining completions will never arrive. Thus, the computing system may allow as much time as provided by the pre-FLR value for Completion Timeout. If completion timeouts are disabled on the functions Function 0 to Function N when the FLR is issued, then the delay may be system dependent but may be 100 ms or more. When a function ready status is implemented, a computing system may issue a configuration request to the functions Function 0 to Function N right after receiving a function level reset message indicating that it is completely prepared for configuration.

Upon receipt of an FLR, the functions Function 0 to Function N may either clear all transaction statuses including Transactions Pending, or may set the Completion Timeout to its default value so that all pending transactions may time out during FLR execution. The transactions pending bit may be clear upon completion of the FLR.

Since FLR modifies Function state, the behavior of FLR may be specified using a set of criteria that, when applied to the Functions Function 0 to Function N, show that the functions Function 0 to Function N have them. The following criteria must be applied using Function-specific knowledge to evaluate the functions Function 0 to Function N's behavior in response to an FLR.

The function (Function 0 to Function N) may not give the appearance of an initialized adapter with an active host on any external interfaces controlled by the corresponding function (Function 0 to Function N). The steps needed to terminate activity on the external interfaces may be exceptional. For example, a network adapter may not respond to queries that would require adapter initialization by the host system or interaction with an active host system, but may be permitted to perform an action that it is designed to be perform without host initialization or interaction. When the network adapter includes multiple functions Function 0 to Function N that operate on the same external network interface, this rule may affect only those aspects associated with particular function reset by the FLR.

The functions Function 0 to Function N may not retain within itself software readable state that potentially includes secret information associated with any preceding use of the functions Function 0 to Function N. Main host memory assigned to the functions Function 0 to Function N may not be modified by the functions Function 0 to Function N. For example, a function (Function 0 to Function N) with internal memory readable directly or indirectly by host software may clear or randomize that memory.

The function (Function 0 to Function N) may return to a state such that normal configuration of the function (Function 0 to Function N)'s PCI Express interface may cause it to be useable by drivers normally associated with the functions Function 0 to Function N.

When an FLR is initiated, the targeted functions Function 0 to Function N must behave as follows:

The functions Function 0 to Function N may return the completion for the configuration write that initiates the FLR operation, and may then initiate the FLR.

While the FLR is in progress, when a request arrives, the request may be permitted to be silently discarded without logging or signaling it as an error. In addition, if a completion arrives, the completion may be permitted to be handled as an unexpected completion or to be silently discarded without logging or signaling it as an error.

When the function (Function 0 to Function N) is required to complete the FLR operation within a time limit, a subsequent function-specific initialization sequence may require an additional time. When the additional time is required, the function (Function 0 to Function N) may return a configuration request retry status (CRS) completion status when a configuration request is received after the time limit. After the function (Function 0 to Function N) responds to the configuration request with a completion status other than CRS, it may not be permitted to return the CRS until it is reset again.

Figure 5:
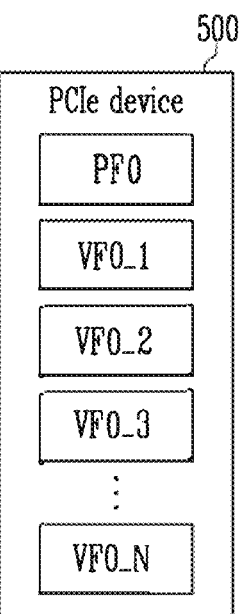
FIG. 5 illustrates an example of a PCIe device that is single root input/output virtualization (SR-IOV) capable according to an embodiment of the present disclosure.

FIG. 5 illustrates an example of a single root input/output virtualization (SR-IOV) capable PCIe device 500 according to an embodiment of the present disclosure.

The PCIe device 500 as shown in FIG. 5 may represent one of the PCIe device 2000 as shown in FIG. 1 and the PCIe devices 2000-1 to 2000-3 as shown in FIGS. 2 and 3.

For example, FIG. 5 may represent the PCIe device 500 to which SR-IOV capability is applied.

Referring to FIG. 5, the PCIe device 500 may include a physical function 0 PF0 and a plurality of virtual functions VF0_1 to VF0_N associated with the physical function 0 PF0. The virtual function 0, 1 VF0_1 may refer to a first virtual function that is associated with the physical function 0 PF0. In the same manner, the virtual function 0, N VF0_N may refer to an $N^{th}$ virtual function that is associated with the physical function 0 PF0. According to an embodiment, the configuration space, the register setting process, the error handling operation, and the function level reset operation as described above with reference to FIG. 4 may apply to the physical function 0 PF0.

The physical function 0 PF0 may support SR-IOV capability. According to an embodiment, after a reset operation, the physical function 0 PF0 may disable the SR-IOV capability. To discover the page sizes supported by the physical function 0 PF0, and the plurality of virtual functions VF0_1 to VF0_N, Supported Page Sizes configuration field may be read.

The plurality of virtual functions VF0_1 to VF0_N may share a plurality of common configuration space fields with the physical function 0 PF0. Sharing may reduce the hardware resource requirements to implement the plurality of virtual functions VF0_1 to VF0_N. For example, the plurality of virtual functions VF0_1 to VF0_N may use the same configuration mechanisms and header types as the physical function 0 PF0. In addition, the plurality of virtual functions VF0_1 to VF0_N may share a VF BAR set. In addition, the plurality of virtual functions VF0_1 to VF0_N may share a VF memory space enable (MSE) bit that controls access to VF memory space. In other words, when the VF MSE bit is cleared, the memory mapped space allocated for all virtual functions VF0_1 to VF0_N may be disabled.

The InitialVFs and TotalVFs fields included in the SR-IOV capability may be used to discover the maximum number of virtual functions that may be associated with the physical function 0 PF0. For example, when the PCIe device 500 does not support VF migration, TotalVFs and InitialVFs may contain the same value. On the other hand, when the PCIe device 500 supports VF migration, if TotalVFs is read, the physical function 0 PF0 may return the number of virtual functions that may be assigned to the physical function 0 PF0. In addition, when InitialVFs is read, the physical function 0 PF0 may return the initial number of virtual functions assigned to the physical function 0 PF0.

The physical function 0 PF0 and the plurality of virtual functions VF0_1 to VF0_N may be assigned unique routing IDs. The Routing ID for each virtual function (VF0_1 to VF0_N) may be determined using the routing ID of the physical function 0 PF0 and fields included in the SR-IOV capability of the physical function 0 PF0.

All PCIe and SR-IOV configuration access may be carried out through a trusted software component such as a virtualization intermediary or a single root PCI manager.

According to an embodiment, the physical function 0 PF0 and the plurality of virtual functions VF0_1 to VF0_N may contain physical resources including configuration space. Each virtual function (VF0_1 to VF0_N) may contain a non-shared set of physical resources required to deliver Function-specific services, e.g., resources such as work queues, data buffers, etc. These resources may be directly accessed by a system image without requiring intervention of the virtualization intermediary or the single root PCI manager.

One or more virtual functions VF0_1 to VF0_N may be assigned to each system image. The physical function 0 PF0 and the plurality of virtual functions VF0_1 to VF0_N may include ATC.

According to an embodiment, the physical function 0 PF0 may be used to manage device-specific functionality such as internal resource allocation to each virtual function (VF0_1 to VF0_N), VF arbitration to shared resources such as the PCIe Link or the Function-specific Link (e.g., a network or storage Link), etc.

According to an embodiment, the configuration space of the physical function 0 PF0 may include the SR-IOV extended capability. For example, the SR-IOV extended capability may include an SR-IOV Extended Capability Header register, an SR-IOV Capabilities register, an SR-IOV Control register, an SR-IOV Status register, an InitialVFs register, a TotalVFs register, a NumVFs register, a Function Dependency Link register, a First VF Offset register, a VF Stride register, a VF Device ID register, a Supported Page Sizes register, a System Page Size register, a VF BAR0, VF BAR1, . . . , a VF BAR5 register, and a VF Migration State Array Offset register.

The SR-IVO control register may include a virtual function (VF) Enable field.

Virtual function enable may manage the assignment of the plurality of virtual functions VF0_1 to VF0_N with respect to the associated physical function 0 PF0. When the virtual function Enable is set, the plurality of virtual functions VF0_1 to VF0_N associated with the physical function 0 PF0 may be accessible in the PCI Express fabric. When the virtual function enable is set, the virtual functions VF0_1 to VF0_N may respond to and issue PCI Express transactions following rules for PCI Express Endpoint Functions.

When the virtual function enable is clear, the plurality of virtual functions VF0_1 to VF0_N may be disabled and may not be visible in the PCI Express fabric. Requests to these virtual functions VF0_1 to VF0_N may receive Unsupported Request (UR) and may not issue PCI Express transactions.

To allow components to perform internal initialization, after changing the virtual function enable bit from 0 to 1, the system may not be permitted to issue requests to the virtual functions VF0_1 to VF0_N which are enabled by the corresponding VF Enable bit until one of the following is true: At least 100 ms has passed; an FRS message has been received from the physical function 0 PF0 with a reason code of the virtual function Enabled; and at least VF Enable time has passed. The VF Enable time may be either a reset time value in the readiness time reporting capability associated with the virtual functions VF0_1 to VF0_N, or a value determined by system software/firmware.

The root complex and/or system software may allow at least 1.0 seconds after setting the VF Enable bit, before it may determine that the virtual function (VF0_1 to VF0_N) which fails to return a successful completion status for a valid configuration request is broken. After setting the VF Enable bit, the virtual functions VF0_1 to VF0_N enabled by the corresponding VF Enable bit may be permitted to return a CRS status to configuration requests up to the 1.0 s limit, when they are not ready to provide a successful completion status for a valid configuration request. After the physical function 0 PF0 transmits an FRS Message with a reason code of VF Enabled, no virtual functions VF0_1 to VF0_N associated with the corresponding physical function 0 PF0 is permitted to return CRS without an intervening VF disable or other valid reset conditions. After returning a successful completion to any request, the virtual functions VF0_1 to VF0_N may not be permitted to return CRS without an intervening VF disable or other valid reset conditions.

Since the virtual functions VF0_1 to VF0_N do not have an MSE bit (MSE in the virtual functions VF0_1 to VF0_N is controlled by the VF MSE bit in the SR-IOV capability in the physical function 0 PF0), it may be possible for software to issue a memory request before the virtual function (VF0_1 to VF0_N) is ready to handle the MSE bit. Therefore, Memory Requests may not be issued to the virtual functions VF0_1 to VF0 N until at least one of the following conditions has been met:

The virtual function (VF0_1 to VF0_N) has responded successfully to a Configuration Request. (CRS is not returned).

After issuing an FLR to the VF, at least one of the following is true: (1) at least 1.0 s has passed since the FLR was issued, (2) the virtual functions VF0_1 to VF0_N support Function Readiness Status and, after the FLR is issued, an FRS Message from the virtual functions VF0_1 to VF0_N with a reason code for FLR Completed has been received, or (3) at least FLR time has passed since the FLR is issued. FLR Time may be the FLR Time value in the Readiness Time Reporting capability associated with the virtual functions VF0_1 to VF0_N or a value determined by system software/firmware.

After setting VF Enable in the physical function 0 PF0, at least one of the following is true: (1) at least 1.0 s has passed since the VF Enable was set, (2) the physical function 0 PF0 supports Function Readiness Status and, after VF Enable is set, an FRS message from the physical function 0 PF0 with the reason code for the virtual function enabled has been received, or (3) minimum virtual function enable time has passed after the virtual function Enable is set. The virtual function enable time may be a reset time value in the Readiness Time Reporting capability associated with the virtual functions VF0_1 to VF0_N or a value determined by system software/firmware.

The virtual functions VF0_1 to VF0_N may be permitted to silently drop memory requests after an FLR is issued to the virtual functions VF0_1 to VF0_N or VF Enable has been set in the associated physical function 0 PF0 in the SR-IOV capability until the virtual functions VF0_1 to VF0_N respond successfully (without returning CRS) to any request.

Clearing VF Enable may effectively destroy the virtual functions VF0_1 to VF0_N. Setting VF Enable may effectively create the virtual functions VF0_1 to VF0_N. Setting VF Enable after it has previously been cleared may result in a new set of virtual functions VF0_1 to VF0_N. When the physical function 0 PF0 is in a DO power state, the new virtual functions VF0_1 to VF0_N may be in the $DO_{uninitialized}$ state. If the physical function 0 PF0 is in a lower power state, a behavior may be undefined When VF Enable is clear, the physical function 0 PF0 that supports FRS may send an FRS Message with FRS Reason VF Disabled to indicate when this operation has been completed. The physical function 0 PF0 may not be permitted to send this message when there are outstanding non-posted requests issued by the physical function 0 PF0 or any of the virtual functions VF0_1 to VF0_N associated with the physical function 0 PF0. The FRS message may only be sent after these requests have been completed (or timed out).

When software Clears VF Enable, no field in the SR-IOV Extended Capability or the VF Migration State Array may be accessed until either:

At least 1.0 s has elapsed after VF Enable was cleared, or

The physical function 0 PF0 supports FRS and after VF enable was cleared, an FRS Message has been received from the physical function 0 PF0 with a reason code of VF Disabled.

InitialVFs registers may indicate to SR-PCIM the number of virtual functions VF0_1 to VF0_N that are initially associated with the physical function 0 PF0.

TotalVFs registers may indicate the maximum number of virtual functions VF0_1 to VF0_N that may be associated with the physical function 0 PF0.

NumVFs registers may control the number of virtual functions VF0_1 to VF0_N that are visible.

Virtual function base address registers may define base address registers (BARs) of the virtual functions VF0_1 to VF0_N. When the virtual function address register is written with an actual address value, and VF Enable and VF MSE are set, the BAR may map NumVFs BARs.

According to an embodiment, the configuration space of the physical function 0 PF0 and the virtual functions VF0_1 to VF0_N may include a type 0 configuration space header, a PCIe capability register, a PCI standard capability register, a PCIe extended capability register, and the like.

According to an embodiment, register field values included in the configuration space of the virtual functions VF0_1 to VF0_N may be subordinate to or independent from register field values included in the configuration space of the physical function 0 PF0. For example, the register field values included in the configuration space of the virtual functions VF0_1 to VF0_N may have a value of 0 (zero) when they are subordinate to the register field values included in the configuration space of the physical function 0 PF0. The virtual functions VF0_1 to VF0_N may perform a configuration operation according to the register field values of the associated physical function 0 PF0.

According to an embodiment, the plurality of virtual functions VF0_1 to VF0_N may perform an error handling operation. For example, when the physical function 0 PF0 handles an error using advanced error reporting, the virtual functions VF0_1 to VF0_N may also handle an error using advanced error reporting.

According to an embodiment, the plurality of virtual functions VF0_1 to VF0_N may perform a reset operation.

For example, the virtual functions VF0_1 to VF0_N may complete internal initialization when one of the following occurs:

The virtual function (VF0_1 to VF0_N) has responded successfully to a configuration request (CRS is not returned).

After issuing a function level reset to the virtual functions VF0_1 to VF0_N, one of the following is true: (1) at least 1.0 s has passed, (2) an FRS message from the virtual functions VF0_1 to VF0_N with a reason code FLR completed has been received, or (3) minimum FLR time has passed. The function level reset time may be a function level reset time value in the Readiness Time Reporting capability associated with the virtual functions VF0_1 to VF0_N or a value determined by system software/firmware.

After setting VF Enable in the physical function 0 PF0, at least one of the following may be true: (1) at least 1.0 s has passed since VF Enabled was set, or (2) after VF Enabled was set, an FRS Message has been received from the physical function 0 PF0 with a reason code of VF enabled.

Figure 6:
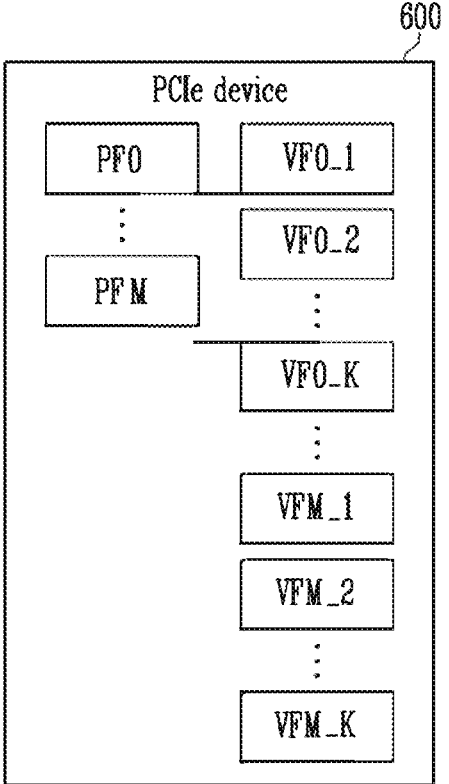
FIG. 6 illustrates another example of a PCIe device using SR-IOV according to an embodiment of the present disclosure.

FIG. 6 illustrates another example (a PCIe device 600) of a PCIe device using SR-IOV according to an embodiment of the present disclosure.

The PCIe device 600 as shown in FIG. 6 may correspond to the PCIe device 2000 as shown in FIG. 1 or one of the PCIe devices 2000-1 to 2000-3 as shown in FIGS. 2 and 3.

For example, FIG. 6 may represent the PCIe device 600 to which SR-IOV capability is applied.

The PCIe device 600 provides a plurality of physical functions PF0 to PFM and a plurality of virtual functions VF0_1 to VFM_K associated with the plurality of physical functions PF0 to PFM. According to an embodiment, the configuration space, the register setting process, the error handling operation, and the function level reset operation as described above with reference to FIG. 4 may apply to the plurality of physical functions PF0 to PFM. In addition, the configuration space described with reference to physical function 0 PF0 of FIG. 5 may apply to the plurality of physical functions PF0 to PFM. In addition, the configuration space, the error handling operation, and the reset operation described with respect to the virtual functions VF0_1 to VF0_N of FIG. 5 may apply to the plurality of virtual functions VF0_1 to VFM_K.

The plurality of physical functions PF0 to PFM may include SR-IOV capability, and zero (0) or more virtual functions may apply to the plurality of physical functions PF0 to PFM. The number of virtual functions assigned to each physical function may vary.

When ARI capability is supported, the plurality of physical functions PF0 to PFM and the plurality of virtual functions VF0_1 to VFM_K may be assigned to function groups.

According to an embodiment, the plurality of physical functions PF0 to PFM may be of the same device type. For example, the plurality of physical functions PF0 to PFM may provide the same network device or the same storage device functionality.

According to an embodiment, the plurality of physical functions PF0 to PFM may indicate different device types. For example, one of the plurality of physical functions PF0 to PFM may represent a network device, and another of the physical functions PF0 to PFM may represent an encryption device.

In situations where there is a usage model dependency between device types (such as for each virtual function that is a network device type, each system image also requires a virtual function that is an encryption device type) the SR-IOV capability may provide a process to indicate these dependencies. The number of physical functions and the number of virtual functions may vary based on usage model requirements.

According to an embodiment, using the Alternative Routing Identifier (ARI) capability, the PCIe device 600 may support up to 256 physical functions. Function Number assignment may be implementation specific. The physical functions PF0 to PFM may only be associated with the PCIe device 600's captured bus number. The PCIe device 600 that may use SR-IOV capability may consume two or more bus numbers. The physical functions PF0 to PFM may be associated with any bus number (the captured Bus Number plus any additional bus numbers configured by software) within a bus number range of the PCIe device 600. Use of multiple bus numbers may enable the PCIe device 600 to support a very large number of virtual functions (up to the size of the routing ID space minus the bits used to identify intervening busses). When software does not configure sufficient additional bus numbers, then the virtual functions implemented for the additional bus numbers may not be visible.

Recently, there is an increasing demand for multi-function products for directly connecting a host and a PCIe device and 1:1 mapping between a system image and a function of the PCIe device. Examples of kinds of the multi-function products may include a multi-function device including a plurality of physical functions and an SR-IOV capable device. A multi-function device may not suffer performance degradation but may have weak security. In addition, an SR-IOV capable device may have strong security but suffer performance degradation. Therefore, every user may require different PCIe device types. A user may request that one PCIe device use both multi-function and virtual function. Therefore, in an embodiment of the present disclosure, a PCIe device including common functions operating in various function types may be shown.

Figure 7:
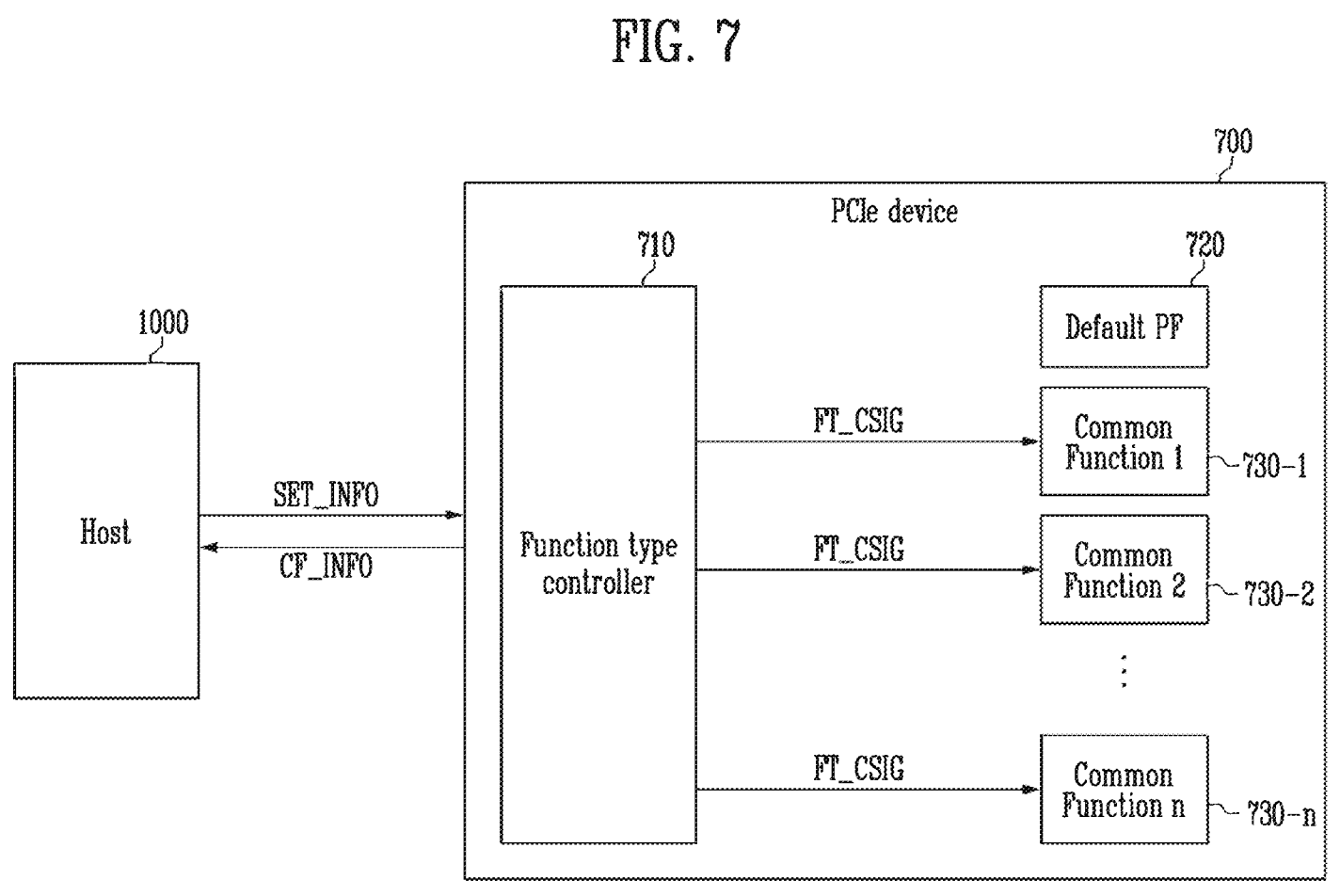

FIG. 7 illustrates a PCIe device 700 according to an embodiment of the present disclosure.

Referring to FIG. 7, the PCIe device 700 may include a function type controller 710, a default physical function 720, and a plurality of common functions 730-1 to 730-n. The PCIe device 700 may correspond to the PCIe device 2000 as shown in FIG. 1 or to one of the PCIe devices 2000-1 to 2000-3 as shown in FIGS. 2 and 3.

The function type controller 710 may determine function types of a plurality of common functions 730-1 to 730-n according to function type setting information SET_INFO.

According to an embodiment, the function type controller 710 may determine one of the plurality of function types for a function type of each of the common functions 730-1 to 730-n. The plurality of function types may include a physical function type, a virtual function type, and a disable function type in which operations are disabled. The function type controller 710 may determine the respective function type of each of the common functions 730-1 to 730-n as one of the physical function type, the virtual function type and the disable function type.

The function type setting information SET_INFO may indicate a respective function type to be set to each of the common functions 730-1 to 730-n. For example, the function type setting information SET_INFO may include at least one of the number of common functions to be configured as a physical function type, the number of common functions to be configured as a virtual function type, the number of common functions to be configured as a disable function type, among the plurality of common functions 730-1 to 730-n, and function type mapping information indicating a mapping relationship between each of the plurality of common functions 730-1 to 730-n and a respective function type. The function type setting information SET_INFO may be provided from the host 1000, or may be stored in advance in firmware included in the PCIe device 700 during the manufacturing process of the PCIe device 700.

In an embodiment, the function type controller 710 may receive the function type setting information SET_INFO from the host 1000. For example, the host 1000 may provide the function type setting information SET_INFO to the function type controller 710 by using a technology such as a vendor-specific capability message, a vendor-defined capability, a new PCIe capability defined by a user, Management Component Transport Protocol (MCTP) over System Manager bus (SMbus), MCTP over PCIe, or the like.

According to an embodiment, the function type controller 710 may generate a function type control signal FT_CSIG based on the function type setting information SET_INFO. The function type control signal FT_CSIG may be provided to determine the function types of the common functions 730-1 to 730-n and cause the common functions 730-1 to 730-n to operate according to the determined function types. The function type controller 710 may provide the function type control signal FT_CSIG to the plurality of common functions 730-1 to 730-n to determine the function types of the plurality of common functions 730-1 to 730-n.

According to an embodiment, after the function type of each of the plurality of common functions 730-1 to 730-n is determined, the function type controller 710 may provide the host 1000 with the determined function type information CF_INFO of the plurality of common functions 730-1 to 730-n.

According to an embodiment, the function type controller 710 may change the function type of a common function which is configured as a physical function type into a virtual function type based on the function type setting information SET_INFO. In addition, the function type controller 710 may change the function type of a common function which is configured as a virtual function type into a physical function type based on the function type setting information SET_INFO.

For example, after the function type controller 710 resets the plurality of common functions 730-1 to 730-n in the next link up operation, then based on the function type setting information SET_INFO, the function type controller 710 may change the function type of a common function which is configured on reset as a physical function type into a virtual function type, or may change the function type of a common function configured on reset as a virtual function type into a physical function type.

The default physical function 720 may be a PCIe function. The default physical function 720 may have the same configuration as the zeroth function Function 0 as described above with reference to FIG. 4, or the physical function 0 PF0 as described above with reference to FIGS. 5 and 6.

The plurality of plurality of common functions 730-1 to 730-n may be PCIe functions.

According to an embodiment, the plurality of common functions 730-1 to 730-n may be an independent operation unit for providing physical resources included in the PCIe device 700. Each of the plurality of common functions 730-1 to 730-n may be allocated some of the physical resources included in the PCIe device 700. The plurality of common functions 730-1 to 730-n may be mapped to the system images of the host 1000 and provide the allocated physical resources to the system images.

According to an embodiment, the plurality of common functions 730-1 to 730-n may perform operations associated with a PCIe interface according to the determined function types. The operations associated with the PCIe interface may include a data processing operation of receiving a command from the host 1000 and providing the host 1000 with a response to the command, an error handling operation of detecting an error and reporting the detected error, a power management operation of managing the power of a function, and a reset operation.

Therefore, according to an embodiment of the present disclosure, by providing a PCIe device including a plurality of common functions operating according to respective determined function types, a PCIe device gate count may be reduced to minimize power consumption and device size.

Figure 8:
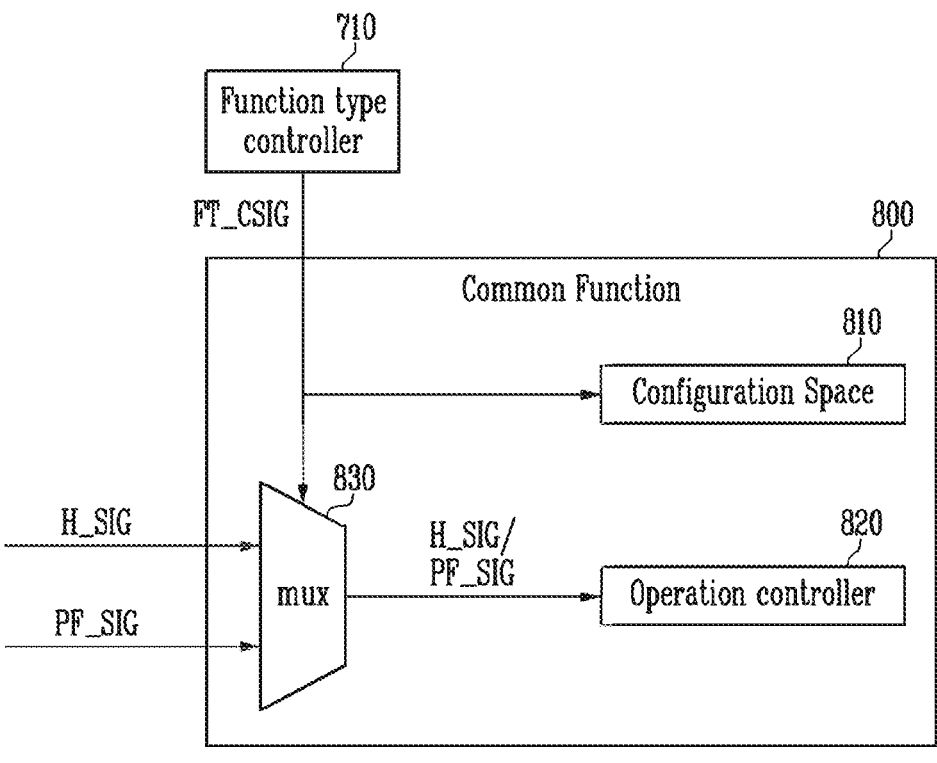
FIG. 8 illustrates a common function according to an embodiment of the present disclosure.

FIG. 8 illustrates a common function 800 according to an embodiment of the present disclosure.

The common function 800 as shown in FIG. 8 may correspond to one of the plurality of common functions 730-1 to 730-n as shown in FIG. 7. Therefore, a description with reference to FIG. 8 may apply to the plurality of common functions 730-1 to 730-n as shown in FIG. 7. In addition, the function type controller 710 shown in FIG. 8 may indicate the function type controller 710 shown in FIG. 7.

Referring to FIG. 8, the common function 800 may include a configuration space 810, an operation controller 820, and a multiplexer (MUX) 830.

The configuration space 810 may include registers for configuring the common function 800 to perform operations associated with a PCIe interface. For example, the common function 800 may perform operations based on information in the configuration space 800. More specifically, the common function 800 may perform operations based on field values of the registers included in the configuration space 810.

According to an embodiment, the configuration space 810 may include information on capabilities available in the common function 800.

According to an embodiment, the function type controller 710 may determine function types of the plurality of common functions 800 by changing the values of the registers included in the configuration space 810 according to the function type setting information SET_INFO.

For example, the function type controller 710 may provide the function type control signal FT_CSIG to the configuration space 810 and change the values of the registers included in the configuration space 810 according to the determined function type. The configuration space 810 may enable registers associated with the determined function type and disable registers not associated with the determined function type. The function type controller 710 may perform clock gating on the disabled registers among the registers included in the configuration space 810.

The operation controller 820 may control the plurality of common functions 800 to perform operations associated with a PCIe interface according to the determined function type. The operation controller 820 may control operations of the common function 800 based on the field values of the enabled registers in the configuration space 810.

The MUX 830 may provide the operation controller 820 with one of the signals externally received based on the determined function type. For example, the function type controller 710 may provide the MUX 830 with the function type control signal FT_CSIG. The MUX 830 may operate based on the determined function type indicated by the function type control signal FT_CSIG.

According to an embodiment, the MUX 830 may provide the operation controller 820 with one of the externally received signals based on the field values of the registers included in the configuration space 810. The MUX 830 may receive a host signal H_SIG from the host 1000 and a physical function signal PF_SIG from a physical function. The host signal H_SIG and the physical function signal PF_SIG may correspond to the operations associated with the PCIe interface. The physical function signal PF_SIG may be provided by the default physical function 720 or another common function having a physical function type.

For example, when the function type of the common function 800 is determined as a physical function type, the common function 800 may operate in a subordinate manner to the default physical function 720, or in an independent manner depending on information included in the configuration space 810. The MUX 830 may receive the physical function signal PF_SIG corresponding to the operation subordinate to the default physical function 720 from the default physical function 720, and may provide the physical function signal PF_SIG to the operation controller 820. In addition, the MUX 830 may receive the host signal H_SIG corresponding to the independent operation from the host 1000 and provide the host signal H_SIG to the operation controller 820.

For example, when the function type of the common function 800 is determined as a virtual function type, the common function 800 may operate in a subordinate manner to the default physical function 720 or another common function having a physical function type, or in an independent manner based on the information included in the configuration space 810. The MUX 830 may receive the physical function signal PF_SIG corresponding to the subordinate operation from the default physical function 720 or another common function, and may provide the physical function signal PF_SIG to the operation controller 820. In addition, the MUX 830 may receive the host signal H_SIG corresponding to the independent operation from the host 1000 and provide the same to the operation controller 820.

Figure 9:
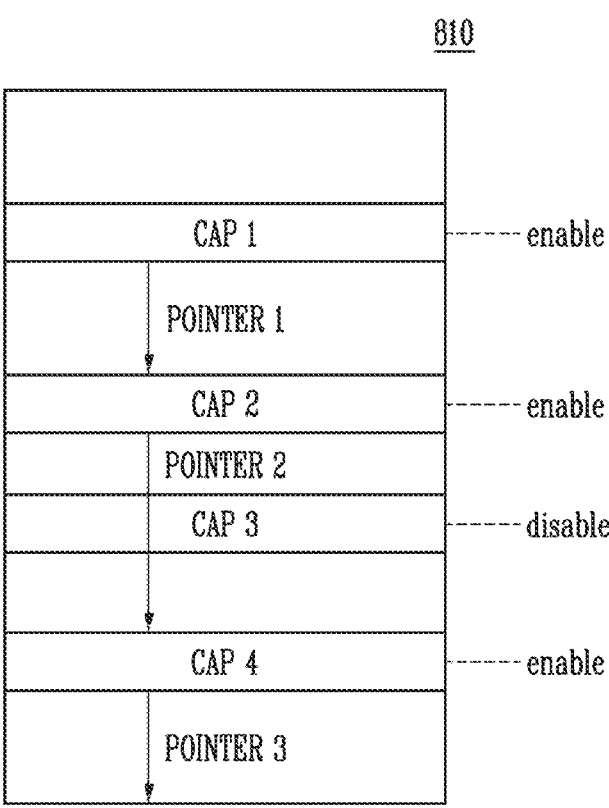
FIG. 9 illustrates a configuration space layout according to an embodiment of the present disclosure.

FIG. 9 illustrates a layout of a configuration space according to an embodiment of the present disclosure.

FIG. 9 may be a diagram showing a layout of the configuration space 810 as shown in FIG. 8.

Referring to FIG. 9, the configuration space 810 may include a plurality of capability registers CAP 1 to CAP 4. Although FIG. 9 shows only four capability registers CAP 1 to CAP 4, more or less than four capability registers may be included in the configuration space 810 according to embodiments. According to an embodiment, the capability may be a PCIe capability.

According to an embodiment, the function type controller 710 may enable capabilities associated with function types determined for the plurality of common functions 800 based on pointer values among register values included in the configuration space 810, the pointer values indicating enabled capabilities. In addition, according to an embodiment, the function type controller 710 may disable capabilities not associated with the function types determined for the plurality of common functions 800 based on the pointer values indicating the capabilities to be enabled.

For example, when the function type of the common function 800 is determined as a physical function type, the function type controller 710 may enable capabilities associated with the physical function type and disable capabilities not associated with the physical function type. In another example, when the function type of the common function 800 is determined as a virtual function type, the function type controller 710 may enable capabilities associated with the virtual function type and disable capabilities not associated with the physical function type. In another example, when the function type of the common function 800 is determined as a disable function type, the function type controller 710 may disable all capabilities.

According to an embodiment, capabilities may be enabled or disabled based on pointer values among the field values of the registers included in the configuration space 810. A pointer value may be an offset with respect to the configuration space 810 indicating a location of the next capability. When there is no next capability, the pointer value may be set to 00h.

For example, it may be assumed that the determined function type of the common function 800 is associated with a first capability register CAP 1, a second capability register CAP 2, and a fourth capability register CAP 4 and is not associated with a third capability register CAP 3. When the first capability register CAP 1 is enabled, a pointer value POINTER 1 may indicate a location of the second capability register CAP 2 which is the next capability register to be enabled. Thereafter, a pointer value POINTER 2 included in the second capability register CAP 2 may indicate a location of the fourth capability register CAP 4 which is the next capability register to be enabled. The third capability register CAP 3 may be disabled since the pointer value POINTER 2 skips the third capability register CAP 3 and indicates the fourth capability register CAP 4. The third capability register CAP 3 may be hidden. When there is no next capability to be enabled, a pointer value POINTER 3 included in the fourth capability register CAP 4 may be set to 00h.

According to an embodiment, the function type controller 710 may perform clock gating on a disabled capability register.

Figure 10:
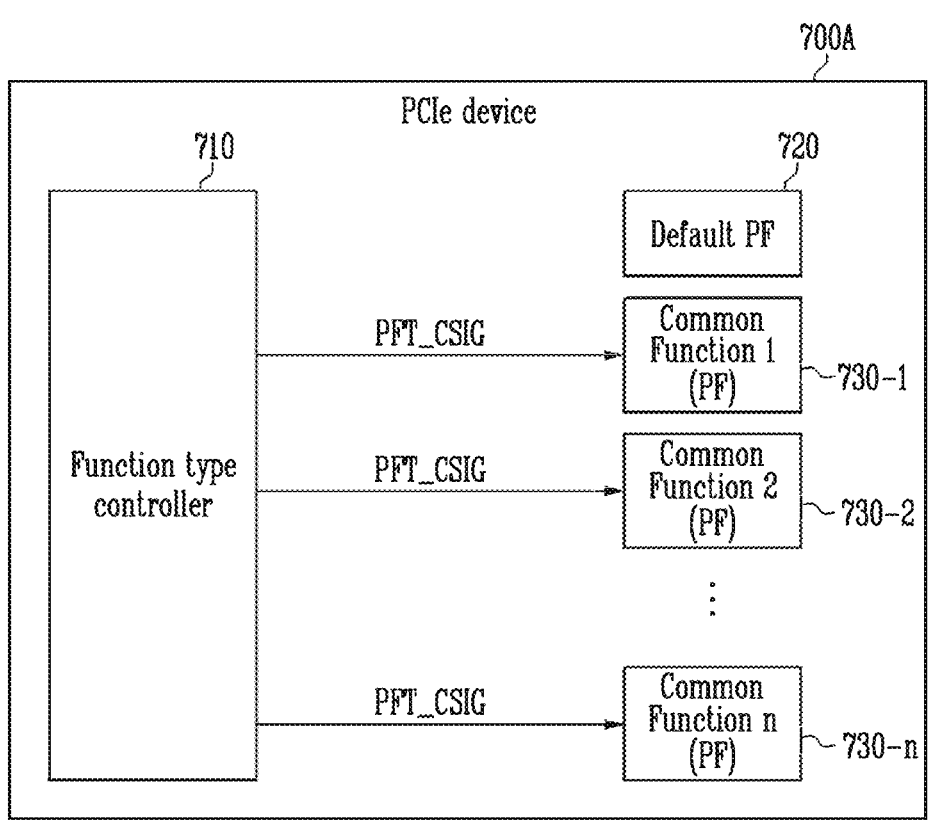
FIG. 10 illustrates an example of a PCIe device according to an embodiment of the present disclosure.

FIG. 10 illustrates an example (a PCIe device 700A) of a PCIe device according to an embodiment of the present disclosure.

The PCIe device 700A as shown in FIG. 10 may be an example of a PCIe device configured as a multi-function device. That is, FIG. 10 shows an example in which the function type of each of the common functions 730-1 to 730-n included in the PCIe device 700A is configured as a physical function type. Therefore, the PCIe device 700A shown in FIG. 10 may operate in the same manner as the multi-function PCIe device 400 described above with reference to FIG. 4.

Referring to FIG. 10, the function type controller 710 may provide the physical function type control signal PFT_CSIG to each of the plurality of common functions 730-1 to 730-n. The physical function type control signal PFT_CSIG may be a control signal for configuring the function type of each of the common functions 730-1 to 730-n as a physical function type. As a result, the function type of each of the plurality of common functions 730-1 to 730-n may be configured as a physical function type. The plurality of common functions 730-1 to 730-n may perform operations associated with a PCIe interface according to the physical function type. In other words, the common functions 730-1 to 730-n may respectively operate like physical functions.

The common functions 730-1 to 730-n each of which is configured as the physical function type may perform operations based on the base address registers (BARs) included in the configuration space of each of the common functions 730-1 to 730-n. According to an embodiment, a base address register may determine the amount of a system memory space necessary for a function and provide a base address for mapping with respect to a function memory space. The base address registers may be mapped to a memory space or an I/O space. For example, the common functions 730-1 to 730-n may have independent addresses through the base address registers and provide addresses to be used when performing operations through the base address registers.

According to an embodiment, the plurality of common functions 730-1 to 730-n may perform PCIe associated operations based on registers corresponding to PCIe associated operations included in the configuration space of the plurality of common functions 730-1 to 730-n, respectively. For example, an error handling operation may be performed based on registers which are associated with the error handling operation and included in the configuration space of each of the common functions 730-1 to 730-n. For example, a power management operation may be performed based on registers which are associated with the power management operation and included in the configuration space of each of the common functions 730-1 to 730-n. In other words, the common functions 730-1 to 730-n each of which is determined as a physical function type may perform operations in an independent manner based on information in their respective configuration spaces.

According to an embodiment, the plurality of common functions 730-1 to 730-n may perform operations based on the information in configuration space of the default physical function 720. In other words, the plurality of common functions 730-1 to 730-n may perform operations based on information in the configuration space of the default physical function 720. For example, management of the link, PCIe functionality shared by the plurality of common functions 730-1 to 730-n, and error reporting in a physical layer may be carried out based on information in the configuration space of the default physical function 720.

According to an embodiment, each common function of the plurality of common functions 730-1 to 730-n may perform a respective reset operation in response to a reset request for that common function from the host 1000, which will be described below in more details with reference to FIG. 16A.

Figure 11:
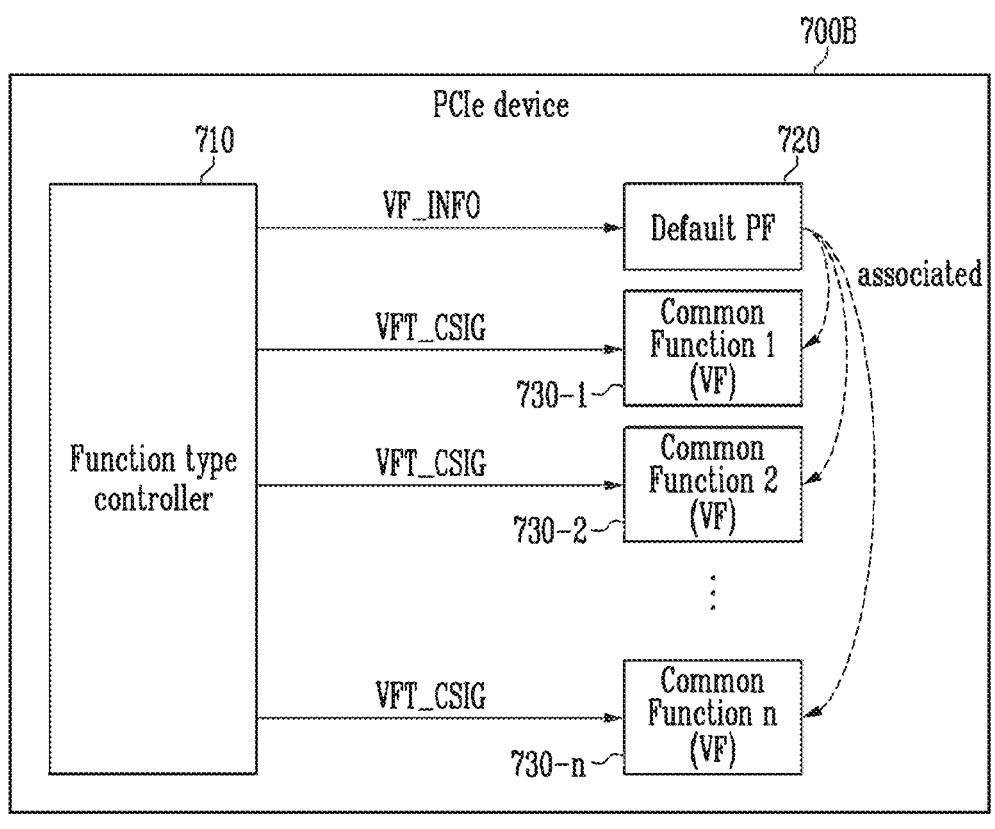
FIG. 11 illustrates another example of a PCIe device according to an embodiment of the present disclosure.

FIG. 11 illustrates another example (a PCIe device 700B) of a PCIe device according to an embodiment of the present disclosure.

The PCIe device 700B as shown in FIG. 11 may be an example of an SR-IOV capable device. That is, FIG. 11 shows an example in which a function type of each of the common functions 730-1 to 730-n included in the PCIe device 700B is determined as a physical function type. Therefore, the PCIe device 700B as shown in FIG. 11 may operate in the same manner as the PCIe device 500 as described above with reference to FIG. 5.

Referring to FIG. 11, the function type controller 710 may provide a virtual function type control signal VFT_CSIG to the plurality of common functions 730-1 to 730-n. The virtual function type control signal VFT_CSIG may be a control signal for determining the function type of each of the common functions 730-1 to 730-n as a virtual function type. As a result, each of the plurality of common functions 730-1 to 730-n may be configured as the virtual function type. The plurality of common functions 730-1 to 730-n may perform operations associated with a PCIe interface according to the virtual function type. In other words, the common functions 730-1 to 730-n may respectively operate like virtual functions.

The plurality of common functions 730-1 to 730-n each of which is configured as the virtual function type may be associated with the default physical function 720. According to an embodiment, the default physical function 720 may be an SR-IOV capability enabled function. The function type controller 710 may provide virtual function information VF_INFO to the associated default physical function 720. The virtual function information VF_INFO may include identification information of common functions operating as a virtual function type, the number of common functions, and a routing ID offset indicating the next common function of the virtual function type.

The default physical function 720 may modify registers included in the configuration space of the default physical function 720 based on the virtual function information VF_INFO. According to an embodiment, the default physical function 720 may enable or disable the plurality of common functions 730-1 to 730-n based on a virtual function (VF) enable value included in the register of the SR-IOV capability. For example, when the virtual function enable included in the register of the SR-IOV capability is set, the plurality of registers of the common functions 730-1 to 730-n may be enabled. In another example, when the virtual function enable included in the register of the SR-IOV capability is clear, the plurality of common functions 730-1 to 730-n may be disabled.

The common functions 730-1 to 730-n each of which is configured as the virtual function type may perform operations based on base address registers (BARs) included in a configuration space of a function associated with the common functions 730-1 to 730-n. For example, when common functions 730-1 to 730-n are each associated with the default physical function 720, the common functions 730-1 to 730-n may perform operations based on the base address registers (BARs) included in the configuration space of the default physical function 720. In other words, the plurality of common functions 730-1 to 730-n each of which is configured as the virtual function type may not have independent base addresses and may perform operations through a base address of the associated default physical function 720.

According to an embodiment, the plurality of common functions 730-1 to 730-n may perform PCIe interface associated operations based on registers corresponding to the PCIe interface associated operations included in the configuration space of the associated function. For example, when associated with the default physical function 720, the plurality of common functions 730-1 to 730-n may perform the PCIe interface associated operations based on the registers included in the configuration space of the default physical function 720. For example, the common functions 730-1 to 730-n may perform an error handling operation based on registers which are associated with the error handling operation and included in the configuration space of the default physical function 720. For example, the common functions 730-1 to 730-n may perform a power management operation based on registers associated with the power management operation included in the configuration space of the default physical function 720. In other words, the common functions 730-1 to 730-n each of which is configured as the virtual function type may perform some operations based on the configuration space of the associated function.

According to an embodiment, each of the plurality of common functions 730-1 to 730-n may perform operations based on the configuration space thereof. In other words, each of the plurality of common functions 730-1 to 730-n may perform some exceptional operations in an independent manner based on the configuration space thereof. For example, such as the case in which a register value of a configuration space is set to perform a power management operation in an independent manner, each of the plurality of common functions 730-1 to 730-n may perform some operations based on the configuration space thereof.

According to an embodiment, each common function of the plurality of common functions 730-1 to 730-n may perform a reset operation in response to at least one of a reset request for an associated function of that common function as provided from the host 1000, a reset request for that common functions, and a clear operation of a virtual function enable value of the associated function. This will be described below in more details with reference to FIGS. 16B to 16D.

Figure 12:
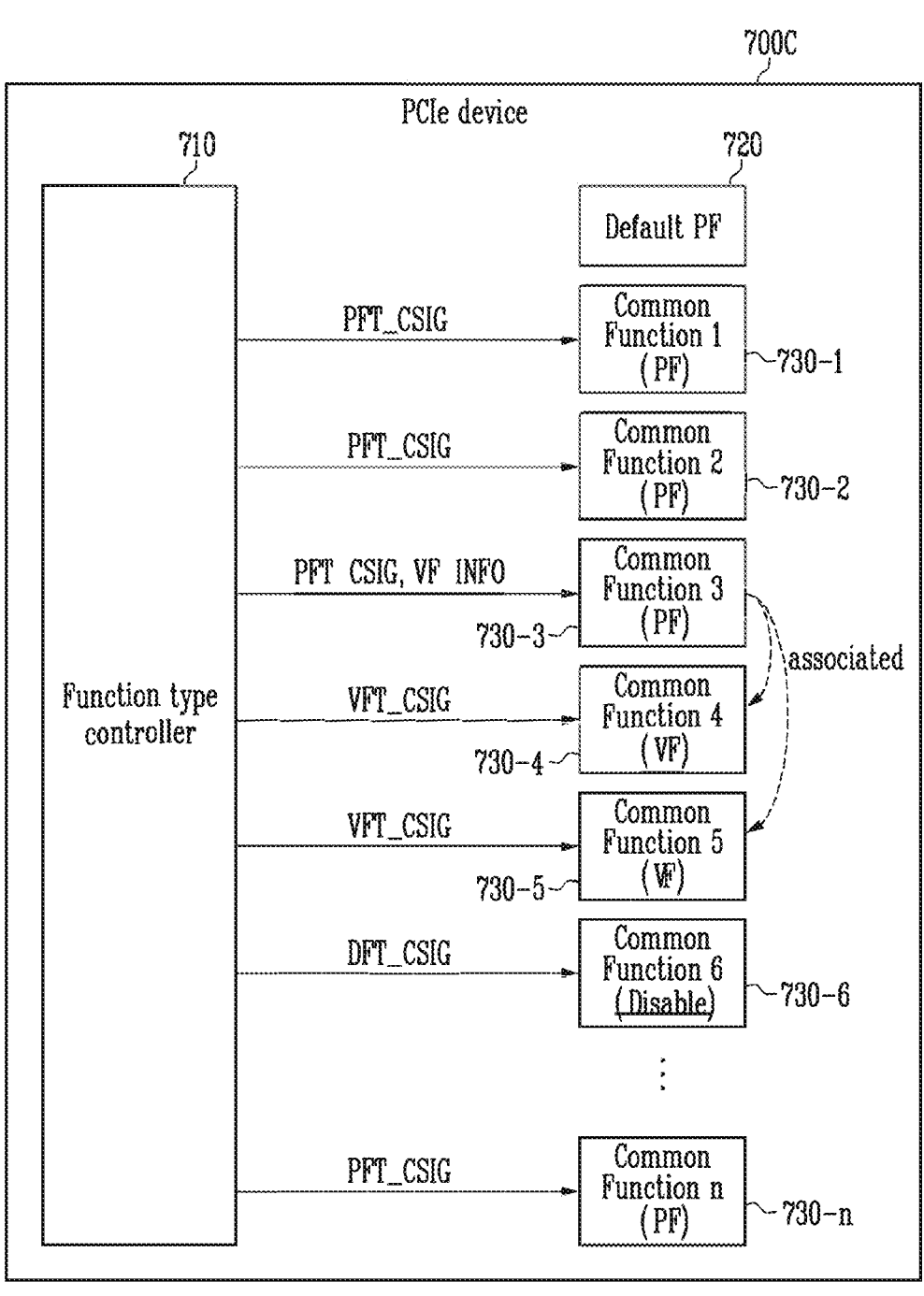
FIG. 12 illustrates another example of a PCIe device according to an embodiment of the present disclosure.

FIG. 12 illustrates another example (a PCIe device 700C) of a PCIe device according to an embodiment of the present disclosure.

The PCIe device 700C as shown in FIG. 12 may be another example of an SR-IOV capable device. In the example of FIG. 12, respective function types of a first subset of the common functions 730-1 to 730-n included in the PCIe device 700C may be determined as a physical function type, respective function types of a second subset of the common functions 730-1 to 730-n may be determined as a virtual function type, and respective function types of a third subset of the common functions 730-1 to 730-n may be determined as a disable function type. Therefore, the PCIe device 700C as shown in FIG. 12 may operate in the same manner as the PCIe device 600 as described above with reference to FIG. 6.

Referring to FIG. 12, the function type controller 710 may provide a physical function type control signal PFT_CSIG to the first subset of common functions (common functions 730-1, 730-2, 730-3, and 730-n) among the plurality of common functions 730-1 to 730-n. In addition, the function type controller 710 may provide the virtual function type control signal VFT_CSIG to the second subset of common functions (common functions 730-4 and 730-5). In addition, the function type controller 710 may provide a disable function type control signal DFT_CSIG to the third subset of common functions (common function 730-6). The disable function type control signal DFT_CSIG may be a control signal for determining the function type of the common function 6 730-6 as a disable function type. Therefore, the function type of each of the common functions 730-1, 730-2, 730-3, and 730-n may be determined as a physical function type, the function type of each of the common functions 730-4 and 730-5 may be determined as a virtual function type, and the function type of the common function 6 730-6 may be determined as a disable function type.

The common functions 730-1, 730-2, 730-3, and 730-n may operate in the same manner as the plurality of common functions 730-1 to 730-n each of which is configured as the physical function type as described above with reference to FIG. 10. The common functions 730-4 and 730-5 may operate in the same manner as the plurality of common functions 730-1 to 730-n each of which is configured as the virtual function type as described above with reference to FIG. 11.

According to an embodiment, the common functions 730-4 and 730-5 each of which is configured as the virtual function type may be associated with the common functions 3 730-3 configured as the physical function type. According to an embodiment, the common function 3 730-3 may be an SR-IOV capability enabled function. The function type controller 710 may provide the virtual function information VF_INFO to the associated common function 3 730-3. The virtual function information VF_INFO may include identification information of common functions operating as a virtual function type, the number of common functions, a routing ID offset indicating the next common function of a virtual function type, a first virtual function offset, a virtual function stride, and the like. The first virtual function offset may indicate an identification information offset, relative to the associated physical function, of the first common function among the common functions determined as the virtual function type. The virtual function stride may indicate an identification information offset among the common functions determined as the virtual function type. The virtual function information VF_INFO may include information for setting the first virtual function offset to '1' and the virtual function stride to '1'.

According to an embodiment, the common function 3 730-3 may modify the registers included in the configuration space of the common function 3 730-3 based on the virtual function information VF_INFO. According to an embodiment, the common function 3 730-3 may enable or disable the common functions 730-4 and 730-5 based on a virtual function (VF) enable value included in the register of the SR-IOV capability. For example, when the virtual function enable included in the register of the SR-IOV capability of the common function 3 730-3 is set, the common functions 730-4 and 730-5 may be enabled. In another example, when the virtual function enable included in the register of the SR-IOV capability of the common function 3 730-3 is clear, the common functions 730-4 and 730-5 may be disabled. In addition, the common function 3 730-3 may store the first virtual function offset included in the register of the SR-IOV capability as '1' and the virtual function stride as '1' based on the virtual function information VF_INFO.

The common functions 730-4 and 730-5 each of which is determined the virtual function type may perform operations based on the base address register included in the configuration space of the associated common function 3 730-3. For example, the common functions 730-4 and 730-5 may perform operations based on the base address register included in the configuration space of the associated common function 3 730-3. In other words, the common functions 730-4 and 730-5 may not have independent base addresses and may perform operations through the base address of the associated common function 3 730-3.

According to an embodiment, the plurality of common functions 730-4 and 730-5 may perform PCIe interface associated operations based on registers corresponding to the PCIe interface associated operations included in the configuration space of the associated function. For example, the common functions 730-4 and 730-5 may perform PCIe interface associated operations based on the registers included in the configuration space of the associated common function 3 730-3. For example, the common functions 730-4 and 730-5 may perform an error handling operation based on registers which are associated with the error handling operation and included in the configuration space of the common function 3 730-3. For example, the common functions 730-4 and 730-5 may perform a power management operation based on registers which are associated with the power management operation and included in the configuration space of the common function 3 730-3. In other words, the common functions 730-4 and 730-5 each of which is configured as the virtual function type may perform some operations based on the configuration space of the associated function.

According to an embodiment, the common functions 730-4 and 730-5 may perform operations based on the configuration space thereof. In other words, each of the common functions 730-4 and 730-5 may independently perform some exceptional operations based on the configuration space thereof. For example, such as in the case where a register value of a configuration space is set to perform a power management operation in an independent manner, the common functions 730-4 and 730-5 may perform some operations based on the configuration space thereof.

According to an embodiment, the function type controller 710 may disable registers included in the configuration space of the common function 6 730-6 configured as the disable function type. In addition, the function type controller 710 may perform clock gating the disabled registers in the configuration space of the common function 6 730-6.

Figure 13:
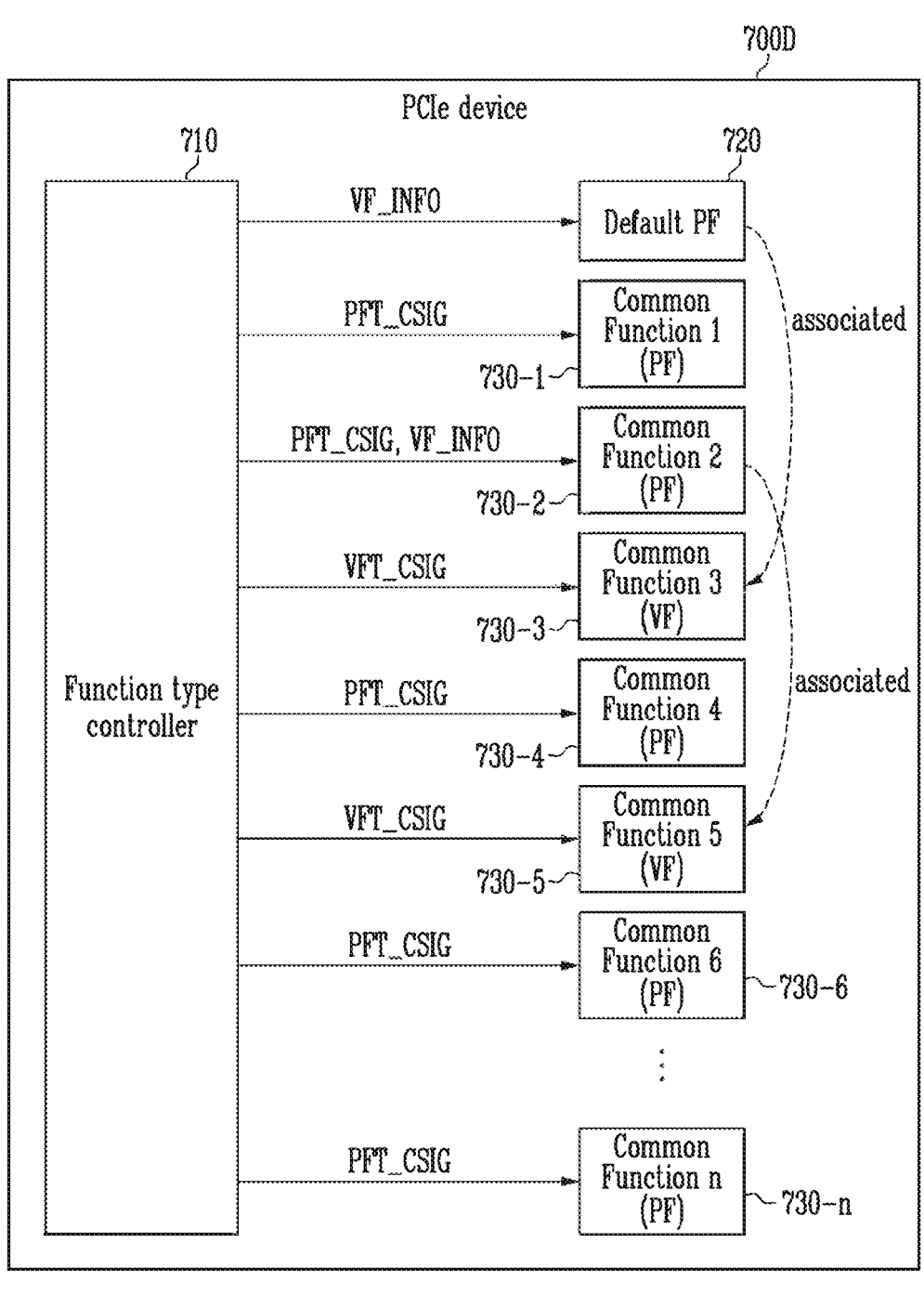
FIG. 13 illustrates another example of a PCIe device according to an embodiment of the present disclosure.

FIG. 13 illustrates another example (a PCIe device 700D) of a PCIe device according to an embodiment of the present disclosure.

The PCIe device 700D as shown in FIG. 13 may be an example of an SR-IOV capable device. In other words, as shown in FIG. 13, a function type of each of a first subset of the common functions 730-1 to 730-$n$ included in the PCIe device 700D may be determined as a physical function type, and a function type of each of a second subset of the common functions 730-1 to 730-$n$ may be determined as a virtual function type. Therefore, the PCIe device 700D as shown in FIG. 13 may operate in the same manner as the PCIe device 600 as described above with reference to FIG. 6.

Referring to FIG. 13, the function type controller 710 may provide the physical function type control signal PFT_CSIG to the first subset of common functions (common functions 730-1, 730-2, 730-4, 730-6, and 730-$n$). Therefore, the function type of each of the common functions 730-1, 730-2, 730-4, 730-6, and 730-$n$ may be determined as a physical function type. In addition, the function type controller 710 may provide the virtual function type control signal VFT_CSIG to the second subset of common functions (common functions 730-3 and 730-5). Therefore, the function type of each of the common functions 730-3 and 730-5 may be determined as a virtual function type.

According to an embodiment, the common function 3 730-3 configured as the virtual function type may be associated with the default physical function 720, and the common function 5 730-5 configured as the virtual function type may be associated with the common function 2 730-2 configured as the physical function type. According to an embodiment, the default physical function 720 and the common function 2 730-2 may be SR-IOV capability enabled functions. The function type controller 710 may provide the virtual function information VF_INFO to the default physical function 720 and the common function 2 730-2. It may be assumed that the virtual function information VF_INFO includes information for setting the first virtual function offset to '3'.

According to an embodiment, the default physical function 720 and the common function 2 730-2 may modify the registers included in the configuration spaces of the default physical function 720 and the common function 2 730-2 based on the virtual function information VF_INFO. According to an embodiment, the default physical function 720 may enable or disable the common function 3 730-3 based on the virtual function (VF) enable value included in the register of the SR-IOV capability. The common function 2 730-2 may enable or disable the common function 5 730-5 based on the virtual function (VF) enable value included in the register of the SR-IOV capability. In addition, the default physical function 720 and the common function 2 730-2 may store the first virtual function offset included in the register of the SR-IOV capability as '1' based on the virtual function information VF_INFO.

Operations of the common functions each of which is configured as the virtual function type as described above with reference to FIG. 12 may apply to the common function 3 730-3 and the common function 5 730-5.

Figure 14:
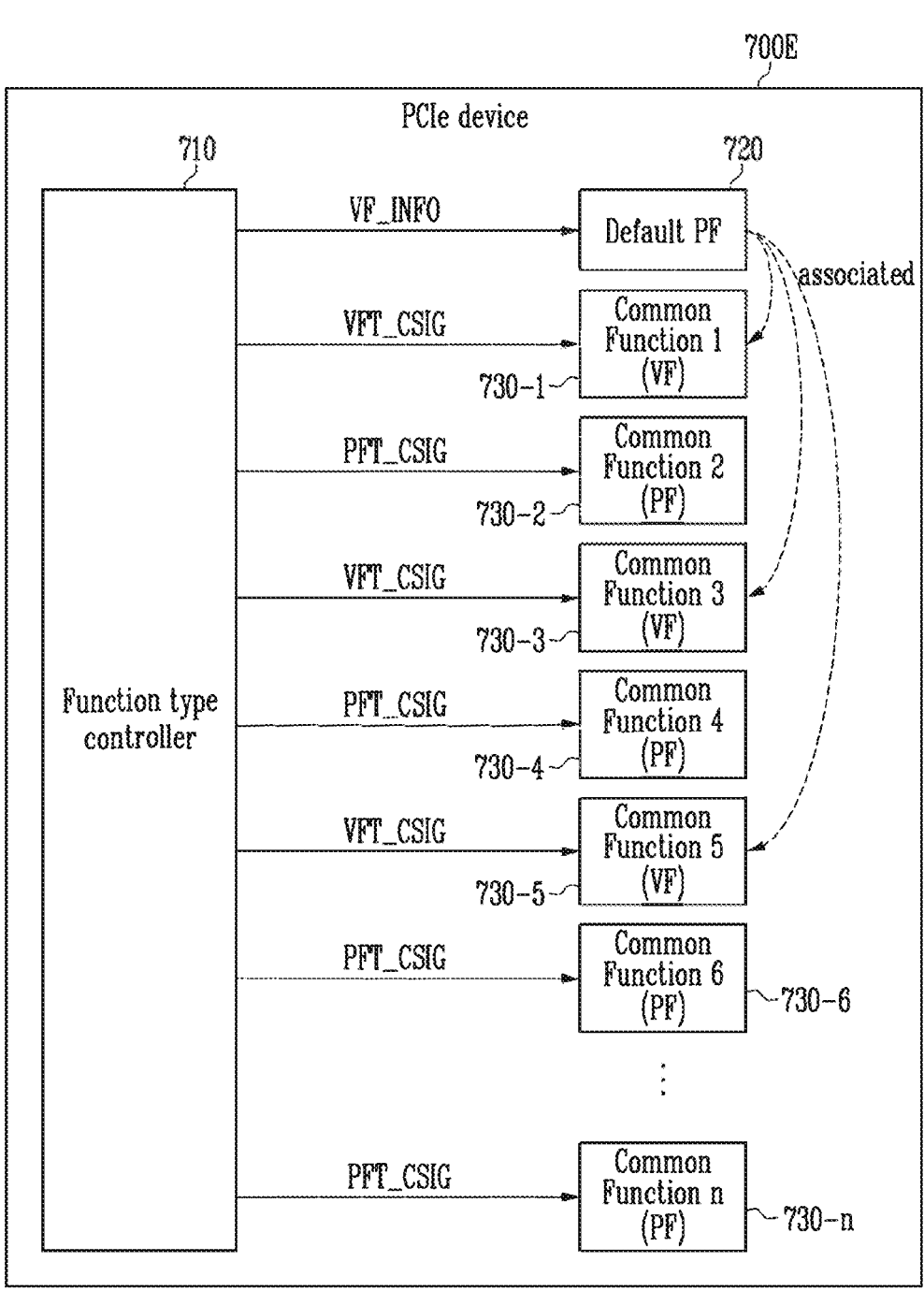
FIG. 14 illustrates another example of a PCIe device according to an embodiment of the present disclosure.

FIG. 14 illustrates another example (a PCIe device 700E) of a PCIe device according to an embodiment of the present disclosure.

The PCIe device 700E as shown in FIG. 14 may be an example of an SR-IOV capable device. In other words, as shown in the example of FIG. 14, a function type of each of a first subset of the common functions 730-1 to 730-*n* included in the PCIe device 700E may be determined as a physical function type, and a function type of each of a second subset of the common functions 730-1 to 730-*n* may be determined as a virtual function type. Therefore, the PCIe device 700E as shown in FIG. 14 may operate in the same manner as the PCIe device 600 as described above with reference to FIG. 6.

Referring to FIG. 14, the function type controller 710 may provide the physical function type control signal PFT_CSIG to the first subset of common functions (common functions 730-2, 730-4, 730-6, and 730-*n*). Therefore, the function type of each of the common functions 730-2, 730-4, 730-6, and 730-*n* may be determined as a physical function type. In addition, the function type controller 710 may provide the virtual function type control signal VFT_CSIG to the second subset of common functions (common functions 730-1, 730-3, and 730-5). Therefore, the function type of each of the common functions 730-1, 730-3, and 730-5 may be determined as a virtual function type.

According to an embodiment, the common functions 730-1, 730-3, and 730-5 each of which is configured as the virtual function type may be associated with the default physical function 720. According to an embodiment, the default physical function 720 may be an SR-IOV capability enabled function. The function type controller 710 may provide the virtual function information VF_INFO to the default physical function 720. The virtual function information VF_INFO may include information for setting the first virtual function offset to '1' and the virtual function stride to '2'.

According to an embodiment, the default physical function 720 may modify registers included in the configuration space of the default physical function 720 based on the virtual function information VF_INFO. According to an embodiment, the default physical function 720 may enable or disable the associated common functions 730-1, 730-3, and 730-5 based on the virtual function (VF) enable value included in the register of the SR-IOV capability. In addition, the default physical function 720 may store the first virtual function offset included in the register of the SR-IOV capability as '1' and the virtual function stride as '2' based on the virtual function information VF_INFO.

Operations of the common functions each of which is determined as the virtual function type as described above with reference to FIG. 12 may apply to the common functions 730-1, 730-3, and 730-5 as shown in FIG. 14.

Figure 15:
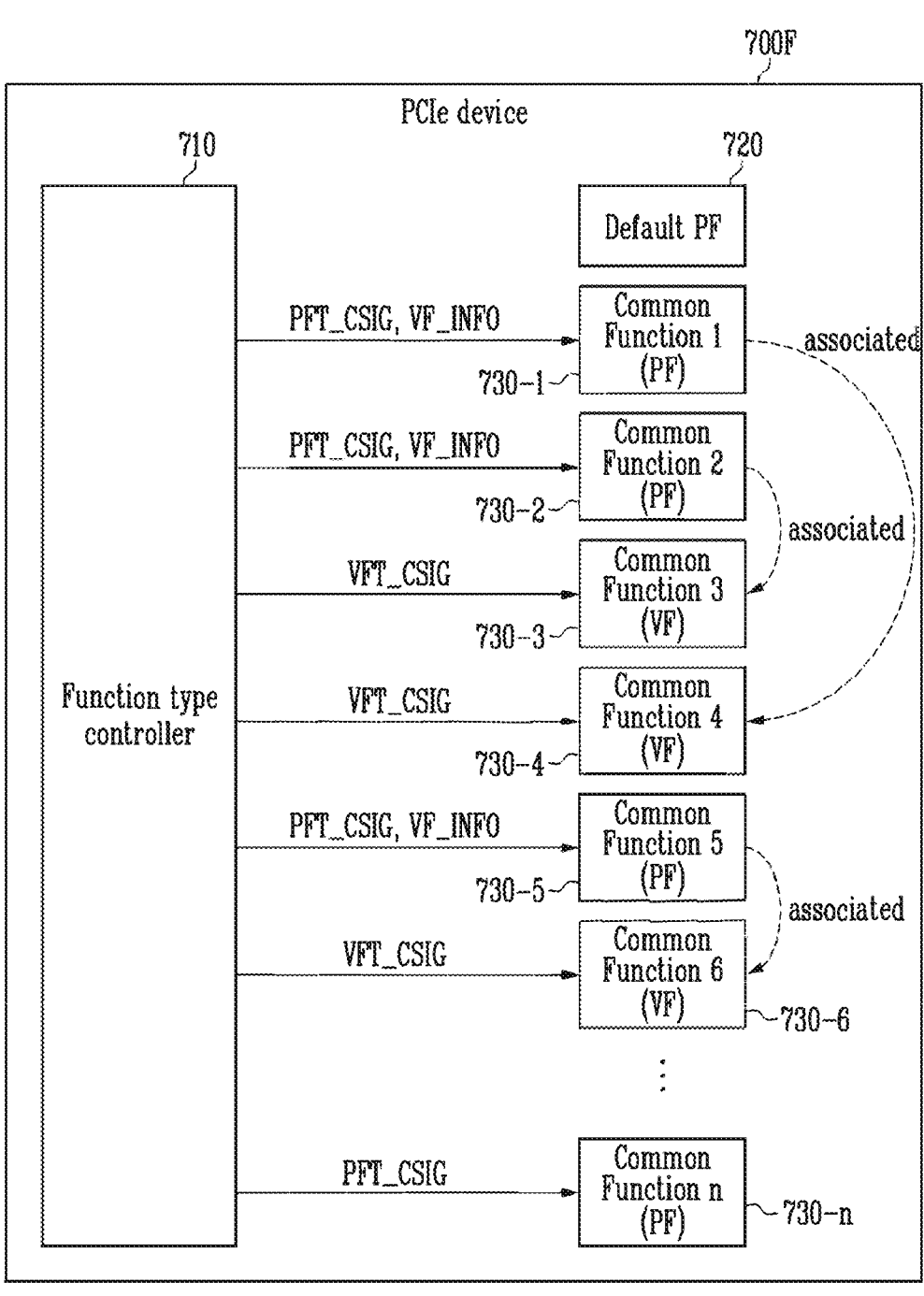
FIG. 15 illustrates another example of a PCIe device according to an embodiment of the present disclosure.

FIG. 15 illustrates another example (a PCIe device 700F) of a PCIe device according to an embodiment of the present disclosure.

The PCIe device 700F as shown in FIG. 15 may be an example of an SR-IOV capable device. In other words, as shown in FIG. 14, for example, a function type of each of a first subset of the common functions 730-1 to 730-*n* included in the PCIe device 700F may be determined as a physical function type, and a function type of each of a second subset of the common functions 730-1 to 730-*n* may be determined as a virtual function type. Therefore, the PCIe device 700F as shown in FIG. 15 may operate in the same manner as the PCIe device 600 as described above with reference to FIG. 6.

Referring to FIG. 15, the function type controller 710 may provide the physical function type control signal PFT_CSIG to the first subset of common functions (common functions

730-1, 730-2, 730-5, and 730-*n*) among the plurality of common functions 730-1 to 730-*n*. Therefore, the function type of each of the common functions 730-1, 730-2, 730-5, and 730-*n* may be determined as a physical function type. In addition, the function type controller 710 may provide the virtual function type control signal VFT_CSIG to second subset of common functions (common functions 730-3, 730-4, and 730-6). Therefore, the function type of each of the common functions 730-3, 730-4, and 730-6 may be determined as a virtual function type.

According to an embodiment, the common function 3 730-3 determined as the virtual function type may be associated with the common function 1 730-1, the common function 4 730-4 determined as the virtual function type may be associated with the common function 2 730-2, and the common function 6 730-6 determined as the virtual function type may be associated with the common function 5 730-5. According to an embodiment, the common function 1 730-1, the common function 2 730-2, and the common function 5 730-5 may be SR-IOV capability enabled functions. The function type controller 710 may provide the virtual function information VF_INFO to the common function 1 730-1, the common function 2 730-2, and the common function 5 730-5. In this example, the virtual function information VF_INFO provided to the common function 1 730-1 includes information for setting the first virtual function offset to '3', and the virtual function information VF_INFO provided to the common function 2 730-2 and the common function 5 730-5 includes information for setting the first virtual function offset to '1'.

According to an embodiment, the common function 1 730-1, the common function 2 730-2, and the common function 730-5 may modify registers included in the configuration spaces of the common function 1 730-1, the common function 2 730-2, and the common function 5 730-5 based on the respective virtual function information VF_INFO. According to an embodiment, the common function 1 730-1 may enable or disable the common function 4 730-4 based on the virtual function (VF) enable value included in the register of the SR-IOV capability. The common function 2 730-2 may enable or disable the common function 3 730-3 based on the virtual function (VF) enable value included in the register of the SR-IOV capability. The common function 5 730-5 may enable or disable the common function 6 730-6 based on the virtual function (VF) enable value included in the register of the SR-IOV capability. In addition, the common function 1 730-1 may store the first virtual function offset included in the register of the SR-IOV capability as '3' based on the virtual function information VF_INFO. The common function 2 730-2 and the common function 5 730-5 may store the first virtual function offset included in the register of the SR-IOV capability as '1' based on the virtual function information VF_INFO.

Operations of the common functions each of which is determined as the virtual function type as described above with reference to FIG. 12 may apply to the common function 3 730-3, the common function 4 730-4, and the common function 6 730-6 as shown in FIG. 13.

Therefore, referring to FIGS. 10 to 15, according to various embodiments of the present disclosure, by freely determining the arrangements of functions configured in various types, PCIe devices applicable to various environments may be provided.

Figure 16A:
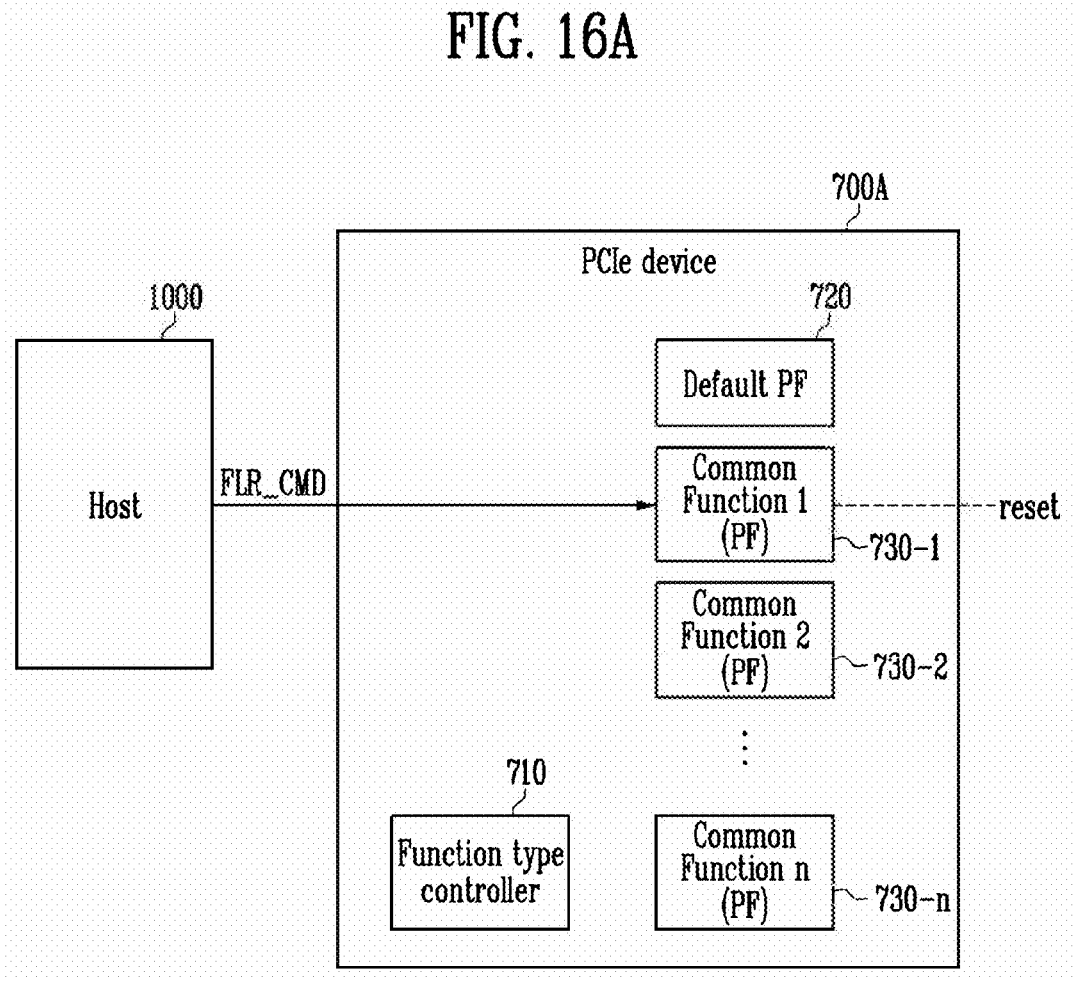
FIG. 16A illustrates an example of a reset operation according to an embodiment of the present disclosure.

FIG. 16A illustrates an example of a reset operation according to an embodiment of the present disclosure.

The PCIe device 700A as shown in FIG. 16A may represent the PCIe device 700A as shown in FIG. 10.

Referring to FIG. 16, the PCIe device 700A may receive a reset command for the common function 1 730-1 from the host 1000. According to an embodiment, the reset command may be a function level reset command FLR_CMD.

The PCIe device 700A may perform function level reset on the common function 1 730-1 configured as a physical function type in response to the function level reset command FLR_CMD. As a result, only the common function 1 730-1 may be reset, and the reset operation of the common function 1 730-1 may not affect the other common functions 730-2 to 730-n or the default physical function 720.

In the above example, the reset operation performed on the common function 1 730-1 has been described. However, the reset operation of the common function 1 730-1 may apply to the other common functions 730-2 to 730-n each of which is determined as the physical function type. In addition, the above-described reset operation of the common function 1 730-1 may apply to the common functions 730-1, 730-2, 730-3, and 730-n each of which is configured as physical function types in the PCIe device 700C of FIG. 12.

Figure 16B:
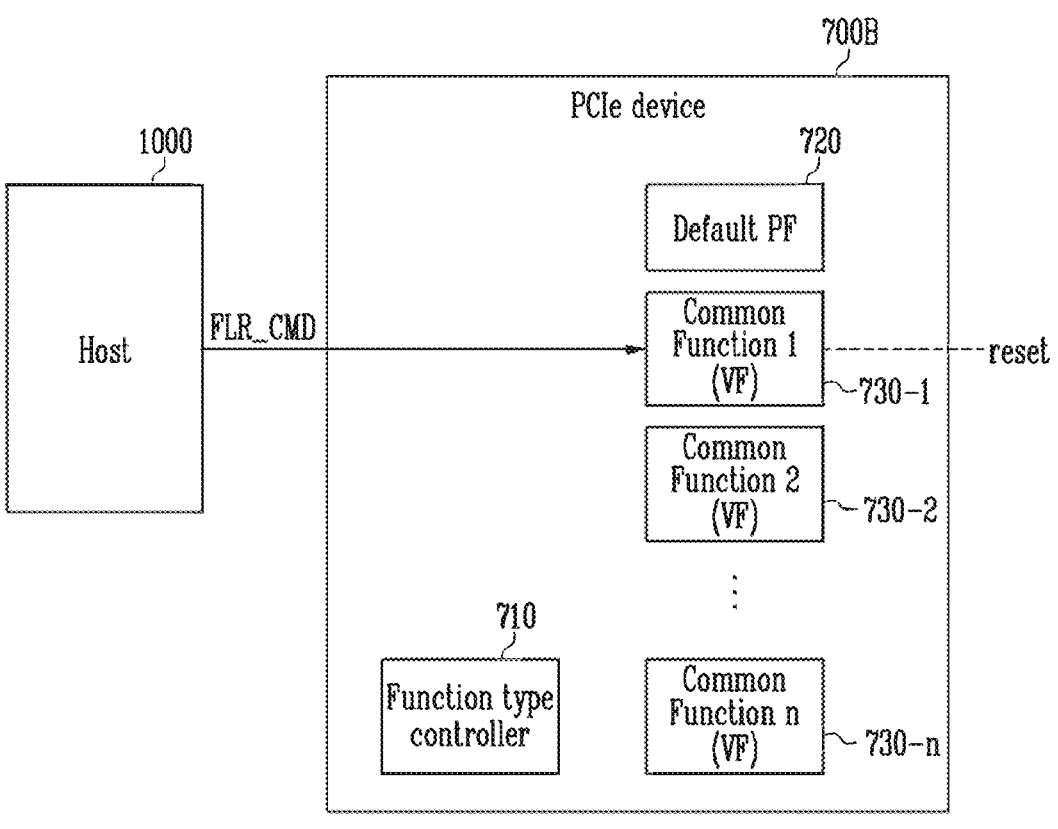
FIG. 16B illustrates another example of a reset operation according to an embodiment of the present disclosure.

FIG. 16B illustrates another example of a reset operation according to an embodiment of the present disclosure.

The PCIe device 700B as shown in FIG. 16B may represent the PCIe device 700B as shown in FIG. 11.

Referring to FIG. 16B, the PCIe device 700B may receive a reset command for the common function 1 730-1 from the host 1000. According to an embodiment, the reset command may be the function level reset command FLR_CMD.

The PCIe device 700B may perform function level reset for the common function 1 730-1 configured as the virtual function type in response to the function level reset command FLR_CMD. As a result, only the common function 1 730-1 may be reset, and the reset operation of the common function 1 730-1 may not affect the other common functions 730-2 to 730-n or the default physical function 720.

In the above example, the reset operation performed on the common function 1 730-1 has been described. However, the reset operation of the common function 1 730-1 may apply to the other common functions 730-2 to 730-n each of which is determined as the virtual function type. In addition, the above-described reset operation of the common function 1 730-1 may apply to the common functions 730-4 and 730-5 each of which is configured as the virtual function type in the PCIe device 700C of FIG. 12.

Figure 16C:
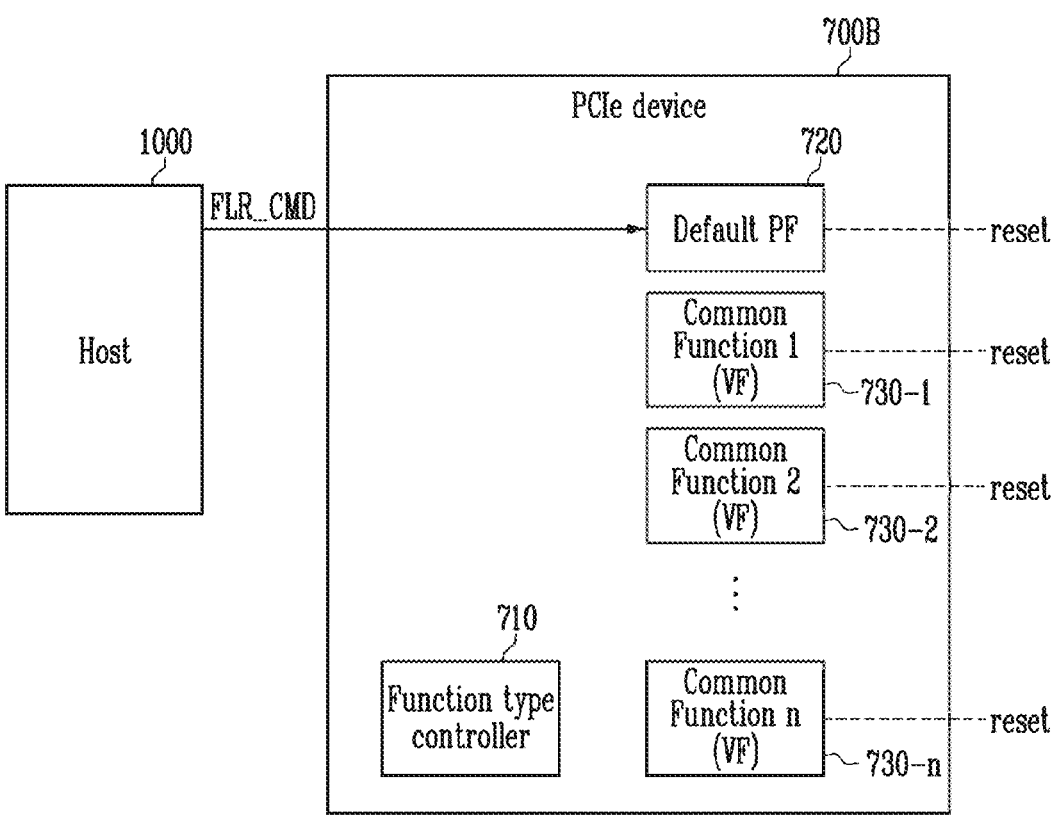
FIG. 16C illustrates another example of a reset operation according to an embodiment of the present disclosure.

FIG. 16C illustrates another example of a reset operation according to an embodiment of the present disclosure.

The PCIe device 700B as shown in FIG. 16C may represent the PCIe device 700B as shown in FIG. 11.

Referring to FIG. 16C, the PCIe device 700B may receive a reset command for the default physical function 720 from the host 1000. According to an embodiment, the reset command may be the function level reset command FLR_CMD.

The PCIe device 700B may perform function level reset for the default physical function 720 in response to the function level reset command FLR_CMD. In addition, the PCIe device 700B may perform function level reset on the common functions 730-1 to 730-n each of which is configured as the virtual function type and associated with the default physical function 720. In other words, the function level reset may be performed on the common functions 730-1 to 730-n associated with the default physical function 720 as well as the default physical function 720.

The reset operation of the above-described common functions 730-1 to 730-n and the associated default physical function 720 may apply to the common functions 730-4 and 730-5 each of which is configured as the virtual function type and the common function 730-3 configures as the associated physical function type as shown in the PCIe device 700C of FIG. 12.

Figure 16D:
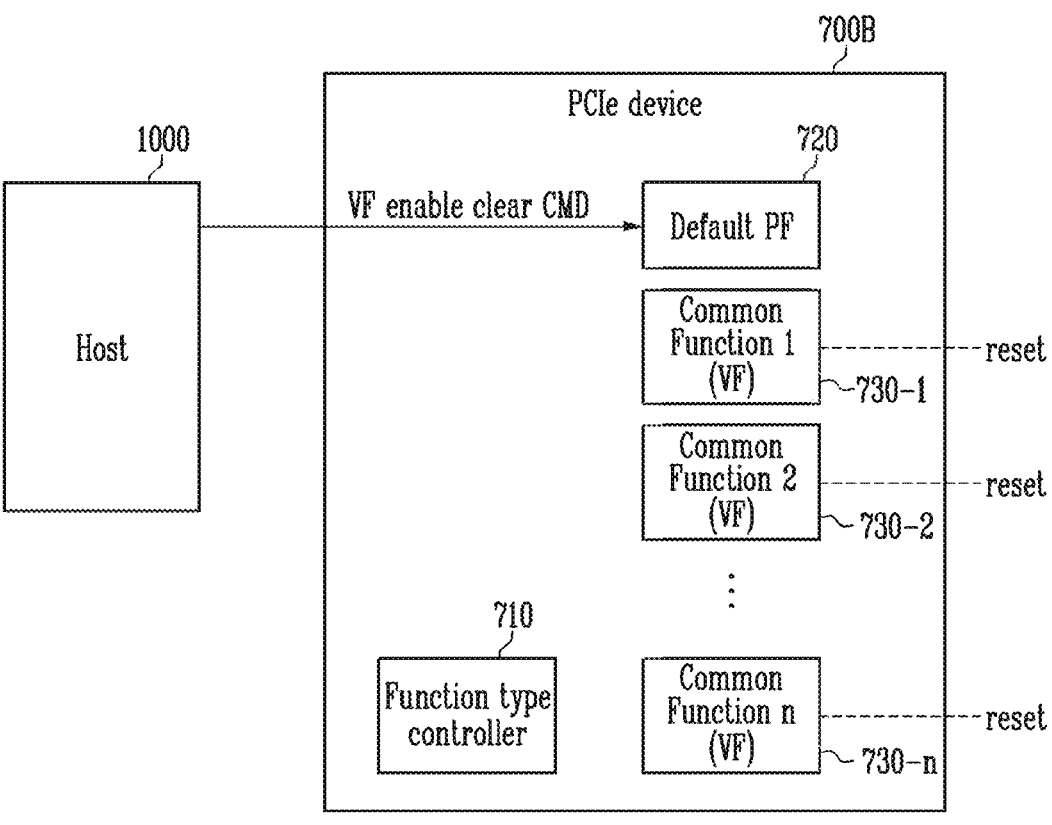
FIG. 16D illustrates another example of a reset operation according to an embodiment of the present disclosure.

FIG. 16D illustrates another example of a reset operation according to an embodiment of the present disclosure.

The PCIe device 700B as shown in FIG. 16D may represent the PCIe device 700B as shown in FIG. 11.

Referring to FIG. 16D, the PCIe device 700B may receive a VF enable clear command CMD for setting a virtual function enable value to 'clear' from the host 1000. The default physical function 720 may set the VF enable value included in the configuration space to 'clear' in response to the VF enable clear command CMD. Therefore, the plurality of common functions 730-1 to 730-n associated with the default physical function 720 may be disabled while performing the reset operation.

A virtual function enable clear operation on the above-described common functions 730-1 to 730-n and the associated default physical function 720 may apply to the common functions 730-4 and 730-5 each of which is configured as the virtual function type and the common function 3 730-3 configures as the associated physical function type as shown in the PCIe device 700C of FIG. 12.

Figure 17:
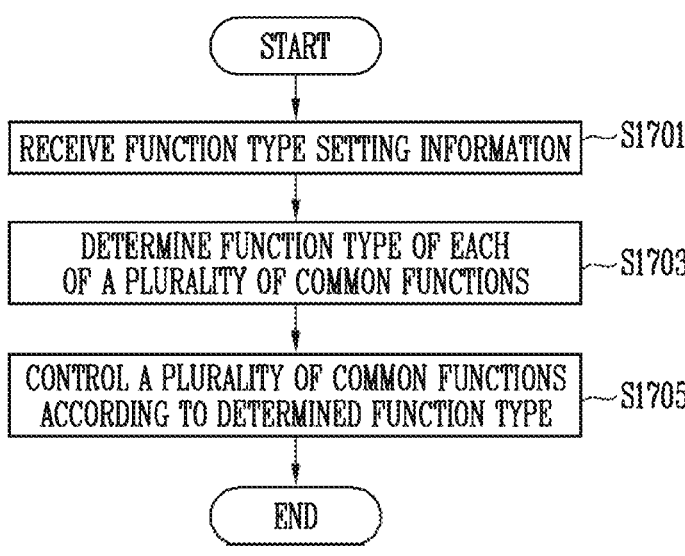
FIG. 17 is a flowchart illustrating an operating process of PCIe according to an embodiment of the present disclosure.

FIG. 17 is a flowchart illustrating an operating process of PCIe according to an embodiment of the present disclosure.

The process as shown in FIG. 17 may be performed by, for example, a PCI device including a plurality of common functions, such as the PCIe device 700 as shown in FIG. 7.

Referring to FIG. 17, at step S1701, the PCIe device 700 may receive function type setting information from the host 1000.

For example, the PCIe device 700 may receive the function type setting information by using a technology such as a vendor-defined message, vendor-defined capabilities, new PCIe capability defined by a user, Management Component Transport Protocol (MCTP) over System Manager bus (SMbus), MCTP over PCIe, or the like.

At step S1703, the PCIe device 700 may determine a function type of each of the plurality of common functions as one of a physical function type, a virtual function type and a disable function type based on the function type setting information.

The PCIe device 700 may determine the function type of each of the plurality of common functions by changing values of registers included in the configuration space of each of the plurality of common functions according to the function type setting information.

At step S1705, the PCIe device 700 may control the plurality of common functions to perform operations according to their respective determined function types.

The PCIe device 700 may control one or more first common functions each having a physical function type, among the plurality of common functions, to perform operations based on registers corresponding to the operations included in the configuration space of each of the first common functions.

In addition, the PCIe device 700 may control one or more second common functions each having a virtual function type among the plurality of common functions to perform operations based on registers corresponding to the operations included in the configuration space of a function associated with each of the second common functions.

In addition, the PCIe device 700 may disable registers included in the configuration space of each of one or more third common functions each having a disable function type among the plurality of common functions.

According to the present disclosure, a PCIe device that reduces power consumption and device size by reducing a PCIe-related gate count, and an operating process thereof may be provided.

In addition, according to the present disclosure, a PCIe device efficiently arranging functions configured in various types by using a software process such as a request from a host or by a firmware setting, instead of by hardware modifications, and an operating process thereof may be provided.

2. Physical Functions Enabled or Disabled

Figure 18:
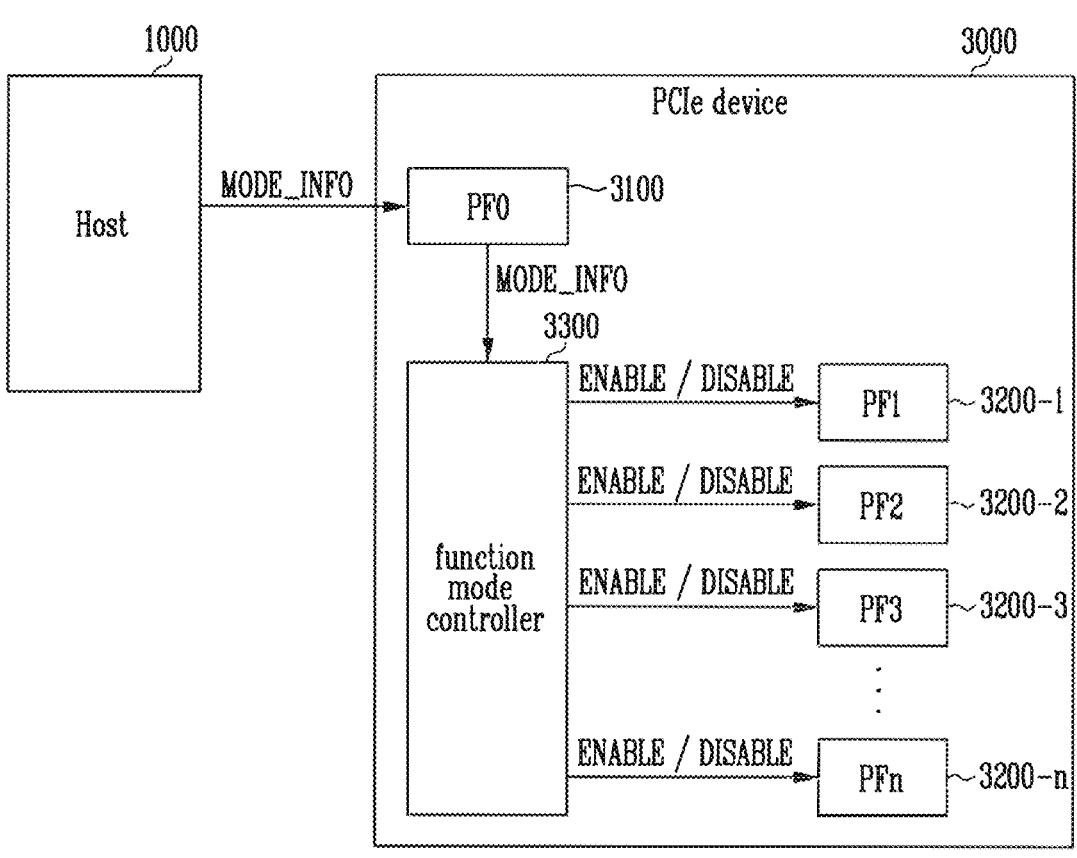
FIG. 18 illustrates a PCIe device according to an embodiment of the present disclosure.

FIG. 18 illustrates a PCIe device 3000 according to an embodiment of the present disclosure.

The PCIe device 3000 may communicate with the host 1000 through a PCIe link.

Referring to FIG. 18, the PCIe device 3000 may include a physical function 0 3100, physical functions 1 to n 3200-1 to 3200-n and a function mode controller 3300. The PCIe device 3000 may represent one of the PCIe device 2000 as shown in FIG. 1 or may be one of the PCIe devices 2000-1 to 2000-3 as shown in FIGS. 2 and 3. The physical function 0 3100 may have the same configuration as the physical function 0 PF0 as described above with reference to FIG. 4 and the physical function 0 PF0 as described above with reference to FIG. 5. In the present specification, the physical function 0 3100 may be referred to as a "first physical function." In addition, in the present specification, the physical functions 1 to n 3200-1 to 3200-n may be referred to as "a plurality of second physical functions."

The physical function 0 3100 and the physical functions 1 to n 3200-1 to 3200-n may be PCIe functions. Each of the physical function 0 3100 and the physical functions 1 to n 3200-1 to 3200-n may be assigned to one of the plurality of system images included in the host 1000. The plurality of system images may access the assigned physical functions of the physical functions 3100 and 3200-1 to 3200-n.

According to an embodiment, each of the physical function 0 3100 and the physical functions 1 to n 3200-1 to 3200-n may be an independent operation unit for providing physical resources included in the PCIe device 3000. Each of the physical function 0 3100 and the physical functions 1 to n 3200-1 to 3200-n may be assigned some of a plurality of physical resources included in the host 1000. Each of the physical function 0 3100 and the physical functions 1 to n 3200-1 to 3200-n may provide the corresponding physical resources of the PCIe device 3000 and of the host 1000 to each of the assigned system images.

The physical function 0 3100 may be a function that is necessarily included in the PCIe device 3000. According to an embodiment, the physical function 0 3100 may be a function that may not be able to be disabled.

According to an embodiment, the physical function 0 3100 may manage a PCIe link coupled to the host 1000. The PCIe link may be a common link that is shared by the physical function 0 3100 and the physical functions 1 to n 3200-1 to 3200-n. Each of the physical function 0 3100 and the physical functions 1 to n 3200-1 to 3200-n may transmit and receive data, packets, and the like to and from the assigned system images through the PCIe link.

In addition, the physical function 0 3100 may manage PCIe functionality. The PCIe functionality may be common functionality shared by the physical function 0 3100 and the physical functions 1 to n 3200-1 to 3200-n.

According to an embodiment, the physical function 0 3100 may receive function mode control information MOD- E_INFO from the host 1000. The physical function 0 3100 may provide the function mode control information MOD-E_INFO to the function mode controller 3300.

The function mode control information MODE_INFO may include information for setting operation modes of the physical functions 1 to n 3200-1 to 3200-n. According to an embodiment, the function mode control information MOD-E_INFO may include at least one of a number of physical functions to be enabled among the physical functions 1 to n 3200-1 to 3200-n, identification information of the physical functions to be enabled, a number of physical functions to be disabled among the physical functions 1 to n 3200-1 to 3200-n, and identification information of the physical functions to be disabled. For example, when a plurality of physical functions are to be enabled, the function mode control information MODE_INFO may include the number of physical functions to be enabled among the physical functions 1 to n 3200-1 to 3200-n and the identification information of the physical function to be enabled. In another example, when a plurality of physical functions are to be disabled, the function mode control information MOD-E_INFO may include the number of physical functions to be disabled among the physical functions 1 to n 3200-1 to 3200-n and the identification information of the physical function to be disabled. In another example, when one physical function is to be enabled, the function mode control information MODE_INFO may include identification information of the physical function to be enabled among the physical functions 1 to n 3200-1 to 3200-n. In another example, when one physical function is to be disabled, the function mode control information MODE_INFO may include identification information of the physical function to be disabled among the physical functions 1 to n 3200-1 to 3200-n. According to an embodiment, the identification information of the physical function may include at least one of a bus number, a device number, and a function number.

According to an embodiment, the physical function 0 3100 may receive the function mode control information MODE_INFO from the host 1000 using one of a vendor-defined message, a vendor-defined capability, a new PCIe capability defined by a user, Management Component Transport Protocol (MCTP) over SMbus (System Manager bus), and MCTP over PCIe.

According to an embodiment, the vendor-defined message may allow expansion of PCI Express messaging capabilities. For example, the vendor-defined message may include a requester ID field for sending a message, a receiver ID field for receiving a message, and a vendor-defined field. The receiver ID may include at least one of a bus number, a device number, and a function number. For example, the host 1000 may provide the function mode control information MODE_INFO to the physical function 0 3100 through the vendor-defined field of the vendor-defined message. The requester ID may include identification information of the host 1000 or the system image. The receiver ID may receive identification information of the PCIe device 3000 or a physical function receiving the message.

According to an embodiment, the vendor-specific capability may be a capability structure of a PCI-compatible Configuration Space. The vendor-specific capability may allow device vendors to use the capability mechanism for vendor-specific information. A vendor-specific capability register may include a capability ID field, a next capability pointer field, a capability length field, and a vendor specific information field. The capability ID field may indicate a PCIe capability structure. The capability ID field may provide a capability ID indicating a vendor-specific capability structure. The next capability pointer field may indicate an offset for the next PCI capability structure. When there is no linked list of capabilities, the next capability pointer field may include 00h. The capability length field may provide the number of bytes included in the capability structure. The vendor specific information field may vary depending on vendors. Therefore, the vendor specific information field may be set to various values depending on a user. For example, the host 1000 may provide the function mode control information MODE_INFO to the physical function 0 3100 through the specific information field of the vendor specific capability.

According to an embodiment, the new PCIe capability defined by the user may include identification information of a device which provides information, identification information of device which receives information, and a field which includes information.

According to an embodiment, the physical functions 1 to n 3200-1 to 3200-n may be enabled or disabled according to an operation mode. For example, the physical functions 1 to n 3200-1 to 3200-n may be set to one of an active mode or an inactive mode. The physical functions 1 to n 3200-1 to 3200-n set to the active mode may be enabled to perform operations and may perform communication with assigned system images through the PCIe link. The physical functions 1 to n 3200-1 to 3200-n set to the inactive mode may be disabled so as not to perform operations and may not perform communication through the PCIe link.

According to an embodiment, the function mode controller 3300 may set the operation mode of each of the physical functions 1 to n 3200-1 to 3200-n to one of the active mode and the inactive mode based on the function mode control information MODE_INFO.

For example, the function mode controller 3300 may provide the physical functions 1 to n 3200-1 to 3200-n with an enable control signal ENABLE based on the function mode control information MODE_INFO. The physical functions 1 to n 3200-1 to 3200-n that have received the enable control signal ENABLE may be set to the active mode.

According to an embodiment, one or more physical functions 1 to n 3200-1 to 3200-n set to the active mode may perform a configuration operation. During the configuration operation, information stored in the configuration space of the physical functions 3100 and 3200-1 to 3200-n may be provided to the host 1000, and the configuration space may be set in response to a configuration request from the host 1000. For example, each of the physical functions 1 to n 3200-1 to 3200-n set to the active mode may receive a configuration request from the host 1000 and may perform the configuration operation in response to the configuration request.

For example, the function mode controller 3300 may provide the physical functions 1 to n 3200-1 to 3200-n with a disable control signal DISABLE based on the function mode control information MODE_INFO. The physical functions 1 to n 3200-1 to 3200-n that have received the disable control signal DISABLE may be set to the inactive mode.

According to an embodiment, the function mode controller 3300 may perform clock gating on one or more second physical functions 3200-1 to 3200-n that are set to the inactive mode to reduce power consumption of the PCIe device 3000.

Accordingly, according to an embodiment, by enabling or disabling the physical functions 1 to n 3200-1 to 3200-n based on the function mode control information MODE_INFO received from the host 1000 through various communication techniques, the functions may be controlled according to user's intentions and an operation expense of the computing system including the PCIe device 3000 may be reduced.

Figure 19:
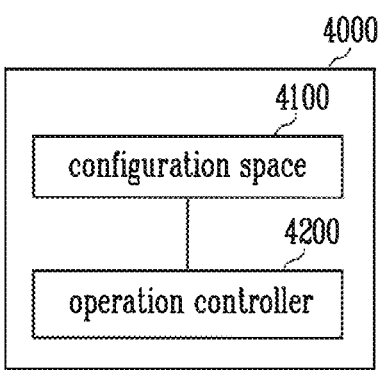
FIG. 19 illustrates a physical function according to an embodiment of the present disclosure.

FIG. 19 illustrates a physical function 4000 according to an embodiment of the present disclosure.

The physical function 4000 as shown in FIG. 19 may indicate one of the physical function 0 3100 or one of the physical functions 1 to n 3200-1 to 3200-n shown in FIG. 18.

Referring to FIG. 19, the physical function 4000 may include a configuration space 4100 and an operation controller 4200.

The configuration space 4100 may include information for configuring the physical function 4000. For example, the configuration space 4100 may include registers for configuring the physical function 4000 to perform operations associated with a PCIe interface. According to an embodiment, the configuration space 4100 may include information on capabilities available in the physical function 4000.

According to an embodiment, the physical function 4000 may perform a configuration operation in response to a configuration request of the host 1000. The physical function 4000 and the host 1000 may perform communication based on the configuration space 4100 which is set according to the configuration operation.

The operation controller 4200 may control operations of the physical function 4000 based on information included in the configuration space 4100. For example, the operation controller 4200 may control operations of the physical function 4000 based on the configuration space 4100 set according to the configuration operation. For example, the operation controller 4200 may control the operations of the physical function 4000 based on field values of the registers set in the configuration space 4100.

The physical function 0 3100 as shown in FIG. 18 may further include configurations for managing a PCIe link and for managing functionality shared between the physical function 0 3100 and the physical functions 1 to n 3200-1 to 3200-n.

Figure 20A:
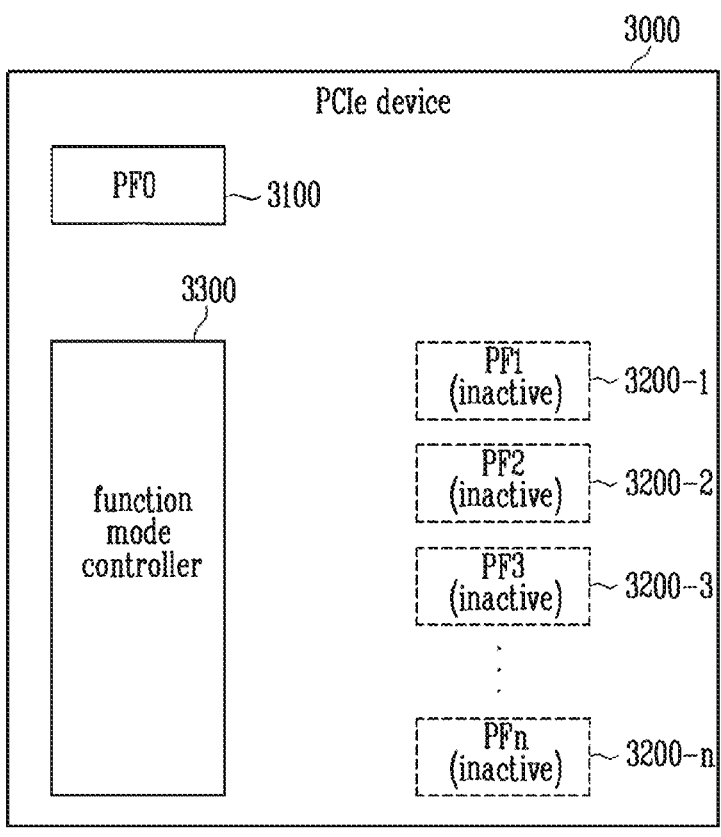
FIG. 20A illustrates a PCIe device in a link up state according to an embodiment of the present disclosure.
Figure 20B:
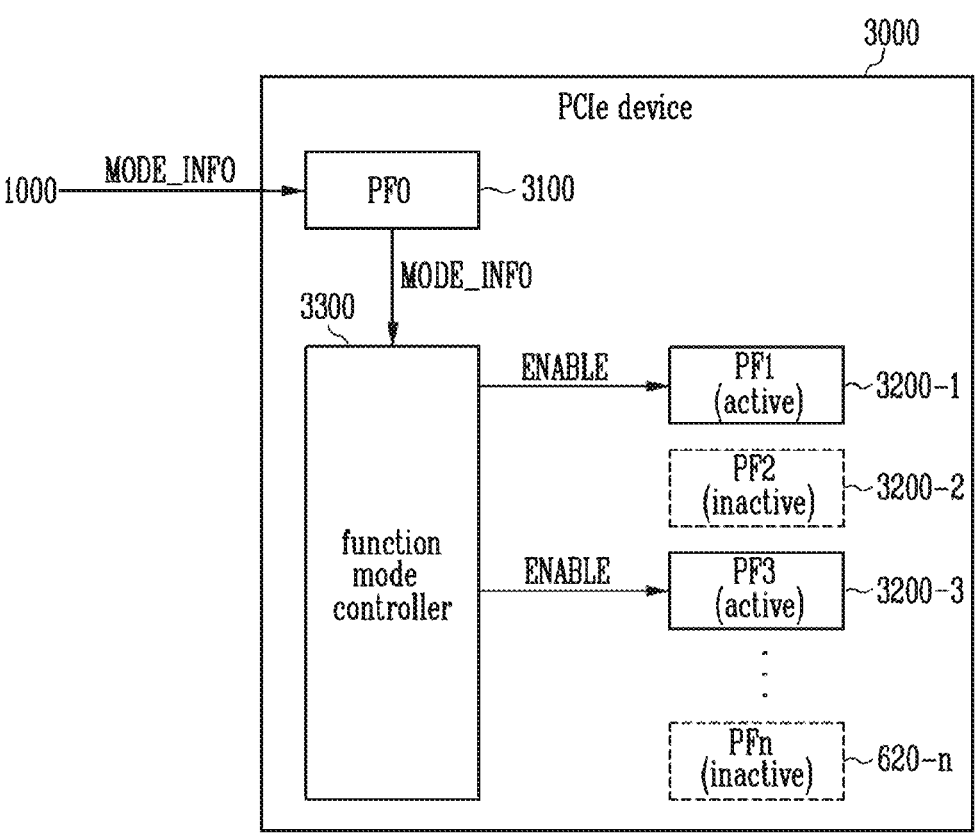
FIG. 20B illustrates setting an operation mode of a physical function to an active mode after a link up according to an embodiment of the present disclosure.
Figure 20C:
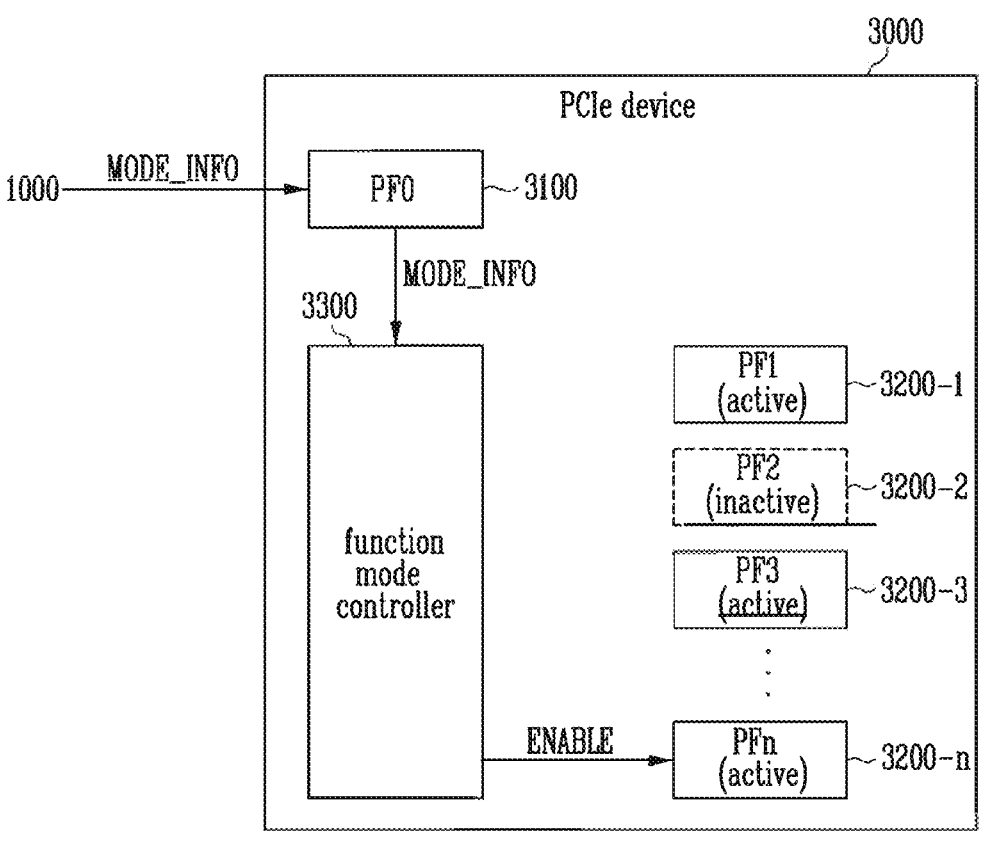
FIG. 20C illustrates setting an operation mode of a physical function to an inactive mode in a general operation state according to an embodiment of the present disclosure.
Figure 20D:
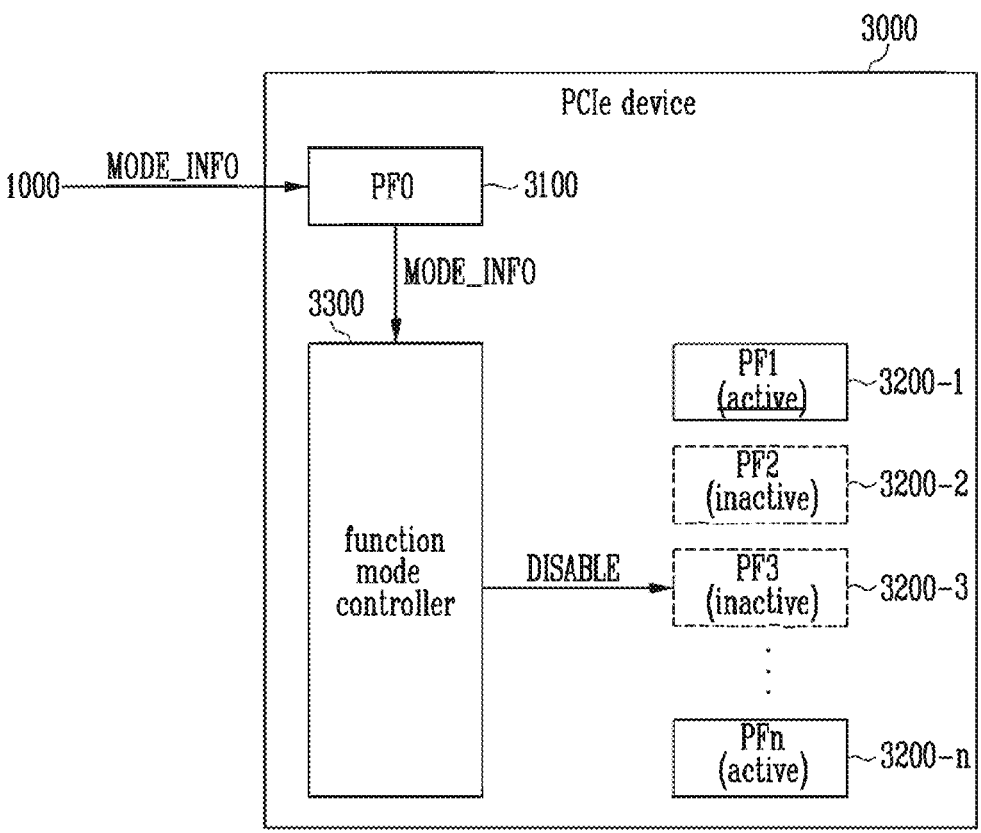
FIG. 20D illustrates setting an operation mode of a physical function to an active mode in a general operation state according to an embodiment of the present disclosure.

FIG. 20A illustrates a PCIe device in a link up state according to an embodiment of the present disclosure. FIG. 20B illustrates setting an operation mode of a physical function to an active mode after a link up according to an embodiment of the present disclosure. FIG. 20C illustrates setting an operation mode of a physical function to an inactive mode in a general operation state according to an embodiment of the present disclosure. FIG. 20D illustrates setting an operation mode of a physical function to an active mode in a general operation state according to an embodiment of the present disclosure.

Referring to FIG. 20A, a link up state may refer to a power on of the PCIe device 3000 or a state right after initialization of the physical function 0 3100 and the physical functions 1 to n 3200-1 to 3200-n. The PCIe device 3000 may perform link initialization and training so as to perform normal packet exchange with the host 1000 through the PCIe link after the link up. The state in which the normal packet exchange is performed may be defined as "L0". The link initialization and training may be performed by Link Training & Status State Machine (LTSSM).

According to an embodiment, the physical functions 1 to n 3200-1 to 3200-n included in the PCIe device 3000 in the link up state may be set to an inactive mode. Therefore, the physical functions 1 to n 3200-1 to 3200-n may be disabled.

Referring to FIG. 20B, after the link up, the physical function 0 3100 may receive the function mode control information MODE_INFO from the host 1000. The physical function 0 3100 may provide the function mode control information MODE_INFO to the function mode controller 3300.

In the example of FIG. 20B, the function mode control information MODE_INFO includes the number of physical functions to be enabled (in this example, 2) and identification information of the physical function 1 3200-1 and the physical function 3 3200-3 that are to be enabled. The function mode controller 3300 may provide the enable control signal ENABLE to the physical function 1 3200-1 and the physical function 3 3200-3 based on the function mode control information MODE_INFO. The physical function 1 3200-1 and the physical function 3 3200-3 may set an operation mode to an active mode. As a result, the physical function 1 3200-1 and the physical function 3 3200-3 may be enabled.

The enabled physical function 1 3200-1 and physical function 3 3200-3 may subsequently receive a configuration request from the host 1000. The physical function 1 3200-1 and the physical function 3 3200-3 may perform a configuration operation in response to the configuration request.

Referring to FIG. 20C, after the link initialization and training is completed and the physical function 0 3100 is operating normally, the physical function 0 3100 may receive the function mode control information MODE_INFO from the host 1000.

In the example of FIG. 20C, the function mode control information MODE_INFO includes the identification information of the physical function n 3200-n that is to be enabled. The function mode controller 3300 may provide the physical function n 3200-n with the enable control signal ENABLE based on the function mode control information MODE_INFO. The physical function n 3200-n may set the operation mode to the active mode in response to the enable control signal ENABLE. As a result, the physical function n 3200-n may be enabled.

The enabled physical function n 3200-n may subsequently receive a configuration request from the host 1000. The physical function n 3200-n may perform a configuration operation in response to the configuration request.

Referring to FIG. 20D, after the link initialization and training is completed and the physical function 0 3100 operates normally, the physical function 0 3100 may receive the function mode control information MODE_INFO from the host 1000.

In the example of FIG. 20D, the function mode control information MODE_INFO includes identification information of the physical function 3 3200-3 that is to be disabled. The function mode controller 3300 may provide the physical function 3 3200-3 with the disable control signal DISABLE based on the function mode control information MODE_INFO. The physical function 3 3200-3 may set the operation mode to the inactive mode in response to the disable control signal DISABLE. As a result, the physical function 3 3200-3 may be disabled.

The function mode controller 3300 may perform clock gating on the disabled physical function 3 3200-3.

Figure 21:
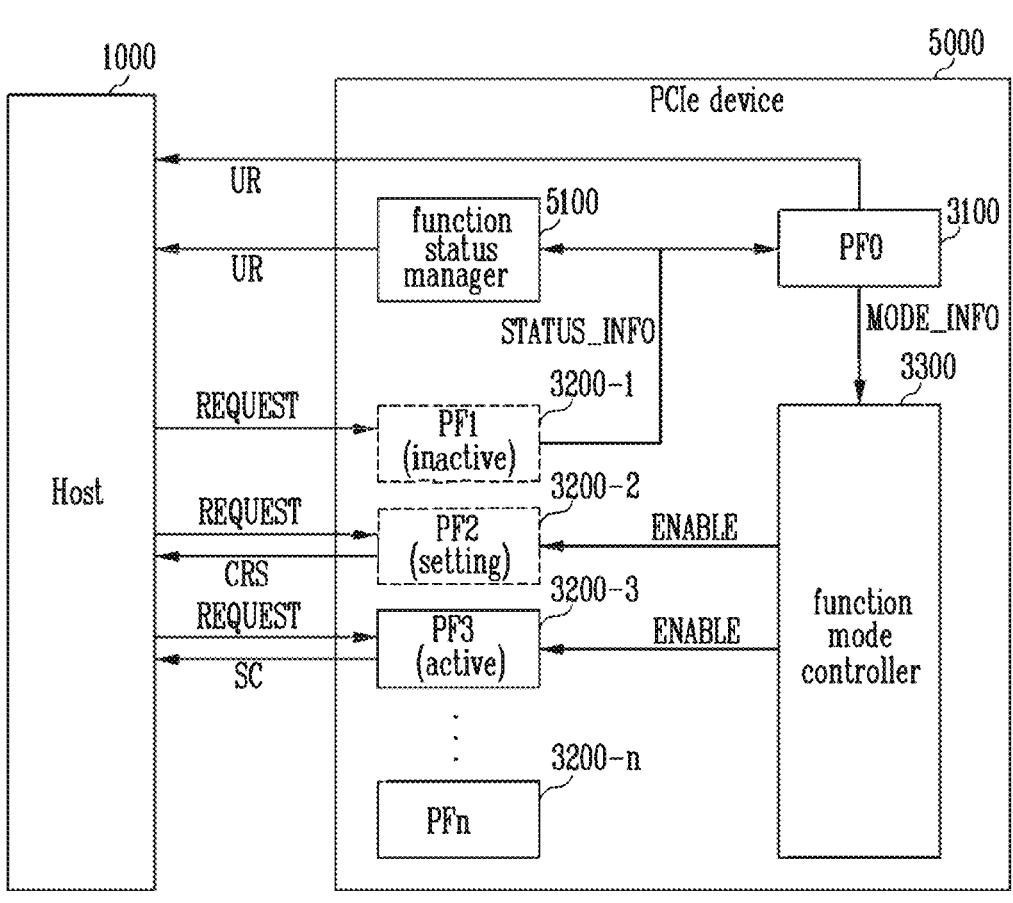
FIG. 21 illustrates a PCIe device according to another embodiment of the present disclosure.

FIG. 21 illustrates a PCIe device 5000 according to another embodiment of the present disclosure.

The PCIe device 5000 may further include a function status manager 5100. Descriptions of the physical function 0 3100, the physical functions 1 to n 3200-1 to 3200-n and the function mode controller 3300 of the PCIe device 5000 will be omitted since they are the same as the corresponding features of PCIe device 3000 shown in FIG. 18.

According to an embodiment, the function status manager 5100 may store status information STATUS_INFO of each of one or more second physical functions set to an inactive mode among the physical functions 1 to n 3200-1 to 3200-n. For example, the disabled physical function 1 3200-1 may provide the function status manager 5100 and the physical function 0 3100 with the status information STATUS_INFO indicating an inactive status. The function status manager 5100 and the physical function 0 3100 may store identification information of the physical function 1 3200-1 and the status information STATUS_INFO of the physical function 1 3200-1.

According to an embodiment, the physical function 0 3100 and the physical functions 1 to n 3200-1 to 3200-n may provide completion information in response to a request REQUEST of the host 1000. The completion information may include information indicating the current status of the physical functions 3100 and 3200-1 to 3200-n. For example, the completion information may include a completion header including a completion status field. The completion status field may include one of Successful Completion (SC) information, Unsupported Request (UR) information, Configuration Request Retry Status (CRS) information, and Completer Abort (CA) information. For example, the physical function 0 3100 and the physical functions 1 to n 3200-1 to 3200-n may return the completion information corresponding to the current status in response to the request REQUEST of the host 1000.

According to an embodiment, the request REQUEST of the host 1000 may include a configuration request.

In an embodiment, when the PCIe device 5000 receives the request REQUEST for a physical function set to the inactive mode from the host 1000, the physical function 0 3100 may provide the host 1000 with the UR information.

In another embodiment, when receiving the request REQUEST for a physical function set to the inactive mode from the host 1000, the function status manager 5100 may provide the host 1000 with the UR information.

For example, the host 1000 may send the request REQUEST to the disabled physical function 1 3200-1. In response, the physical function 0 3100 or the function status manager 5100 may provide the host 1000 with the UR information. The host 1000 having received the UR information may perceive that the physical function 1 3200-1 is disabled.

According to an embodiment, when the host 1000 sends the request REQUEST to a second physical function of the physical functions 1 to n 3200-1 to 3200-n that is in the process of being set to an active mode or an inactive mode, the second physical function may provide CRS information to the host 1000. For example, FIG. 21 shows that the physical function 2 3200-2 is being set to the active mode in response to the enable control signal ENABLE. Accordingly, in response to receiving the request REQUEST from the host 1000, the physical function 2 3200-2 may provide the host 1000 with the CRS information. The host 1000 having received the CRS information may perceive that the physical function 2 3200-2 is being set.

In the above example, CRS information may be provided when the request is received while a physical function is being set to an active mode. However, the CRS information providing operation may also be applicable to a case in which a request is received while a physical function is being set to an inactive mode.

According to an embodiment, when one or more physical functions set to an active mode among the physical functions 1 to n 3200-1 to 3200-n are set to the active mode and then receive a request from the host 1000, the physical functions may provide the host 1000 with the SC information. For example, FIG. 21 shows that the physical function 3 3300-3 is set to the active mode in response to the enable control signal ENABLE. When receiving the request REQUEST from the host 1000, the physical function 3 3200-3 may provide the host 1000 with the SC information. The host 1000 having received the SC information may perceive that the physical function 3 3200-3 is enabled.

Figure 22:
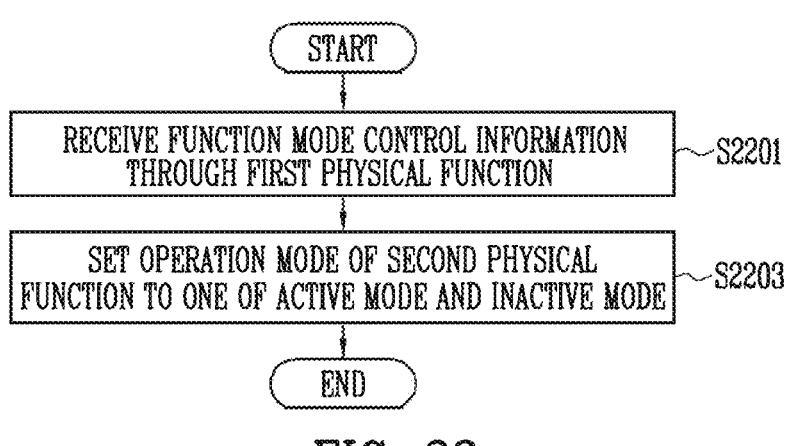
FIG. 22 illustrates a process for operating a PCIe device according to an embodiment of the present disclosure.

FIG. 22 illustrates a process for operating the PCIe device 3000 according to an embodiment of the present disclosure.

The process as shown in FIG. 22 may be performed by, for example, the PCIe device 3000 as shown in FIG. 18 or the PCIe device 5000 as shown in FIG. 21. Hereinafter, the operating process of the PCIe 3000 as shown in FIG. 18 will be described. However, the operating process may also be performed by the PCIe device 5000 as shown in FIG. 21. In FIG. 22, the first physical function may indicate the physical function 0 3100 as described above with reference to FIG. 18 or FIG. 21. In FIG. 22, the second physical function may indicate one of the physical functions 1 to n 3200-1 to 3200-n as described above with reference to FIG. 18 or FIG. 21.

Referring to FIG. 22, at step S2201, the PCIe device 3000 may receive function mode control information from the host 1000 through a first physical function.

The first physical function may receive the function mode control information from the host 1000 by using one of a vendor-defined message, a vendor-defined capability, a new PCIe capability defined by a user, Management Component Transport Protocol (MCTP) over SMbus (System Manager bus), and MCTP over PCIe.

At step S2203, the PCIe device 3000 may set an operation mode of each of the second physical functions to one of an active mode and an inactive mode based on the function mode control information.

Figure 23:
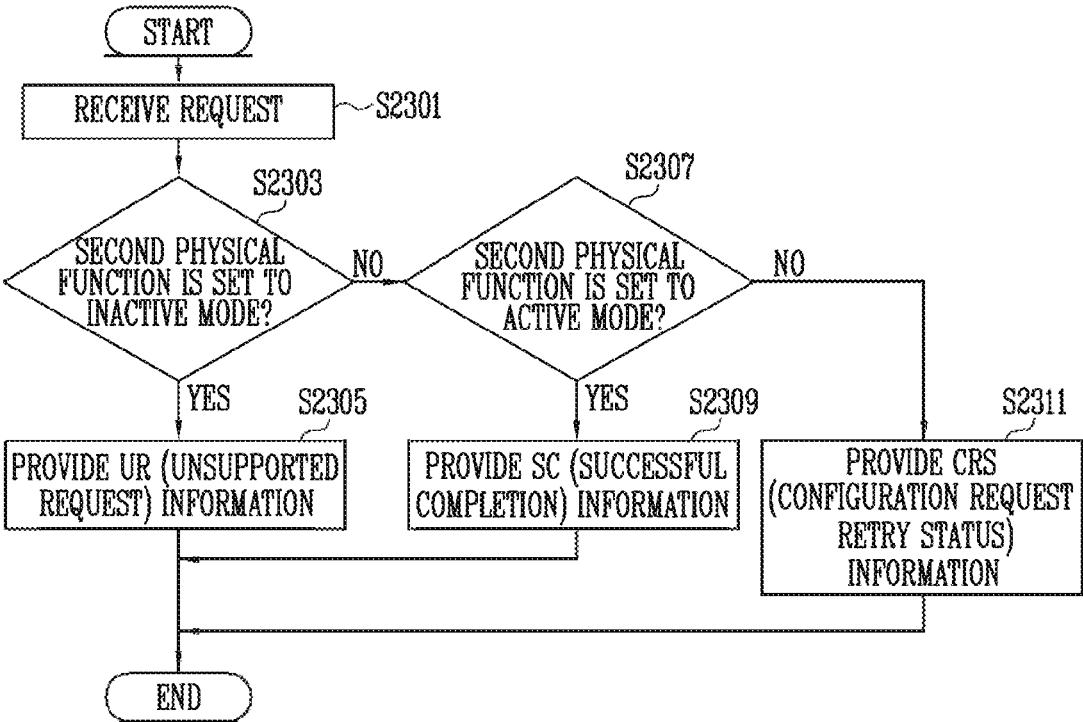
FIG. 23 illustrates a process for providing PCIe device completion information according to an embodiment of the present disclosure.

FIG. 23 illustrates a process for providing PCIe device completion information according to an embodiment of the present disclosure.

The process as shown in FIG. 23 may be performed by, for example, the PCIe device 5000 as shown in FIG. 21. In FIG. 23, a first physical function may indicate the physical function 0 3100 described above with reference to FIG. 18 or FIG. 21. In FIG. 11, a second physical function may indicate one of the physical functions 1 to n 3200-1 to 3200-n as described above with reference to FIG. 18 or FIG. 21.

Referring to FIG. 23, at step S2301, the PCIe device 5000 may receive a request intended for the second physical function from the host 1000.

At step S2303, the PCIe device 5000 may determine whether the second physical function for which the request is intended is set to an inactive mode or not.

According to a result of the determination at step S2303, when the second physical function is set to the inactive mode, the PCIe device 5000 may provide the host 1000 with UR information at step S2305.

According to the result of the determination at step S2303, when the second physical function is not set to the inactive mode, the PCIe device 5000 may perform step S2307.

At step S2307, the PCIe device 5000 may determine whether the second physical function for which the request is intended is set to an active mode or not.

According to a result of determination at step S2307, when the second physical function is set to the active mode, the PCIe device 5000 may provide the host 1000 with SC information at step S2309.

According to the result of determination at step S2307, when the second physical function is not set to the active mode, the PCIe device 5000 may provide the host 1000 with CRS information at step S2311.

For example, when the PCIe device 5000 receives a request from the host 1000 while the second physical function is being set to the active mode or is being set to the inactive mode, the PCIe device 5000 may provide the host 1000 with the CRS information at step S2311.

Figure 24:
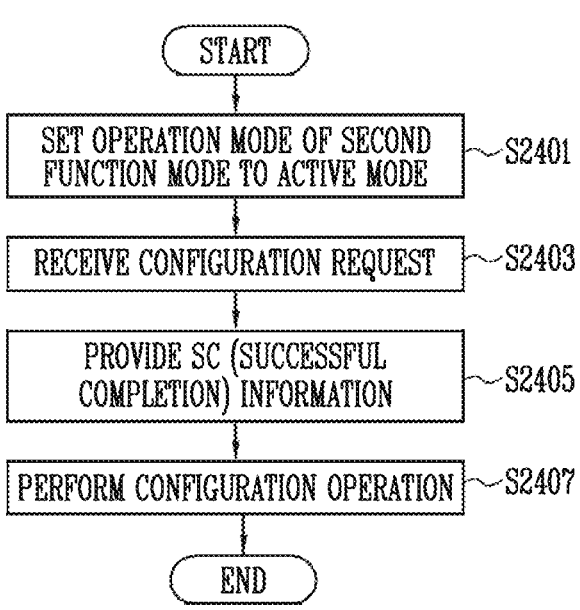
FIG. 24 illustrates a process for controlling a physical function set to an active mode according to an embodiment of the present disclosure.

FIG. 24 illustrates a process for controlling a physical function set to an active mode according to an embodiment of the present disclosure.

The process as shown in FIG. 24 may be performed by, for example, the PCIe device 3000 as shown in FIG. 18 or the PCIe device 5000 as shown in FIG. 21. Hereinafter, the operating process of the PCIe 3000 as shown in FIG. 18 will be described. However, the operating process may also be performed by the PCIe device 5000 as shown in FIG. 21. In FIG. 24, a first physical function may indicate the physical function 0 3100 described above with reference to FIG. 18 or FIG. 21. In FIG. 24, a second physical function may indicate one of the physical functions 1 to n 3200-1 to 3200-n as described above with reference to FIG. 18 or FIG. 21.

Referring to FIG. 24, at step S2401, the PCIe device 3000 may set an operation mode of the second physical function to an active mode based on the function mode control information.

At step S2403, the PCIe device 3000 may receive a configuration request for the second physical function which is set to the active mode from the host 1000.

At step S2405, the PCIe device 3000 may provide the host 1000 with SC information.

Steps S2403 and S2405 may correspond to steps S2301, S2307 and S2309 as described with reference to FIG. 23.

At step S2407, the PCIe device 3000 may perform a configuration operation on the second physical function set to the active mode.

The PCIe device 3000 may provide the host 1000 with information included in the configuration space of the second physical function set to the active mode. In addition, the PCIe device 3000 may set the configuration space of the second physical function in response to the configuration request.

Figure 25:
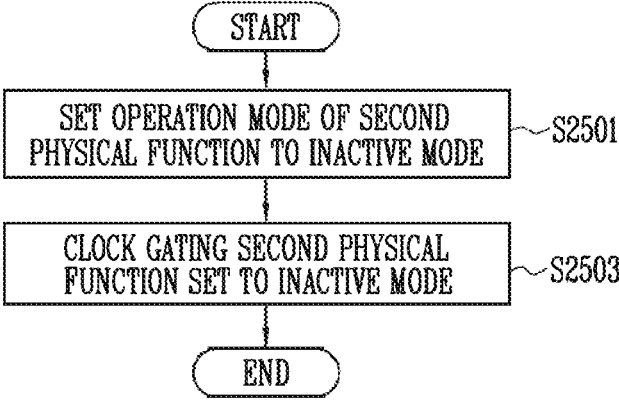
FIG. 25 illustrates a process for controlling a physical function set to an inactive mode according to an embodiment of the present disclosure.

FIG. 25 illustrates a process for controlling a physical function set to an inactive mode according to an embodiment of the present disclosure.

The process as shown in FIG. 25 may be performed by, for example, the PCIe device 3000 as shown in FIG. 18 or the PCIe device 5000 as shown in FIG. 21. Hereinafter, the operating process of the PCIe 3000 as shown in FIG. 18 will be described. However, the operating process may also be performed by the PCIe device 5000 as shown in FIG. 21. In FIG. 25, a first physical function may indicate the physical function 0 3100 described above with reference to FIG. 18 or FIG. 21. In FIG. 25, a second physical function may indicate one of the physical functions 1 to n 3200-1 to 3200-n as described above with reference to FIG. 18 or FIG. 21.

Referring to FIG. 25, at step S2501, the PCIe device 3000 may set an operation mode of the second physical function to an inactive mode based on the function mode control information.

At step S2503, the PCIe device 3000 may perform clock gating on the second physical function set to the inactive mode. Performing clock gating on the second physical function may reduce the power consumption of the PCIe device 3000.

According to the present disclosure, a PCIe device capable of reducing operation cost of a computing system including the PCIe device, and an operating method thereof may be provided.

In addition, according to the present disclosure, a PCIe device that enables or disables a PCIe function according to user's intentions, and an operating method thereof may be provided.

3. Controlling Access to Functions

Figure 26:
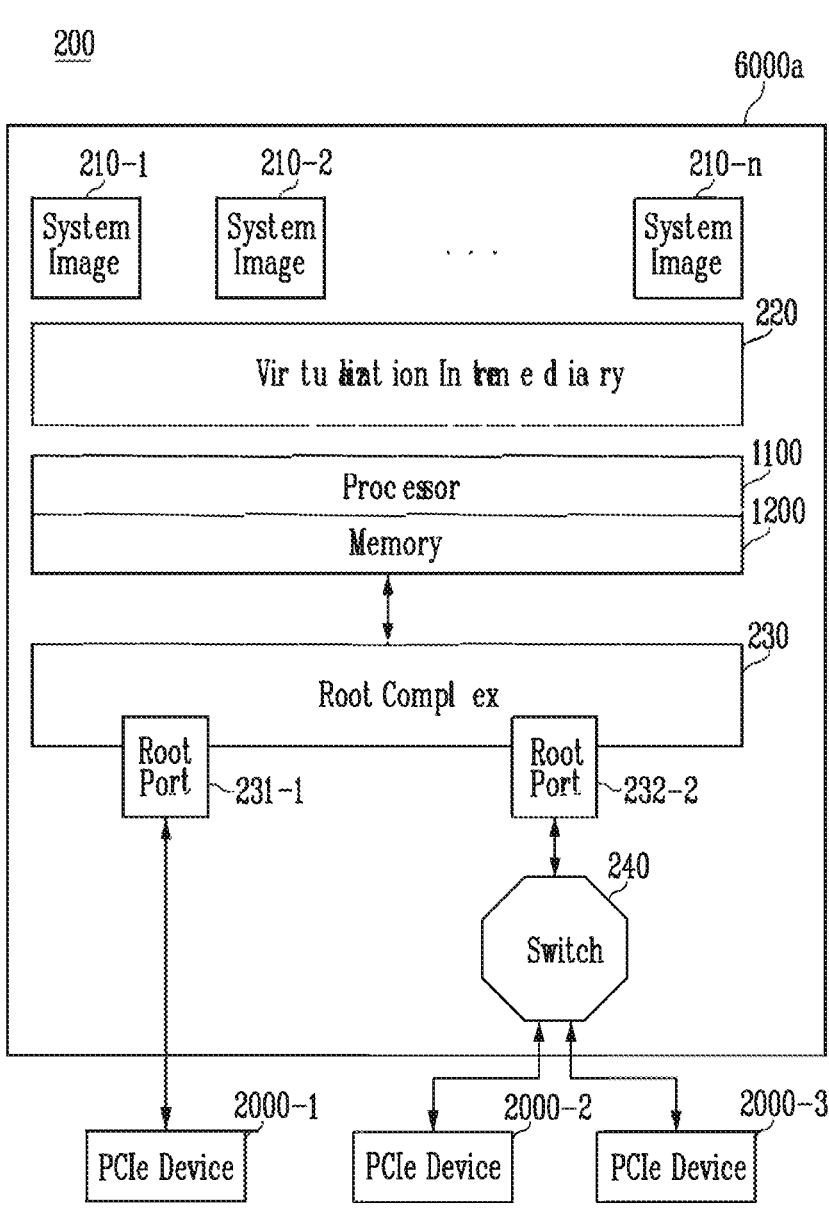
FIG. 26 illustrates another example of a computing system according to an embodiment of the present disclosure.

FIG. 26 illustrates another example (a computing system 200) of a computing system according to an embodiment of the present disclosure.

According to an embodiment, FIG. 26 shows an example of a general platform configuration where PCIe is available.

Referring to FIG. 26, the computing system 200 may include a host 6000a and a plurality of PCIe devices 2000-1 to 2000-3.

The host 6000a may further include a plurality of system images 210-1 to 210-n, a virtualization intermediary 220, a root complex 230, and a switch 240. In the embodiment as shown in FIG. 26, an overlapping description of the processor 1100 and the memory 1200 will be omitted since they have same configurations as shown in FIG. 1.

According to an embodiment, the plurality of PCIe devices 2000-1 to 2000-3 may indicate the PCIe device 2000 of FIG. 1.

The system images 210-1 to 210-n may refer to software components that are executed in a virtual system to which PCIe functions are assigned. According to an embodiment, the system images 210-1 to 210-n may be referred to as virtual machines. The system images 210-1 to 210-n may be software such as operating systems that are used to execute applications or reliable services. For example, the system images 210-1 to 210-n may each be respectively configured as a guest OS, a shared or non-shared I/O device driver, or the like. To increase effective hardware resource utilization without hardware modifications, the plurality of system images 210-1 to 210-n may be executed in the computing system 200.

According to an embodiment, a PCIe function may refer to an independent operation unit for providing physical resources included in the PCIe devices 2000-1 to 2000-3. In the present disclosure, a PCIe function and a "function" may refer to the same meaning.

The virtualization intermediary 220 may be a software component that supports one or more system images 210-1 to 210-n. According to an embodiment, the virtualization intermediary 220 may be referred to as hypervisor or a virtual machine monitor (VMM). The virtualization intermediary 220 may be interposed between hardware such as the processor 1100 and the memory 1200 and the system images 210-1 to 210-n. I/O operations (inbound or outbound) in the computing system 200 may be intercepted and processed by the virtualization intermediary 220. The virtualization intermediary 220 may present abstract the hardware resources to present the system images 210-1 to 210-n with its own virtual system. The actual hardware resources available to each of the system images 210-1 to 210-n may vary depending on workload or customer-specific policies.

The root complex 230 may signify the root of an I/O hierarchy that connects the processor 1100/memory 1200 subsystem to an I/O. According to an embodiment, the root complex 230 may be implemented as one configuration of the I/O manager 1300 as shown in FIG. 1.

The computing system 200 may include at least one root complex 230. In addition, each root complex 230 may include one or more root ports 231-1 and 232-2. Each of the root ports 231-1 and 232-2 may show a separate hierarchy. The root complex 230 may communicate with the switch 240 or the PCIe devices 2000-1 to 2000-3 through the root ports 231-1 and 232-2.

The capability to route peer-to-peer transactions between hierarchy domains through the root complex 230 may be optional. A hierarchy domain may be composed of a single endpoint or a sub-hierarchy containing one or switches and endpoints.

The root complex 230 may split a packet into smaller packets when routing peer-to-peer transactions between hierarchy domains. For example, the root complex 230 may a single packet having a 256-byte payload into two packets each having a 128-byte payload. However, the root complex 230 that supports peer-to-peer routing of vendor-defined messages may not split a vendor-defined message into smaller packets except at 128-byte boundaries (i.e., all resulting packets except the last packet must be an integral multiple of 128 bytes).

The root complex 230 may support generation of configuration requests as a requester. The root complex 230 may support the generation of I/O requests as a requester.

The root complex 230 may not support lock semantics as a completer. The root complex 230 may support generation of locked requests as a requester.

The switch 240 may be defined as a logical assembly of various virtual PCI-to-PCI bridges. The switch 240 may communicate with the PCIe devices 2000-2 and 2000-3.

The switch 240 may appear as configuration software with two or more logical PCI-to-PCI bridges.

The switch 240 may forward transactions using PCI bridge mechanisms. The switch 240 may forward all types of transaction layer packets (TLPs) between all port sets. The switch 240 may support locked requests.

The switch 240 may not be allowed to split a packet into smaller packets.

Arbitration between ingress ports of the switch 240 may be implemented using round robin or weighted round robin when contention occurs on the same virtual channel.

Endpoints may not appear in configuration software on the internal bus of the switch 240 as peers of the virtual PCI-to-PCI bridges representing the switch downstream ports.

Figure 27:
FIG. 27 illustrates another example of a computing system according to an embodiment of the present disclosure.

FIG. 27 illustrates another example (a computing system 300) of a computing system according to an embodiment of the present disclosure.

According to an embodiment, FIG. 27 shows an example of a Single Root input/output Virtualization (SR-IOV) configuration platform.

Single Root I/O Virtualization (SR-IOV) may enable the system images 210-1 to 210-n to share PCIe hardware resources in a virtual environment. According to an embodiment, SR-IOV may be developed to improve I/O performance of the PCIe devices 2000-1 to 2000-3 and directly connect the system images 210-1 to 210-n and the PCIe devices 2000-1 to 2000-3. Therefore, in the computing system 300 that contains SR-IOV capability, one or more PCIe devices 2000-1 to 2000-3 or PCIe functions may be assigned to one of the system images 210-1 to 210-n. According to an embodiment, the SR-IOV capability may have a specification that a single PCIe device (2000-1 to 2000-3) may appear as individual PCI devices 2000-1 to 2000-3 on the system image (210-1 to 210-n) under a single root port. According to an embodiment, the PCIe devices 2000-1 to 2000-3 supporting the SR-IOV capability may display a plurality of instances, i.e., PCIe functions on the system images 210-1 to 210-n. In addition, in the computing system 300 to which the SR-IOV capability is applied, the root complex 230 may directly connect the system images 210-1 to 210-*n* to the PCIe functions without the virtualization intermediary 220. Therefore, by using the SR-IOV capability, the root complex 230 may directly connect the system images 210-1 to 210-*n* of the host 1000 to the PCIe functions not via the virtualization intermediary 220.

Referring to FIG. 27, the computing system 300 may include a host 6000*b* and the plurality of PCIe devices 2000-1 to 2000-3.

The host 6000*b* may include a single root PCI manager (SR-PCIM) 310, a translation agent (TA) 320, and an address translation and protection table (ATPT) 300. In the embodiment as shown in FIG. 27, an overlapping description of the processor 1100, the memory 1200, the plurality of system images 210-1 to 210-*n*, the virtualization intermediary 220, the root complex 230, and the switch 240 will be omitted since they have same configurations as those shown in FIG. 1.

According to an embodiment, the plurality of PCI devices 2000-1 to 2000-3 as shown in FIG. 27 may represent the plurality of PCIe devices 2000-1 to 2000-3 as shown in FIG. 26. Each of the PCIe devices 2000-1 to 2000-3 may include an address translation cache (ATC) 341, a physical function (PF) 342, and a plurality of virtual functions (VF) 343. For convenience of explanation, FIG. 27 illustrates one physical function. However, according to embodiments, there may be a plurality of physical functions.

The single root PCI manager 310 may include software responsible for the configuration of the SR-IOV capability, management of the physical functions 342 and the virtual functions 343, processing of associated error events, and overall device controls such as power management, and hot plug services. According to an embodiment, the single root PCI manager 310 may be logically located on a virtualization intermediary 220 layer.

The translation agent 320 may be hardware, or a combination of hardware and software responsible for translating an address within a PCIe transaction into an associated platform physical address. The translation agent 320 may include an address translation cache to accelerate translation table access. In addition, the translation agent 320 may support address translation services (ATS) which enables a PCIe function to obtain address translations a priori to DMA access to the associated memory. In am SR-IOV implementation, the use of the translation agent 320 may be optional.

The address translation and protection table 330 may contain the set of address translations accessed by the translation agent 320 to process PCIe requests (DMA read, DMA write or interrupt request). In PCIe, interrupts may be treated as memory write operations. Through a combination of a requester identifier and an address contained within a PCIe transaction, an interrupt may be routed to any target (e.g., a processor core) transparent to the associated I/O function. DMA read and write requests may be translated through a combination of a routing ID and the address contained within the PCIe transaction. The use of the address translation and protection table 330 may be optional in an SR-IOV implementation.

The address translation cache 341 may exist in two locations within a platform. For example, the address translation cache 341 may be integrated within the translation agent 320, located in an RC, or located in the PCIe devices 2000-1 to 2000-3. In the PCIe devices 2000-1 to 2000-3, the address translation cache 341 may be populated using the ATS technology. A PCIe transaction indicating that a translated address is contained may bypass the address translation cache 341 of a platform to improve performance without damaging advantages related to the address translation and protection table 330. The use of the address translation cache 341 may be optional in an SR-IOV implementation.

The physical function 342 may be a PCIe function that supports the SR-IOV capability and accesses the single root PCI manager 310, the virtualization intermediary 220 or the system images 210-1 to 210-*n*.

The virtual function 343 may be a light-weight PCIe function that may directly access the system images 210-1 to 210-*n*. The virtual function 343 may operate as a virtual instance of the physical function 342. Thus, from point-of-view of the system images 210-1 to 210-*n*, the virtual function 343 may appear as an instance of the physical function 342. Resources associated with a main data movement of a function may be used in the system images 210-1 to 210-*n*. The virtual function 343 may be shared serially by different system images 210-1 to 210-*n*. For example, the virtual function 343 may be assigned to one system image (210-1 to 210-*n*), reset, and then be assigned to another system image (210-1 to 210-*n*). The virtual function 343 may be selectively migrated from one physical function 342 to another function. All virtual functions 343 associated with the physical function 342 may be the same device type as the physical function 342 (e.g., the same network device type or the same storage device type).

Figures 28, 29:
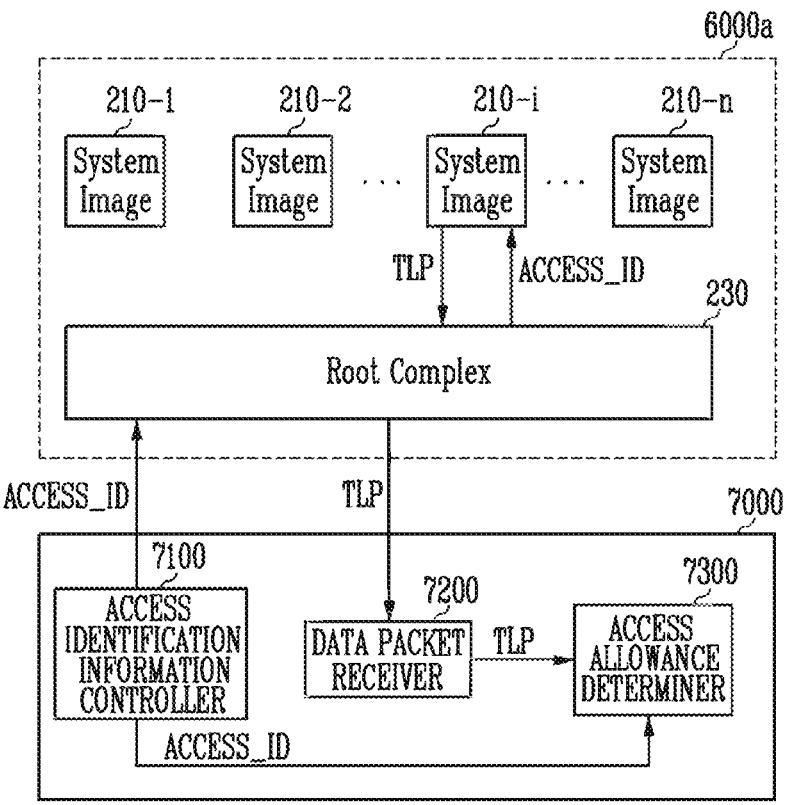
FIG. 28 illustrates a PCIe function according to an embodiment of the present disclosure.
FIG. 29 illustrates a structure of a transaction layer packet (TLP) according to an embodiment of the present disclosure.

Referring to FIG. 28, the PCIe function 7000 may be assigned to one of the plurality of system images 210-1 to 210-*n*. In FIG. 28, it may be assumed that the PCIe function 7000 is assigned to a system image 210-*i*.

According to an embodiment, the PCIe function 7000 may be one of various functions to which a PCIe interface is applicable, such as a physical function, a virtual function, a base function, and the like. A base function may be a PCIe function that is used in a virtualization environment using Multi Root I/O Virtualization (MR-IOV). MR-IOV may correspond to a technique for allowing the system images 210-1 to 210-*n* to share PCIe hardware resources in a virtualization environment including a plurality of virtual hierarchies. Each of the virtual hierarchies may include at least one physical function. In addition, each of the virtual hierarchies may further include at least one virtual function assigned to a physical function. According to an embodiment, a base function may be a PCIe function that supports the MR-IOV capability. In a virtualization environment including a plurality of root complexes, the MR-IOV capability may have specifications that allow a single PCIe device to be indicated as a plurality of PCIe devices on the system images 210-1 to 210-*n*. For example, the base function may manage a virtual hierarchy and a physical function according to the MR-IOV capability and assign a virtual function to the virtual hierarchy.

According to an embodiment, the PCIe function 7000 may include an access identification information controller 7100, a data packet receiver 7200, and an access allowance determiner 7300.

The access identification information controller 7100 may generate access identification information ACCESS_ID. The access identification information ACCESS_ID may be information for allowing an access to the PCIe function 7000. In other words, the access identification information ACCESS_ID may be used by the assigned system image 210-*i* to access the PCIe function 7000. Therefore, each of a plurality of PCIe functions PCIe function 0 to PCIe function N (such as those shown in FIGS. 3 through 5) may generate unique access identification information ACCESS_ID. Each of the system images 210-1 to 210-*n* may receive the unique access identification information ACCESS_ID from each of the plurality of PCIe functions PCIe function 0 to PCIe function N.

According to an embodiment, the access identification information ACCESS_ID may be generated by either the access identification information controller 7100 or the host 6000*a*. FIG. 28 describes an example in which the access identification information ACCESS_ID is generated by the access identification information controller 7100. An example in which the access identification information ACCESS_ID is generated by the host 6000*a* will be described below with reference to FIGS. 12 and 13.

In addition, the access identification information controller 7100 may store the access identification information ACCESS_ID and provide the assigned system image 210-*i* with the access identification information ACCESS_ID. For example, the access identification information controller 7100 may provide the root complex 230 with the access identification information ACCESS_ID. The root complex 230 may transmit the provided access identification information ACCESS_ID to the system image 210-*i*. The system image 210-*i* may store the transferred access identification information ACCESS_ID.

The data packet receiver 7200 may receive a data packet from the target system image 210-*i* among the plurality of system images 210-1 to 210-*n*. In the present disclosure, the target system image 210-*i* may be defined as the system image 210-*i* that transfers the data packet to the PCIe function 7000.

According to an embodiment, a data packet may include target identification information. For example, a prefix of the data packet may include target identification information. The target identification information may indicate the target system image 210-*i*. In other words, the target system image 210-*i* may receive and store the target identification information based on access identification information received from the allocated PCIe function 7000.

According to an embodiment, a data packet may be a transaction layer packet TLP. The target system image 210-*i* may transfer the transaction layer packet TLP including target identification information to the PCIe function 7000 to access. For example, the target system image 210-*i* may transfer the transaction layer packet TLP to the PCIe function 7000 through the root complex. The target identification information may be included in a prefix of the transaction layer packet TLP. The data packet receiver 7200 may receive the transaction layer packet TLP from the target system image 210-*i*. Thereafter, the data packet receiver 7200 may provide the transaction layer packet TLP to the access allowance determiner 7300.

The access allowance determiner 7300 may determine whether or not to allow an access to the target system image 210-*i* based on the access identification information ACCESS_ID and the target identification information. For example, the access allowance determiner 7300 may receive the access identification information ACCESS_ID from the access identification information controller 7100 and obtain the target identification information from the transaction layer packet TLP. The access allowance determiner 7300 may compare the access identification information ACCESS_ID with the target identification information and determine whether or not to allow the access of the target system image 210-*i* based on the comparison result.

For example, the access allowance determiner 7300 may permit the access of the target system image 210-*i* when the access identification information ACCESS_ID and the target identification information coincide with each other.

In another example, the access allowance determiner 7300 may not permit the access of the target system image 210-*i* when the access identification information ACCESS_ID and the target identification information do not coincide with each other. For example, when the transaction layer packet TLP is received from another system image, not from the system image 210-*i* allocated to the PCIe function 7000, the access identification information ACCESS_ID and the target identification information may not coincide with each other. The access allowance determiner 7300 may discard the received transaction layer packet TLP and provide completer abort (CA) information to the target system image.

Therefore, according to an embodiment, by determining whether or not to allow an access based on target identification information included in a prefix of a data packet and access identification information stored in a PCIe function, security of the computing system 200 including the PCIe function may be strengthened.

FIG. 29 illustrates the structure of a transaction layer packet 8000 according to an embodiment of the present disclosure.

According to an embodiment, the transaction layer packet 8000 may be a data packet used to perform communication in the PCIe interface. For example, a requester may provide a completer with a request by using the transaction layer packet 8000. The requester may represent a configuration for issuing a request and the completer may be a configuration providing a completion corresponding to the request.

Referring to FIG. 29, the transaction layer packet 8000 may include a prefix PREFIX, a header HEADER, a data payload DATA PAYLOAD, and a digest DIGEST.

The prefix PREFIX precedes the header HEADER and may include additional information. According to an embodiment, the prefix PREFIX may include the access identification information ACCESS_ID. For example, the system images 210-1 to 210-*n* may generate the transaction layer packet 8000 by including the access identification information ACCESS_ID in the prefix PREFIX. The system images 210-1 to 210-*n* may provide the PCIe function 7000 with the generated transaction layer packet 8000. The PCIe function 7000 may receive the transaction layer packet 8000 from the target system image (210-1 to 210-*n*). The prefix PREFIX of the received transaction layer packet 8000 may include target identification information, i.e., the access identification information ACCESS_ID from the target system image (210-1 to 210-*n*).

The header HEADER may contain information required to determine the characteristics and purpose of the transaction layer packet 8000. For example, the header HEADER may include information such as format, type, transaction ID, attributes, traffic class, address/routing information, byte enables, message encoding, and completion status of the transaction layer packet 8000.

The data payload DATA PAYLOAD may include information to be transmitted through the transaction layer packet 8000. In other words, the data payload DATA PAYLOAD may include information to be processed by the configuration receiving the transaction layer packet 8000.

The digest DIGEST may include an end-to-end CRC (ECRC) value used to detect errors in the transaction layer packet 8000. The digest DIGEST may be optional.

Figure 30:
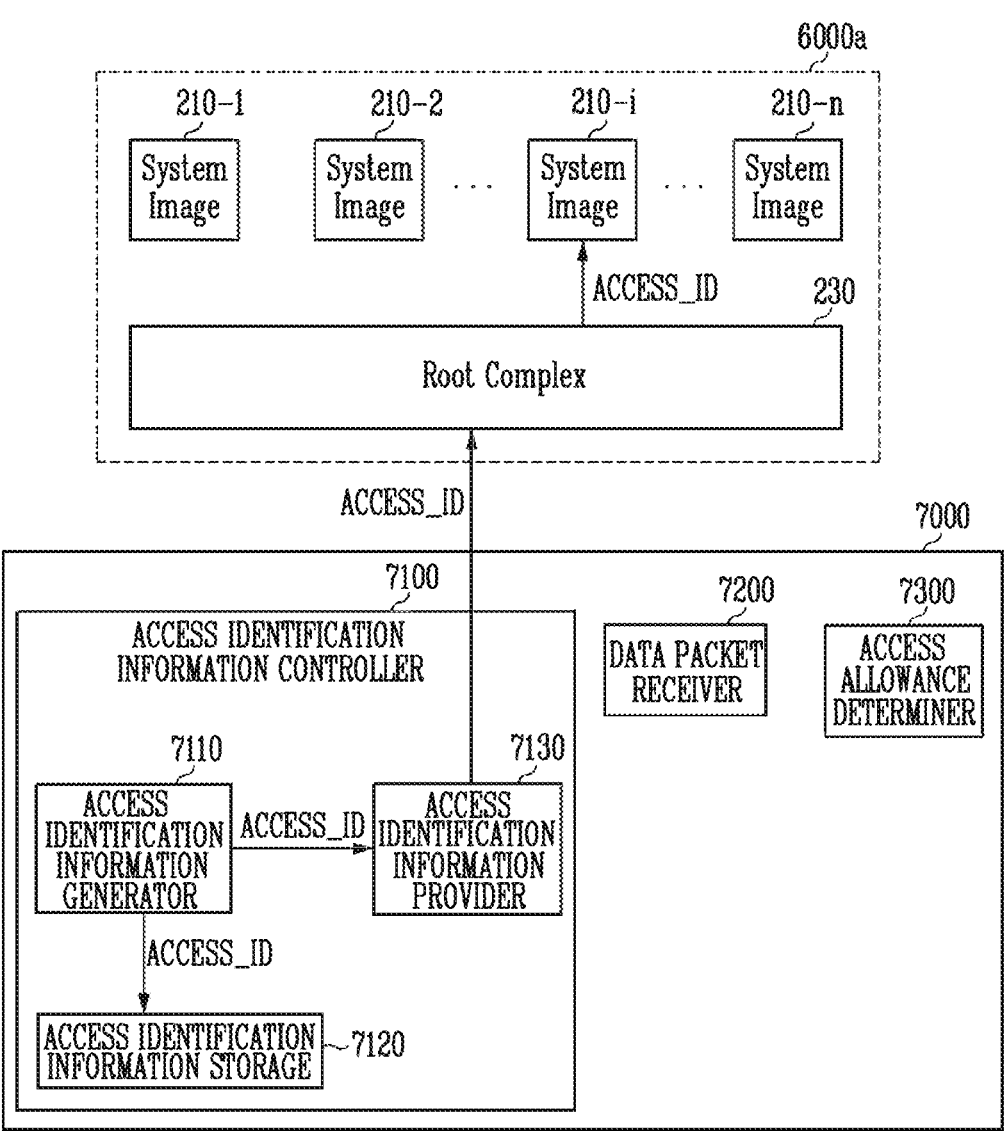
FIG. 30 illustrates an example of generation of access identification information according to an embodiment of the present disclosure.

FIG. 30 illustrates an example of generation of access identification information according to an embodiment of the present disclosure.

In FIG. 30, it may be assumed that the PCIe function 7000 is assigned to the system image 210-*i*.

FIG. 30 illustrates an example in which the access identification information ACCESS_ID is generated by the PCIe function 7000.

Referring to FIG. 8, the access identification information controller 7100 may include an access identification information generator 7110, an access identification information storage 7120, and an access identification information provider 7130.

The access identification information generator 7110 may generate a random number according to a random number generation scheme and generate the access identification information ACCESS_ID based on the generated random number. For example, the access identification information ACCESS_ID may include a random number.

According to an embodiment, the access identification information generator 7110 may generate a random number based on a different seed from a seed used in another PCIe function. The seed may include a random number table by which random numbers are generated. For example, a plurality of PCIe functions PCIe function 0 to PCIe function N may generate random numbers based on different respective seeds.

According to an embodiment, the access identification information generator 7110 may determine whether not to re-generate the access identification information ACCESS_ID based on a result of comparison between access identification information of another PCIe function and the access identification information generated by the access identification information generator 7110. For example, the access identification information generator 7110 may receive the access identification information of another PCIe function from an other PCIe function. Thereafter, the access identification information generator 7110 may compare the access identification information of the other PCIe function with the access identification information generated by the access identification information generator 7110. When the access identification information of the other PCIe function is consistent with the access identification information generated by the access identification information generator 7110, the access identification information generator 7110 may re-generate the access identification information of the PCIe function 7000. In an embodiment, an access identification information is consistent with another access identification information when it is the same as the other access identification information, but embodiments are not limited thereto. Subsequently, the access identification information generator 7110 may repeat access identification information comparison and access identification information re-generation until the access identification information of the other PCIe function becomes inconsistent with the access identification information generated by the access identification information generator 7110. When the access identification information of another PCIe function is not consistent with the generated access identification information, the access identification information generator 7110 may provide the generated access identification information ACCESS_ID to the access identification information storage 7120 and the access identification information provider 7130.

The access identification information storage 7120 may store the access identification information ACCESS_ID. In embodiments, the access identification information storage 7120 may store two or more different access identification information ACCESS_IDs.

The access identification information provider 7130 may provide the assigned system image 210-*i* with the access identification information ACCESS_ID. For example, the access identification information provider 7130 may provide the root complex 230 with the access identification information ACCESS_ID. The root complex 230 may provide the assigned system image 210-*i* with the access identification information ACCESS_ID.

In addition, when determining whether or not to allow an access, the access identification information provider 7130 may provide the access allowance determiner 7300 with the one or more access identification information ACCESS_ID stored in the access identification information storage 7120.

According to an embodiment, the access identification information provider 7130 may provide the access identification information ACCESS_ID using one of a vendor-defined message, a vendor-defined capability, a new PCIe capability defined by a user, Management Component Transport Protocol (MCTP) over SMbus (System Manager bus), and MCTP over PCIe.

According to an embodiment, the vendor-defined message may allow expansion of PCI Express messaging capabilities. For example, the vendor-defined message may include a requester ID field for transmitting a message, a receiver ID field for receiving a message, and a vendor-defined field. The receiver ID may include at least one of a bus number, a device number, and a function number. For example, the access identification information provider 7130 may provide the access identification information ACCESS_ID to the system image 210-*i* through the vendor-defined field of the vendor-defined message. The requester ID may include identification information of the PCIe function 7000. The requester ID may include identification information of the system image 210-*i*.

According to an embodiment, the vendor-specific capability may be a capability structure in PCI-compatible Configuration Space. The vendor-specific capability may allow device vendors to use the capability mechanism for vendor-specific information. A vendor-specific capability register may include a capability ID field, a next capability pointer field, a capability length field, and a vendor specific information field. The capability ID field may indicate a PCIe capability structure. The capability ID field may provide a capability ID indicating a vendor-specific capability structure. The next capability pointer field may indicate an offset for the next PCI capability structure. When there are no other items in the linked list of capabilities, the next capability pointer field may include 00h. The capability length field may provide the number of bytes included in the capability structure. The vendor specific information field may vary depending on vendors. Therefore, the vendor specific information field may be set to various values depending on a user. For example, the access identification information provider 7130 may provide the access identification information ACCESS_ID to the system image 210-*i* through the vendor specific information field of the vendor specific capability.

According to an embodiment, the new PCIe capability defined by the user may include identification information of a device which provides information, identification information of device which receives information, and a field which includes information.

According to an embodiment, the access identification information controller 7100 may update the access identification information ACCESS_ID every predetermined period. For example, the access identification information generator 7110 may generate new access identification information every preset period. The access identification information generator 7110 may perform the above-described access identification information comparison and access identification information re-generation. The access identification information storage 7120 may store new access identification information, and the access identification information provider 7130 may provide the assigned system image 210-*i* with the new access identification information. Therefore, the system image 210-*i* may store new access identification information every predetermined period. The system image 210-*i* may remove the previous access identification information generated before the new access identification information is generated, and may provide the PCIe function 7000 with a data packet including the new access identification information.

According to an embodiment, when the access identification information storage 7120 receives the data packet including the new access identification information from the system image 210-*i* through the data packet receiver 7200, the access identification information storage 7120 may remove the old access identification information. The access allowance determiner 7300 may allow an access of the data packet including the new access identification information. In other words, the access allowance determiner 7300 may not permit an access to the data packet including the previous access identification information after the old identification information is removed. On the other hand, when the access identification information storage 7120 does not receive the data packet including the new access identification information, and stores both the new access identification information and the old access identification information in the access identification information storage 7120, the access allowance determiner 7300 may allow an access to both new and old access identification information. The above access allowance operation will be described below with reference to FIG. 33.

Figure 31:
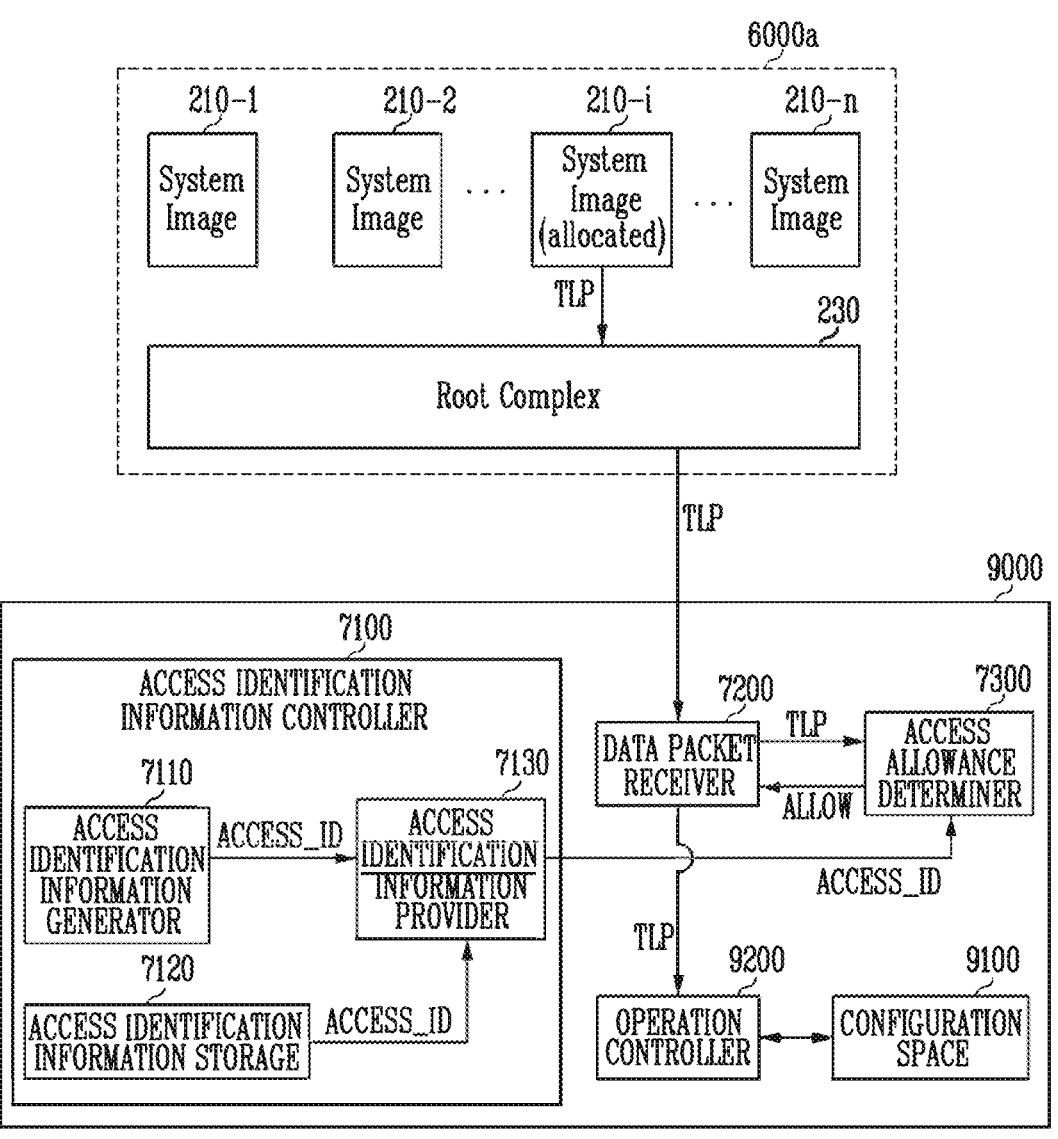
FIG. 31 illustrates an example in which an access is allowed according to an embodiment of the present disclosure.

FIG. 31 illustrates an example in which an access is allowed according to an embodiment of the present disclosure.

In FIG. 31, it may be assumed that a PCIe function 9000 is assigned to the system image 210-*i*.

Referring to FIG. 31, the PCIe function 9000 may further include a configuration space 9100 and an operation controller 9200. In the example shown in FIG. 31, descriptions of the access identification information controller 7100, the access identification information generator 7110, the access identification information storage 7120, and the access allowance determiner 7300 will be omitted since they are the same configurations as shown in FIG. 30.

The configuration space 9100 may include information for configuring the PCIe function 9000. For example, the configuration space 9100 may include registers for configuring the common function 9000 to perform operations associated with a PCIe interface. According to an embodiment, the configuration space 9100 may include information on capabilities available in the PCIe function 9000.

According to an embodiment, the PCIe function 9000 may perform a configuration operation in response to a configuration request of the host 6000*a*. The PCIe function 9000 and the host 6000*a* may perform communication based on values stored in the configuration space 9100 which are set according to the configuration operation.

The operation controller 9200 may control operations of the PCIe function 9000 based on information included in the configuration space 9100. For example, the operation controller 9200 may control the operations of the PCIe function 9000 based on the configuration space 9100 that is set according to the configuration space. For example, the operation controller 9200 may control operations of the PCIe function 9000 based on the field values of the registers set in the configuration space 9100.

According to an embodiment, the operation controller 9200 may process the transaction layer packet TLP provided from the data packet receiver 7200 when access allowance is determined. For example, the target system image 210-*i* may provide the data packet receiver 7200 with the transaction layer packet TLP including the target identification information stored in the target system image 210-*i*. The target identification information stored in the system image 210-*i* may indicate access identification information. The access allowance determiner 7300 may receive the transaction layer packet TLP from the data packet receiver 7200 and receive the access identification information ACCESS_ID stored in the access identification information storage 7120 from the access identification information provider 7130. Since the target identification information stored in the transaction layer packet TLP and the access identification information ACCESS_ID stored in the transaction layer packet TLP are consistent with (for example, the same as) each other, the access allowance determiner 7300 may allow an access of the transaction layer packet TLP. The access allowance determiner 7300 may provide an access allow signal ALLOW to the data packet receiver 7200. The operation controller 9200 may process the transaction layer packet TLP provided from the data packet receiver 7200 according to the access allow signal ALLOW.

Figure 32:
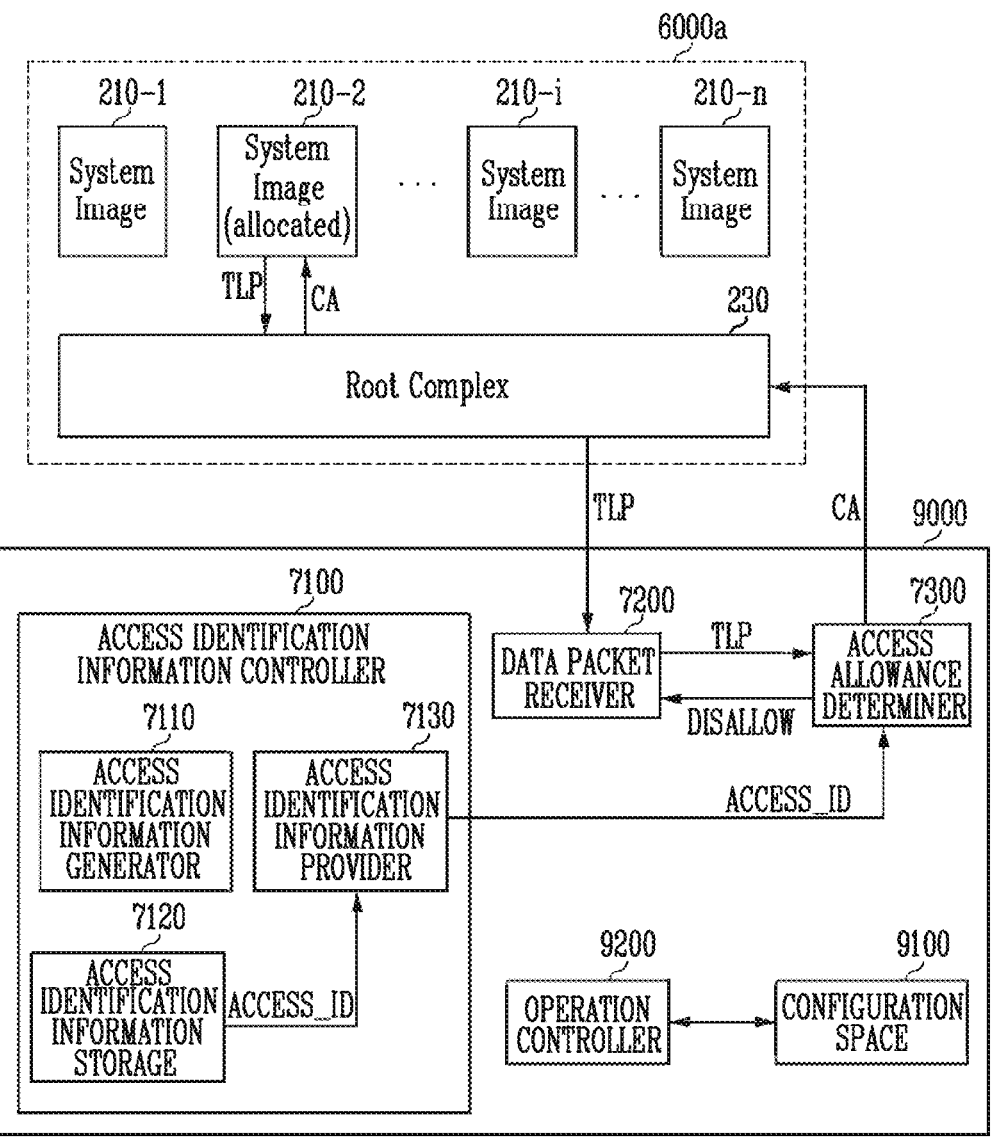
FIG. 32 illustrates an example in which an access is allowed according to an embodiment of the present disclosure.

FIG. 32 illustrates an example in which an access is not allowed according to an embodiment of the present disclosure.

In FIG. 32, it may be assumed that the PCIe function 9000 is assigned to the system image 210-*i*. In addition, it may be assumed that the PCIe function 9000 receives the transaction layer packet TLP from a non-assigned system image 210-2.

Referring to FIG. 32, the target system image 210-2 may provide the data packet receiver 7200 with the transaction layer packet TLP including target identification information stored in the target system image 210-2. The target identification information stored in the target system image 210-2 may indicate access identification information. The access allowance determiner 7300 may receive the transaction layer packet TLP from the data packet receiver 7200 and may receive the access identification information ACCESS_ID stored in the access identification information storage 7120 from the access identification information provider 7130. Since the target identification information stored in the transaction layer packet TLP and the access identification information ACCESS_ID are not consistent with each other, the access allowance determiner 7300 may not allow an access of the transaction layer packet TLP. In an embodiment, the access identification information is consistent with the target identification information when it is the same as the target identification information, but embodiments are not limited thereto. The access allowance determiner 7300 may provide an access disallow signal DISALLOW to the data packet receiver 7200. The data packet receiver 7200 may discard the transaction layer packet TLP in response to the access disallow signal DISALLOW.

According to an embodiment, the access allowance determiner 7300 may provide the target system image 210-2 with Completer Abort (CA) information. For example, the access allowance determiner 7300 may provide completion information in response to the transaction layer packet TLP. The completion information may include information indicating the current status of the PCIe function 9000. For example, the completion information may include a completion header including a completion status field. The completion status field may include Successful Completion (SC) information, Unsupported Request (UR) information, Configuration Request Retry Status (CRS) information, and Completer Abort (CA) information. For example, the access allowance determiner 7300 may return the CA information to the target system image 210-2 according to an access-disallowed determination with respect to the transaction layer packet TLP.

Figure 33:
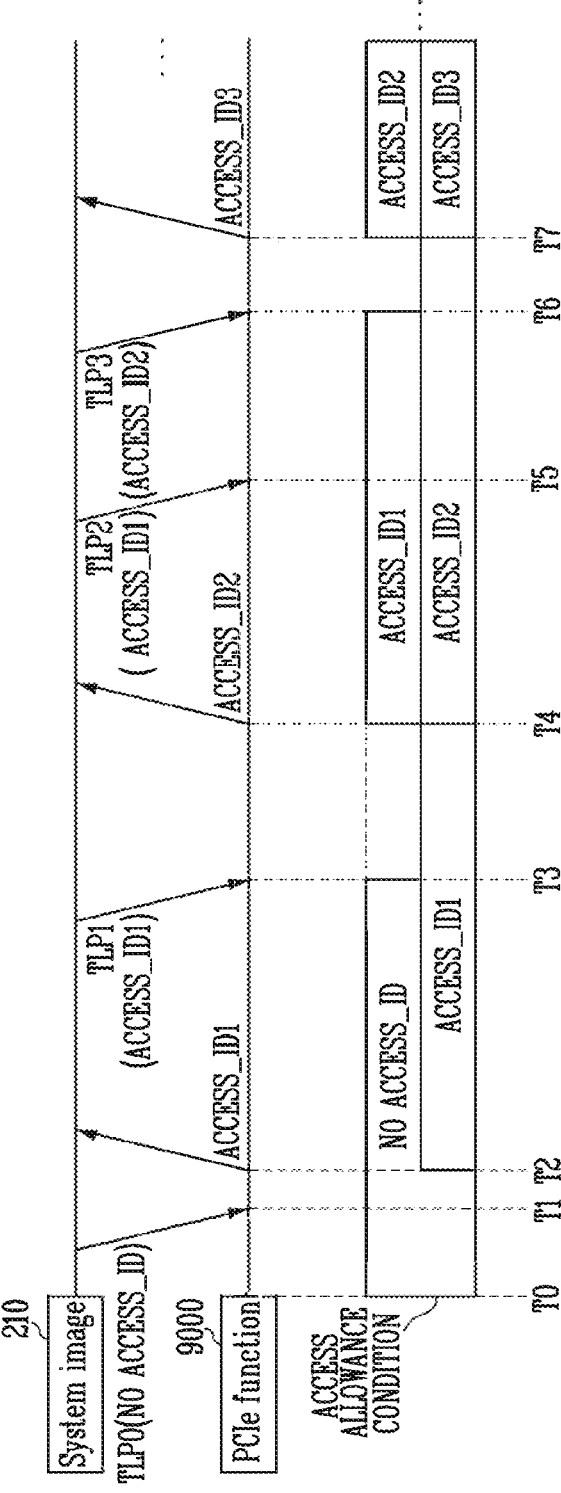
FIG. 33 illustrates an example in which whether or not to allow an access is determined according to an embodiment of the present disclosure.

FIG. 33 illustrates an example in which whether or not to allow an access is determined according to an embodiment of the present disclosure.

In FIG. 33, arrows at the top and center indicate operations by which the system image 210 transfers a transaction layer packet and the PCIe function 9000 provides access identification information according to the flow of time. Blocks at the bottom indicate access allowance conditions with time. The access allowance conditions may refer to access identification information used for comparison with target identification information. It may be assumed that the PCIe function 9000 is assigned to the system image 210. The system image 210 may indicate one of the plurality of system images 210-1 to 210-$n$ as shown in FIG. 26. The operations described with reference to FIG. 33 may apply to the PCIe function 7000.

Referring to FIG. 33, at TO, the computing system 200 may be in a state where the computing system 200 performs normal packet exchange by link initialization and training. Access identification information may not be present in the access identification information storage 7120 (NO ACCESS_ID) since the PCIe function 9000 has not yet received a transaction layer packet from the system image 210.

In addition, the transaction layer packet TLP which is provided first to the PCIe function 9000 may not include the access identification information because the system image 210 has not yet received the access identification information from the PCIe function 9000.

At T1, the PCIe function 9000 may receive a transaction layer packet TLP0 which does not include access identification information. Since the access identification information storage 7120 does not contain the access identification information, the access allowance determiner 7300 may allow an access of the transaction layer packet TLP0.

At T2, the access identification information generator 7110 may generate first access identification information ACCESS_ID1. The generated first access identification information ACCESS_ID1 may be stored in the access identification information storage 7120. In addition, the PCIe function 9000 may provide the first access identification information ACCESS_ID1 to the system image 210.

According to an embodiment, when either of the new access identification information or the (not-yet-deleted) old access identification information generated before the new access identification information is consistent with the target identification information, the access allowance determiner 7300 may allow an access of the target system image 210. When both the new access identification information and the old access identification information are not consistent with the target identification information, the access allowance determiner 7300 may not allow the access and may provide the target system image 210 with the CA information. In other words, the access allowance determiner 7300 may use the new access identification information and the old access identification information as the access allowance conditions until the old access identification information is updated to the new access identification information and deleted. The old access identification information may be deleted from the access identification information storage 7120 at a time when a transaction layer packet including new access identification information is received.

For example, from T2 to T3 when a transaction layer packet TLP1 including target identification information consistent with the first access identification information ACCESS_ID1 is received, the access allowance determiner 7300 may allow an access of a transaction layer packet not including access identification information or a transaction layer packet including the first access identification information ACCESS_ID1.

At T3, the PCIe function 9000 may receive the transaction layer packet TLP1 including the first access identification information ACCESS_ID1 from the system image 210. Because the first access identification information ACCESS_ID1 has not been deleted yet, the access allowance determiner 7300 may allow an access of the transaction layer packet TLP1. In addition, the access allowance determiner 7300 may remove the transaction layer packet not including the access identification information from the access allowance conditions; that is, after the transaction layer packet TLP1 including the target indication information consistent with the first access identification information ACCESS_ID1 is received by the PCIe function 9000 at T3, access by transaction layer packets that do not include access identification information will not be allowed.

From T3 to T4 when second access identification information ACCESS_ID2 is generated, the access allowance determiner 7300 may allow an access of the transaction layer packet including target indication information consistent with the first access identification information ACCESS_ID1.

At T4, the access identification information generator 7110 may generate the second access identification information ACCESS_ID2. T4 may refer to a time after a predetermined period of time has passed from T2. The second access identification information ACCESS_ID2 may be stored in the access identification information storage 7120. The access identification information storage 7120 may store the first access identification information ACCESS_ID1 and the second access identification information ACCESS_ID2 together. In addition, the PCIe function 9000 may provide the second access identification information ACCESS_ID2 to the system image 210.

From T4 to T6 when a transaction layer packet TLP3 including the second access identification information ACCESS_ID2 is received, the access allowance determiner 7300 may allow an access of the transaction layer packet including target indication information consistent with the first access identification information ACCESS_ID1 or the transaction layer packet including target indication information consistent with the second access identification information ACCESS_ID2.

At T5, the PCIe function 9000 may receive the transaction layer packet TLP2 including target indication information consistent with the first access identification information ACCESS_ID1 from the system image 210. The access allowance determiner 7300 may allow an access of the transaction layer packet TLP2. The first access identification information ACCESS_ID1 may remain in the access identification information storage 7120 since the PCIe function 9000 has received the target indication information consistent with first access identification information ACCESS_ID1 corresponding to the old access identification information, not target indication information consistent with the new access identification information, i.e., the second access identification information ACCESS_ID2.

At T6, the PCIe function 9000 may receive the transaction layer packet TLP3 including target indication information consistent with the second access identification information ACCESS_ID2 from the system image 210. In response, the access allowance determiner 7300 may allow an access of the transaction layer packet TLP3, and the access identification information storage 7120 may remove the first access identification information ACCESS_ID1. In addition, the access allowance determiner 7300 may remove the transaction layer packet including target indication information consistent with the first access identification information ACCESS_ID1 from the access allowance conditions.

According to an embodiment, when the old access identification information is removed from the access identification information storage 7120, the access allowance determiner 7300 may determine whether or not to allow an access of the target system image 210 based on a result of comparing the most recent access identification information with the target identification information. For example, when the most recent access identification information and the target identification information are consistent with each other, the access allowance determiner 7300 may allow the access of the target system image 210. In addition, when the new access identification information is not consistent with the target identification information, the access allowance determiner 7300 may not allow the access and may provide the target system image 210 with the CA information.

For example, from T6 to T7 when third access identification information ACCESS_ID3 is generated, the access allowance determiner 7300 may allow an access of the transaction layer packet including target indication information consistent with the second access identification information ACCESS_ID2.

At T7, the access identification information generator 7110 may generate the third access identification information ACCESS_ID3. T7 may refer to a time after a predetermined period of time has passed from T4. The third access identification information ACCESS_ID3 may be stored in the access identification information storage 7120. The access identification information storage 7120 may store the second access identification information ACCESS_ID2 and the third access identification information ACCESS_ID3 together. In addition, the PCIe function 9000 may provide the third access identification information ACCESS_ID3 to the system image 210.

From T7 to the time when a transaction layer packet including the third access identification information ACCESS_ID3 is received, the access allowance determiner 7300 may allow the access of the transaction layer packet including target indication information consistent with the second access identification information ACCESS_ID2 or the transaction layer packet including target indication information consistent with the third access identification information ACCESS_ID3.

Figure 34:
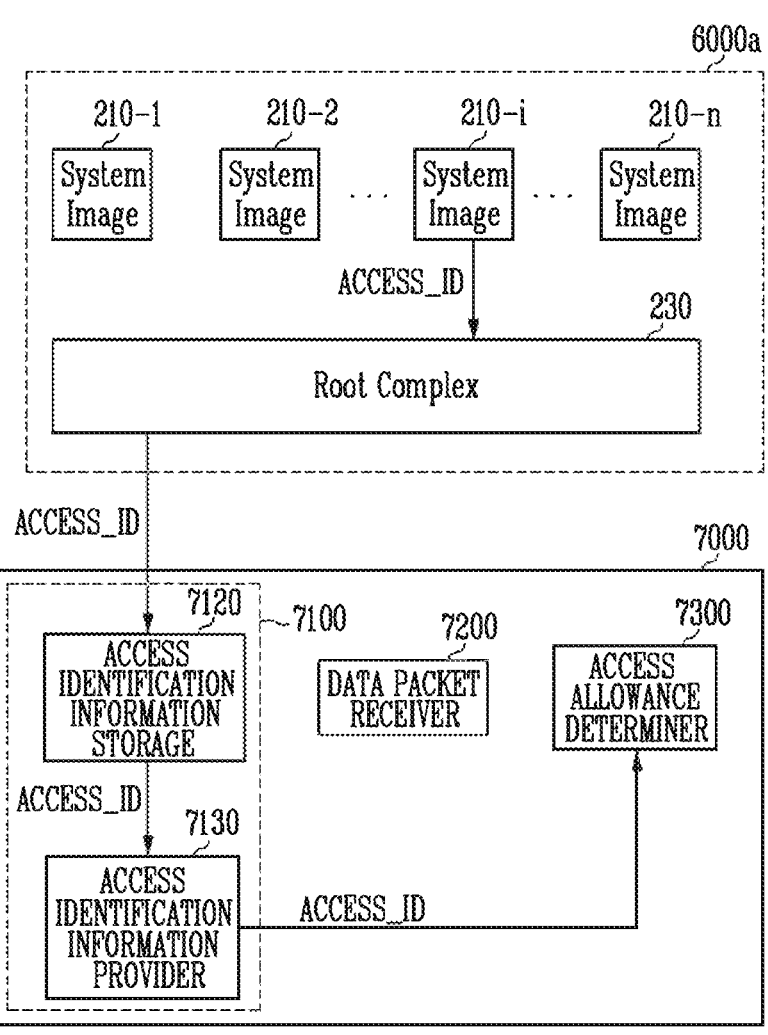
FIG. 34 illustrates another example of generation of access identification information according to an embodiment of the present disclosure.

FIG. 34 illustrates another example of generation of access identification information according to an embodiment of the present disclosure.

An example in which the access identification information ACCESS_ID is generated by the system images 210-1 to 210-$n$ is described with reference to FIG. 34. In FIG. 34, it may be assumed that the PCIe function 7000 is assigned to the system image 210-$i$. In addition, in FIG. 34, the access identification information controller 7100 may not include the access identification information generator 7110.

Descriptions of the host 6000a, the plurality of system images 210-1 to 210-$n$, the root complex 230, the data packet receiver 7200 and the access allowance determiner

7300 as shown in FIG. 34 will be omitted since they are the same as those shown in FIG. 28 or 8.

Referring to FIG. 34, the host 6000a may generate the access identification information ACCESS_ID. For example, the system image 210-$i$ may generate the access identification information ACCESS_ID. The system image 210-$i$ may store the access identification information ACCESS_ID. The system image 210-$i$ may provide the access identification information ACCESS_ID to the PCIe function 7000. The access identification information generation operations performed by the access identification information generator 7110, such as access identification information generation based on a random number, access identification information re-generation, and access identification information update at a predetermined period as described above with reference to FIG. 30 may in this embodiment be performed by the system image 210-$i$.

According to an embodiment, the system image 210-$i$ may provide the access identification information ACCESS_ID to the PCIe function 7000 by using one of a vendor-defined message, a vendor-defined capability, a new PCIe capability defined by a user, Management Component Transport Protocol (MCTP) over SMbus (System Manager bus), and MCTP over PCIe.

The access identification information storage 7120 may store the access identification information ACCESS_ID provided from the system image 210-$i$. The access allowance determiner 7300 may determine whether or not to allow an access based on the access identification information ACCESS_ID transferred from the access identification information provider 7130.

Since the access identification information ACCESS_ID is generated by the system image 210-$i$, the system image 210-$i$ may not need to provide the old access identification information; that is, the system image 210-$i$ will send no packets using older access identification information after sending the newly-generated access identification information ACCESS_ID. Therefore, when the access identification information ACCESS_ID is updated every predetermined period by the system image 210-$i$, the access allowance determiner 7300 may determine whether or not to allow an access based on only the most-recently-received access identification information.

Figure 35:
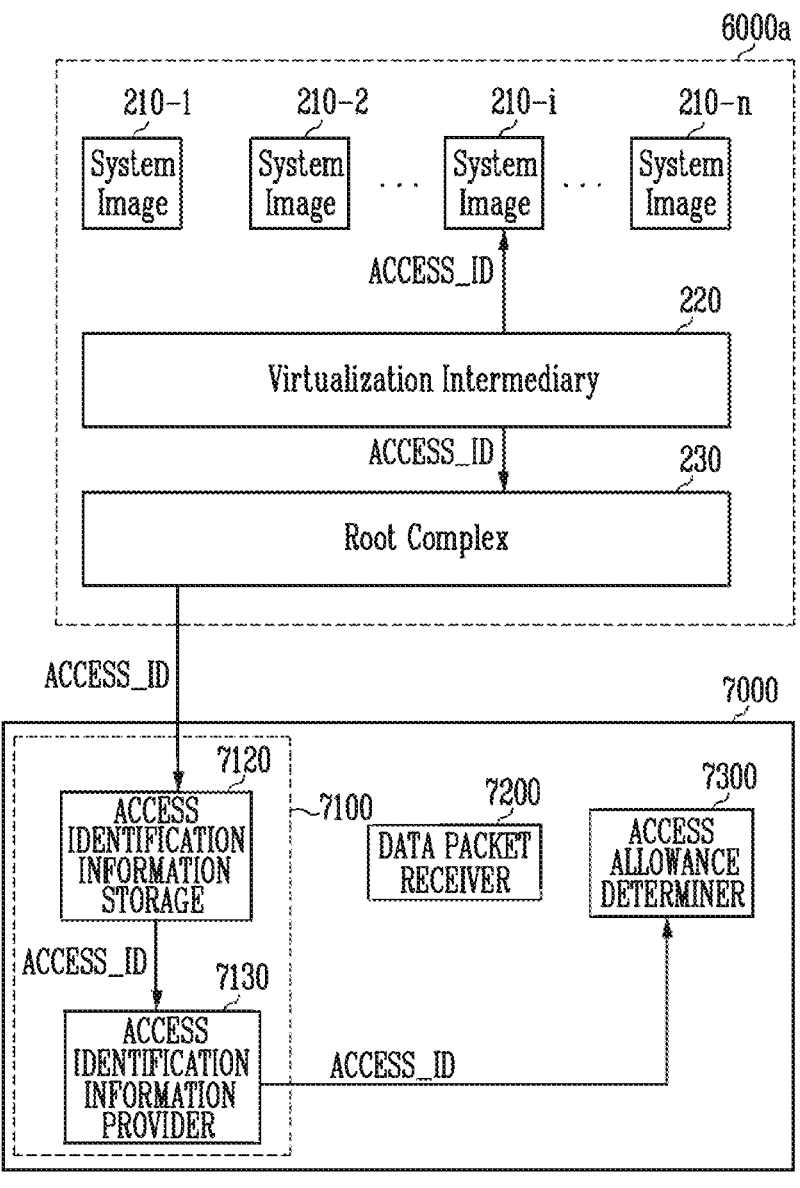
FIG. 35 illustrates another example of generation of access identification information according to an embodiment of the present disclosure.

FIG. 35 illustrates another example of generation of access identification information according to an embodiment of the present disclosure.

FIG. 35 illustrates an example in which the access identification information ACCESS_ID is generated by the virtualization intermediary 220. In FIG. 35, it may be assumed that the PCIe function 7000 is assigned to the system image 210-$i$. In addition, in FIG. 35, the access identification information controller 7100 may not include the access identification information controller 7110.

Descriptions of the host 6000a, the plurality of system images 210-1 to 210-$n$, the root complex 230, the data packet receiver 7200, and the access allowance determiner 7300 as shown in FIG. 35 will be omitted since they are the same as those shown in FIG. 28 or 8.

Referring to FIG. 35, the host 6000a may generate the access identification information ACCESS_ID. For example, the virtualization intermediary 220 may generate the access identification information ACCESS_ID. For example, the virtualization intermediary 220 may store the access identification information ACCESS_ID. The virtualization intermediary 220 may provide the access identification information ACCESS_ID to the system image 210-$i$ and the PCIe function 7000. The access identification information generation operations by the access identification information generator 7110, such as access identification information generation based on a random number, access identification information re-generation, and access identification information update at a predetermined period as described above with reference to FIG. 30 may in this embodiment be performed by the virtualization intermediary 220.

According to an embodiment, the virtualization intermediary 220 may provide the PCIe function 7000 with the access identification information ACCESS_ID by using one of a vendor-defined message, a vendor-defined capability, a new PCIe capability defined by a user, Management Component Transport Protocol (MCTP) over SMbus (System Manager bus), and MCTP over PCIe.

The access identification information storage 7120 may store the access identification information ACCESS_ID provided from the virtualization intermediary 220. The access allowance determiner 7300 may determine whether or not to allow an access based on the access identification information ACCESS_ID transferred from the access identification information provider 7130.

The system image **210-*i* may require time to update the old access identification information to the new access identification information after the access identification information ACCESS_ID is generated by the virtualization intermediary 220. Therefore, the operation of determining whether or not to allow an access as described above with reference to FIG. 33 may apply to the access allowance determiner 7300**.

Figure 36:
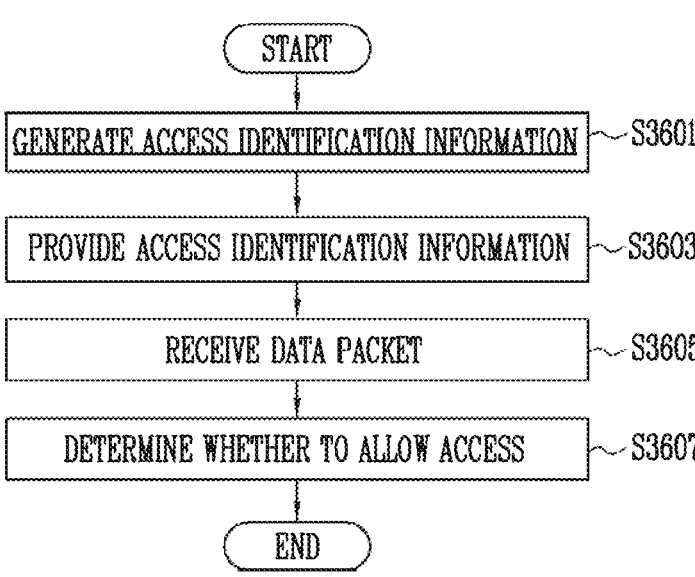
FIG. 36 is a flowchart illustrating a process of operating a PCIe function according to an embodiment of the present invention.

FIG. 36 is a flowchart illustrating a process of operating a PCIe function according to an embodiment of the present invention.

Referring to FIG. 36, the operating process may be performed by the PCIe function 7000 of FIG. 28 or 8 or the PCIe function 9000 of FIG. 31 or 10. Therefore, the process of operating the PCIe function 7000 to be described below may be applicable to the PCIe function 9000.

Referring to FIG. 36, at step S3601, the PCIe function 7000 may generate access identification information.

At step S3603, the PCIe function 7000 may provide an assigned system image with access identification information.

According to an embodiment, the PCIe function 7000 may provide the access identification information by using one of a vendor-defined message, a vendor-defined capability, a new PCIe capability defined by a user, Management Component Transport Protocol (MCTP) over SMbus (System Manager bus), and MCTP over PCIe.

At step S3605, the PCIe function 7000 may receive a data packet including target identification information indicating a target system image from a target system image from among a plurality of system images.

The target identification information may be included in a prefix of the data packet.

At step S3607, the PCIe function 7000 may determine whether or not to allow an access of the target system image based on the access identification information and the target identification information.

When the access identification information and the target identification information are consistent with each other, the PCIe function 7000 may allow the access of the target system image. In addition, when the access identification information and the target identification information are not consistent with each other, the PCIe function 7000 may not allow the access and may provide CA information to the target system image.

Figure 37:
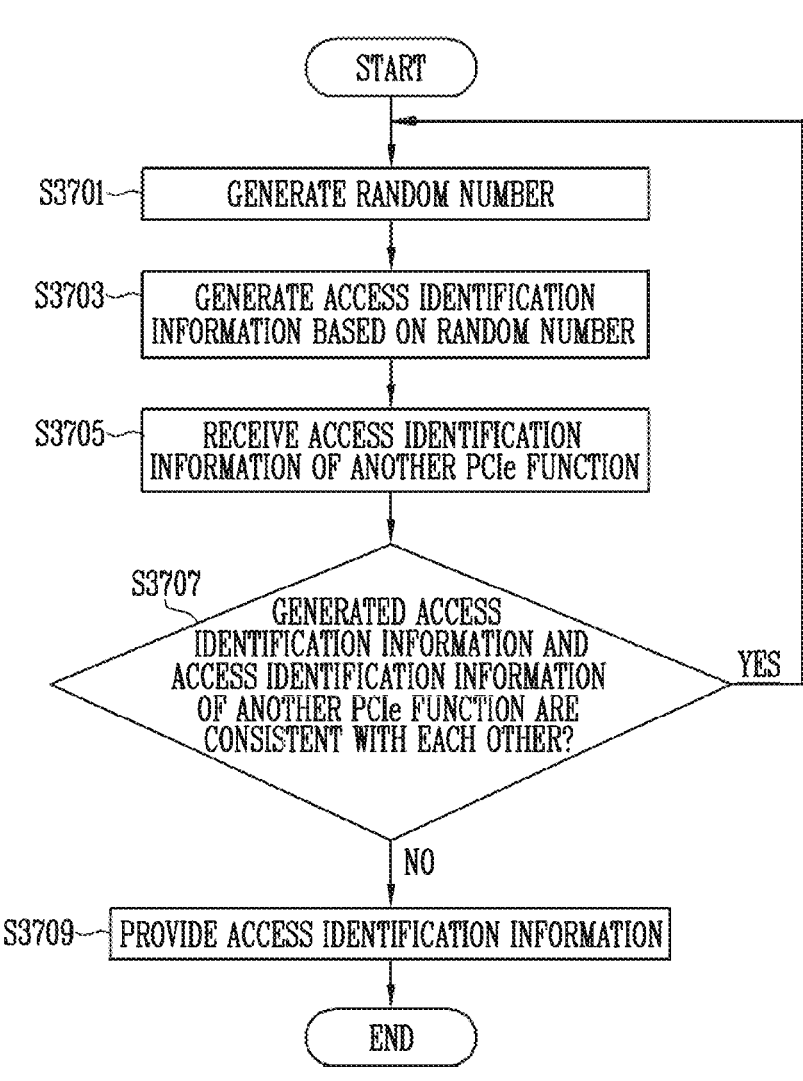
FIG. 37 is a flowchart illustrating a process of generating access identification information according to an embodiment of the present disclosure.

FIG. 37 is a flowchart illustrating a process of generating access identification information according to an embodiment of the present disclosure.

According to an embodiment, FIG. 37 is a detailed diagram of steps S3601 and S3603 of FIG. 36.

Referring to FIG. 37, the process of generating access identification information may be performed by the PCIe function 7000 of FIG. 28 or 8 or the PCIe function 9000 of FIG. 31 or 10. Therefore, the operating process by the PCIe function 7000 to be described below may be applicable to the PCIe function 9000.

Referring to FIG. 37, at step S3701, the PCIe function 7000 may generate a random number using a random number generation scheme.

The PCIe function 7000 may generate the random number based on a different seed from a seed used by another PCIe function.

At step S3703, the PCIe function 7000 may generate access identification information based on the generated random number.

At step S3705, the PCIe function 7000 may receive access identification information of another PCIe function from another PCIe function.

At step S3707, the PCIe function 7000 may determine whether the access identification information of the other PCIe function is consistent with the generated access identification information.

According to a result of determination at step S3707, when the access identification information of the other PCIe function is consistent with the generated access identification information, the PCIe function 7000 may repeat steps S3701, S3703, and S3705.

According to the result of determination at step S3707, when the access identification information of the other PCIe function is not consistent with the generated access identification information, the PCIe function 7000 may provide the generated access identification information to the system image at step S3709.

Figure 38:
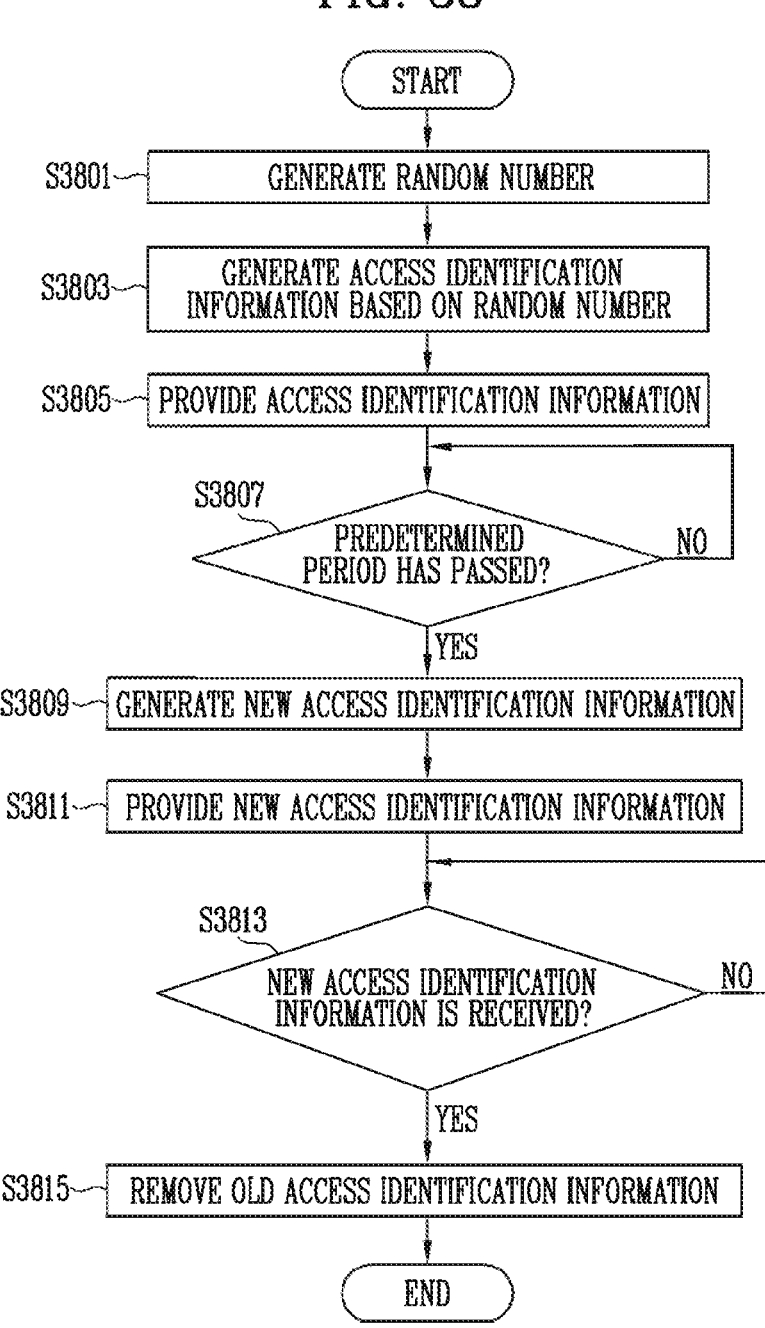
FIG. 38 is a flowchart illustrating a process of managing access identification information according to an embodiment of the present disclosure.

FIG. 38 is a flowchart illustrating a process of managing access identification information according to an embodiment of the present disclosure.

According to an embodiment, FIG. 38 is a detailed diagram of steps S3601 and S3603 of FIG. 36.

Referring to FIG. 38, the process of managing access identification information may be performed by the PCIe function 7000 of FIG. 28 or 8 or the PCIe function 9000 of FIG. 31 or 10. Therefore, the process of operating the PCIe function 7000 to be described below may be applicable to the PCIe function 9000.

Referring to FIG. 38, at step S3801, the PCIe function 7000 may generate a random number by a random number generation scheme.

At step S3803, the PCIe function 7000 may generate access identification information based on the generated random number.

At step S3805, the PCIe function 7000 may provide the generated access identification information to a system image.

At step S3807, the PCIe function 7000 may determine whether a predetermined period has passed from a time when the access identification information was last generated.

According to a result of determination at step S3807, when the predetermined period has not passed, the PCIe function 7000 may continue to check whether the predetermined period has passed at step S3807.

According to the result of determination at step S3807, when the predetermined period has passed, the PCIe function 7000 may generate new access identification information at step S3809.

At step S71103811, the PCIe function 7000 may provide the new access identification information to the system image.

At step S71303813, the PCIe function 7000 may determine whether the new access identification information is received. For example, the PCIe function 7000 may determine whether a data packet including target identification information consistent with the new access identification information is received.

At a result of determination at step S71303813, when the new access identification information is not received, at step S71303813 the PCIe function 7000 may continue to check whether the new access identification information is received.

As the result of determination at step S71303813, when the new access identification information is received, at step S3815 the PCIe function 7000 may remove the old access identification information that was generated before the new access identification information was generated.

Figure 39:
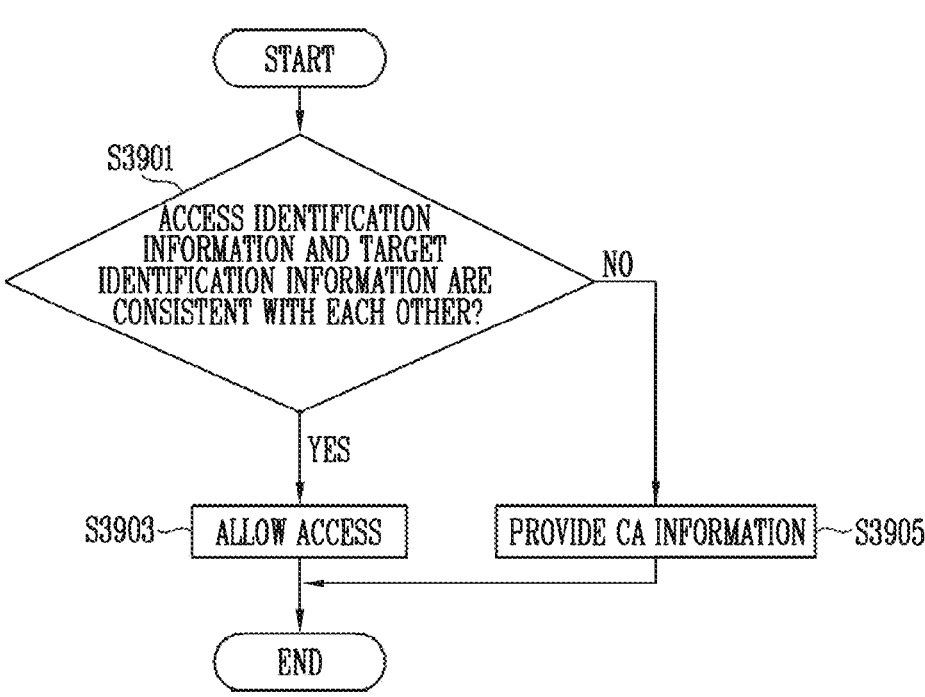
FIG. 39 is a flowchart illustrating a process of determining whether or not to allow an access according to an embodiment of the present disclosure.

FIG. 39 is a flowchart illustrating a process of determining whether or not to allow an access according to an embodiment of the present disclosure.

According to an embodiment, FIG. 39 is a detailed diagram of step S3607 of FIG. 36.

For example, referring to FIG. 39, the process of determining whether or not to allow an access may be performed by the PCIe function 7000 of FIG. 28 or 8 or the PCIe function 9000 of FIG. 31 or 10. Therefore, the process of operating the PCIe function 7000 to be described below may be applicable to the PCIe function 9000.

Referring to FIG. 39, at step S3901, the PCIe function 7000 may determine whether the access identification information and target identification information received from a system image are consistent with each other.

As a result of determination at step S3901, when the access identification information and the target identification information are consistent with each other, the PCIe function 7000 may allow an access of the system image at step S3903.

As the result of determination at step S3901, when the access identification information and the target identification information are not consistent with each other, the PCIe function 7000 may provide the system image with CA information at step S3905.

According to the present disclosure, a high security PCIe function and an operating process thereof may be provided.

According to the present disclosure, a PCIe function showing no performance degradation due to address translation and an operating process thereof may be provided. While embodiments of the present disclosure have been disclosed for illustrative purposes, those skilled in the art will appreciate that various modifications, additions and substitutions are possible. Thus, it is intended that the present invention cover all such modifications provided they come within the scope of the appended claims and their equivalents.

What is claimed is:

1. A peripheral component interconnect express (PCIe) device, comprising:

a physical function performing operations associated with a Peripheral Component Interconnect Express (PCIe) interface according to a physical function (PF) type;

a common function performing the operations according to the physical function type or a virtual function (VF) type; and a function type controller changing a function type of the common function into the virtual function type or the physical function type based on function type setting information, wherein the function type setting information includes function type mapping information indicating a mapping relationship between the common function and the function type of the common function.

2. The PCIe device of claim 1, wherein each of the physical function and the second common function comprises:

a configuration space including registers for configuring each of the physical function and the common function to perform the operations.

3. The PCIe device of claim 2, wherein the function type controller changes the function type of the common function by changing values of the registers included in the configuration space of the common function based on the function type setting information.

4. The PCIe device of claim 2, wherein the function type controller, based on pointer values indicating capabilities to be enabled among values of the registers, enables capabilities associated with the function type determined for each of the physical function and the common function.

5. The PCIe device of claim 2, wherein the function type controller changes the function type of the common function as being one of the physical function type, the virtual function type, and a disable function type in which the operations are disabled.

6. The PCIe device of claim 5, wherein the function type controller disables the registers included in the configuration space of the common function when the common function is changed to be the disable function type.

7. The PCIe device of claim 1, wherein the common function determined as the physical function type performs the operations based on a base address register (BAR) included in a configuration space of the common function.

8. The PCIe device of claim 7, wherein the common function determined as the physical function type performs the operations based on registers corresponding to the operations included in the configuration space of the common function.

9. The PCIe device of claim 1, wherein the common function determined as the virtual function type is associated with the physical function, and performs the operations based on a base address register included in a configuration space of the physical function.

10. The PCIe device of claim 9, wherein the physical function is a single root I/O virtualization (SR-IOV) capability enabled function, and wherein the common function is enabled according to a virtual function (VF) enable value included in a SR-IOV capability register of the physical function.

11. The PCIe device of claim 9, wherein the common function performs the operations based on registers corresponding to the operations included in the configuration space of the physical function.

12. The PCIe device of claim 9, wherein the common function performs a reset operation on the common function in response to at least one of a reset request for the physical function, a reset request for the common function, and a clear operation of the VF enable value of the physical function.

13. The PCIe device of claim 1, wherein the operations include at least one of a data processing operation of receiving a command, an error handling operation of detecting an error and reporting the error, and a power management operation of managing power of a function.

14. The PCIe device of claim 1, wherein each of the physical function and the common function comprises:

an operation controller controlling each of the physical function and the common function to perform the operations according to the function type determined for each of the physical function and the common function.

15. The PCIe device of claim 2, wherein the function type controller, based on pointer values indicating capabilities to be enabled among values of the registers, disables capabilities not associated with the function type determined for each of the physical function and the common function, and performs clock gating on registers of the capabilities disabled among the registers.

16. The PCIe device of claim 5, wherein the function type controller performs clock gating on the registers when the common function is changed to be the disable function type.

17. The PCIe device of claim 7, wherein the common function performs a reset operation on the common function in response to a reset request for the common function provided.

18. The PCIe device of claim 1, wherein the physical function includes a base address register included in a configuration space of the physical function, wherein the common function determined as the virtual function type is associated with the physical function, and performs the operations based on the base address register included in the configuration space of the physical function.

19. The PCIe device of claim 1, wherein the PCIe device receives the function type setting information from the host.

20. The PCIe device of claim 1, wherein each of the physical function and the common function corresponds to an independent operation unit for providing physical resources of the PCIe device.

21. The PCIe device of claim 1, wherein PCIe device completion information is provided to a host in accordance with the changing of the function type of the common function.

* * * * *